United States Patent
Zitterbart et al.

(10) Patent No.: US 12,473,328 B2
(45) Date of Patent: Nov. 18, 2025

(54) METHOD FOR MODIFICATION OF PEPTIDES IMMOBILIZED ON A SOLID SUPPORT BY TRACELESS REDUCTIVELY CLEAVABLE LINKER MOLECULES

(71) Applicant: BELYNTIC GMBH, Berlin (DE)

(72) Inventors: Robert Zitterbart, Berlin (DE); Oliver Reimann, Berlin (DE)

(73) Assignee: BELYNTIC GMBH, Berlin (DE)

( * ) Notice: Subject to any disclaimer, the term of this patent is extended or adjusted under 35 U.S.C. 154(b) by 72 days.

(21) Appl. No.: 17/633,200

(22) PCT Filed: Aug. 7, 2020

(86) PCT No.: PCT/EP2020/072330
§ 371 (c)(1),
(2) Date: Feb. 6, 2022

(87) PCT Pub. No.: WO2021/023892
PCT Pub. Date: Feb. 11, 2021

(65) Prior Publication Data
US 2022/0363713 A1 Nov. 17, 2022

(30) Foreign Application Priority Data

Aug. 7, 2019 (EP) ..................... 19190627

(51) Int. Cl.
*C07K 1/107* (2006.01)
*A61K 38/26* (2006.01)
*C07K 17/10* (2006.01)

(52) U.S. Cl.
CPC ............ *C07K 1/1075* (2013.01); *A61K 38/26* (2013.01); *C07K 17/10* (2013.01)

(58) Field of Classification Search
None
See application file for complete search history.

(56) References Cited

FOREIGN PATENT DOCUMENTS

WO 2017129818 A1 8/2017
WO WO 2017129818 * 8/2017

OTHER PUBLICATIONS

Zitterbart et al:"PEC, the new tool in peptides—A traceless catch-and-release method for rapid peptide purification and modification", CPS Berlin 2019, Jun. 16, 2019 (Jun. 16, 2019), XP055665894.*
R Zitterbart et al, "PEC, the new tool in peptides—A traceless catch-and-release method for rapid peptide purification and modification", CPS Berlin 2019, Jun. 16, 2019 (Jun. 16, 2019).
Reimann, Oliver, et al. "A traceless catch-and-release method for rapid peptide purification." Journal of Peptide Science 25.1 (2019): e3136.

* cited by examiner

*Primary Examiner* — Maury A Audet
(74) *Attorney, Agent, or Firm* — JMB Davis Ben-David

(57) ABSTRACT

The present invention relates to a method for modifying and purifying peptides comprising an immobilizing step, a modification step and a releasing step. In the immobilizing step, a crude linker-tagged peptide L-P is coupled to a solid support yielding an immobilized linker-tagged peptide S-L-P. Subsequently, the immobilized linker-tagged peptide S-L-P is modified with one or more organic molecules yielding an immobilized linker-tagged peptide S-L-mP. Finally, the modified peptide is released via a reduced intermediate RI. The linker molecule is a compound of formula 1, X—Tb—Va-U—Y—Z (1), which can be coupled to a purification resin via the moiety X and to a peptide via the moiety Y under the release of the leaving group Z. T is an optional spacer moiety and V is an optional electron withdrawing moiety. U is an aryl or 5- or 6-membered heteroaryl moiety bound to at least one electron withdrawing moiety V, W or E. The linker is stable under acidic conditions and releases the peptide upon addition of a reducing agent.

15 Claims, 21 Drawing Sheets
Specification includes a Sequence Listing.

METHOD FOR MODIFICATION OF PEPTIDES IMMOBILIZED ON A SOLID SUPPORT BY TRACELESS REDUCTIVELY CLEAVABLE LINKER MOLECULES

CROSS-REFERENCE TO RELATED APPLICATIONS

This is the U.S. National Stage of International Patent Application No. PCT/EP2020/072330 filed on Aug. 7, 2020, which in turn claims the benefit of European Patent Application No. 19190627.0 filed on Aug. 7, 2019.

FIELD OF THE INVENTION

Modified peptides are of growing interest as pharmaceutical relevant compounds. Modifications as for example fatty acids or bridging molecules to induce peptide macrocycle enhance the pharmacokinetic of the desired peptides sequence, while preventing degradation by proteases in vivo. Thus, peptide modifications are a key feature in modern peptide therapeutics. Nevertheless, introduction of those modifications are often difficult and rendering the handling and purification of the modified peptide very difficult or impossible. Especially because state of the art purification methods have been developed and established for non-modified peptides.

BACKGROUND OF THE INVENTION

Peptide production by solid phase peptide synthesis (SPPS) is a powerful and fast way to gain a multitude of different peptides, or to get larger quantities of a single peptide in a foreseeable time frame. Hence, it finds widespread use for manufacturing larger numbers or large quantities of peptides. The procedure consists of the coupling of the first N-terminally protected amino acid to a synthesis resin followed by repeated cycles of deprotection of the N-terminus, coupling the next N-terminally protected amino acid and capping of unreacted peptide sequences. Finally, the synthesized peptide is cleaved off the synthesis resin and purified. These linear peptides might be further modified to improve their characteristics.

Linear unmodified peptides show low in vivo stability due to the fast degradation by proteases and peptidases. Additionally, they show no cell-permeability and fast clearance rates towards the kidney in mammal bodies (Witt et al. (2001), Peptides (22), 2329-43). Mainly two modifications are used to improve in vivo peptide stability and potency: Lipidation with fatty acids and cyclisation of linear peptides to form macrocycles.

Lipidation is one of the most important modification of peptide drugs. Fatty acids connected to peptides affect their hydrophobicity, secondary structure and their aggregation behavior while retentive their specificity to protein targets. The fatty acid enhances metabolic stability, membrane permeability, bioavailability, and changes the pharmacokinetic and pharmacodynamic properties of the modified peptide (L. Zhang, G. Bulaj (2012) Current Medicinal Chemistry 19(11), 1602-18). Drug examples include GLP-1-receptor agonists such as liraglutide (Victoza®), semaglutide (Ozempic®) and insulin derivatives such as detemir (Levemir®) and degludec (Tresiba®), all of which bear fatty acids on a lysine side chain. The fatty acids of lipidated drugs can interact and bind to albumin through three high-affinity binding domains. The attached albumin has a protective effect on these lipidated peptides in addition to a different circulation time in the organism.

Methods to manufacture lipidated drugs in large scales are currently dependent on two major steps: firstly, a biological step, where the precursor peptide is expressed by suitable cell lines mostly yeast. Secondly, after recovery and purification of the precursor peptide, acylation with the fatty acid or fatty acid spacer building blocks is achieved by chemical means in solution at higher pH followed by a final purification steps. In early phases of drug development solid phase peptide synthesis is exploited to synthesize a large number of lipidated drug candidates. Acylation with lipids is mostly achieved by usage of orthogonal protecting groups strategy. Traditionally, an orthogonally protected lysine residue is incorporated in the peptide sequence during SPPS. This protecting group is selectively detached, and the lipid is introduced by adding pre- or in-situ activated lipids to the otherwise protected peptides immobilized on the synthetic resin. Alternatively, peptides might be lipidated in solution after production via chemical or biological means. Whether selective acylation techniques have to be employed or the N-terminus has to be orthogonally protected and must be deprotected after successful lipidation.

Cyclic peptides have many advantages over linear peptides. They are significantly more resistant to both exo- and endoproteases. Also, they show superior binding affinities to desired protein targets most likely because they display a more rigid and arch-like binding motive towards target receptors. Successful cyclic peptide drugs are the anticancer drug octreotide (Sandostatin®), the immunosuppressant ciclosporin (Sandimmun®, Sandimmun®, Neoral®) or the neuropeptide hormone oxytocine (Syntocinon® or others). Methods to form peptidic cycles can be separated in two main categories: a) one-component-system, in which peptides can be cyclized by utilizing their intrinsic functional groups to form cycles connected by e.g. amides or disulfides. By incorporation of unnatural amino acids other covalent connections can be created. b) Two-component-system, in which the functional groups of the peptides are used in reactions with a bridging scaffold. Organic molecules can be used, that form together with the peptides mono-, bi- or multi-cycles. The most common method is to utilize the nucleophilic functional groups of the peptide in particular thiols to let them react with scaffolds bearing electrophilic reaction points. When SPPS is used peptides are either cyclized on the synthetic resin or after detachment of peptide from the synthetic resin in solution. Both methods have their pitfalls. Modification on solid support demands orthogonally protected amino acids, that are expensive and need extra steps to be deprotected before modification. Once deprotected pseudo ultra-high dilution on solid support helps to prevent undesired reaction of one scaffold with two or more linear peptides. Furthermore, excess of reagent can be used, since it easily can be washed away. Cyclisation in solution has the downside of being notorious to side reactions such as bridging of two linear peptides by one scaffold and excess of reagents are tedious to be removed. Consequently, modifications are performed in high diluted solution whereby one equivalent of scaffold is used.

Many methods have been published for peptide modification in solution; in the context of the invention only those disclosures will be discussed that use peptides attached to solid supports to enable modification of the peptides.

WO/2004/077062 uses a membrane as a solid support for synthesis of many desired peptides as drug candidates. After standard SPPS of the polypeptides and removal of protection groups molecular scaffolds as for example tris(bromomethyl)benzene are added to cyclize the peptides on said support. The cyclized peptides are consequently used to screen for binding to proteins. This method cannot be used in other ways than drug discovery since the created peptides remain covalently bound to the synthetic support on which they have been created. Thus, it is consequently not possible to analyze the peptides prior to binding tests. Researches therefore have to trust in that all preformed steps have yielded the cyclic peptides that were intended, giving rise to the possibility of false-positive and even more likely false-negative results.

(WO2009/098450 and Heinis et al. (2009), Nat Chem Biol 5 (7), 502-7) disclosed a method to modify peptides, that have been synthesized by phages and are displayed on the phages surface. Large peptide libraries were thus generated having three cysteine residues in their sequence, and the phages were treated with solutions of tris-(bromomethyl) benzene (TBMB) to cyclize the displayed peptides to bicycles. The phages were then incubated with a biotinylated target protein and subjected to further selection rounds. After phage titer increased the DNA of the phages was sequenced to deduce selected sequences. Besides the huge number of bicyclic peptide variants ($4.4 \times 10^9$) the disadvantage of the method for synthetic purposes is that one can't use it for production of peptides. It is only of diagnostic use. In the diagnostic context is also has the disadvantage that the peptides that are subjected to the binding experiments can't be analyzed giving rise to the possibility of false-positive and even more likely false-negative results.

(Bellmann-Sickert et al. (2011) J Med Chem 54 (8), 2658-67 and Vilà et al. (2013) Org Biomol Chem 11, 3365-74) disclose a method in which the peptide is synthesized on the synthetic resin utilizing orthogonal protection of a lysin residue after selective deprotection the fatty acid is coupled to the protected peptide. However costly building blocks have to be used and the crude peptide is gained already modified with the fatty acid, rendering handling and purification difficult due to usually poor solubility.

To overcome the presented short comings of the current state of the art, namely the lack to isolate and analyze modified peptides and to use standard amino acid building blocks without orthogonal protection, the present invention utilizes linker molecules that enable the immobilization of peptide precursors followed by subsequent modification of peptides while they are immobilized on the purification/modification solid support. In contrast to other methods especially to those that use modification in solution the present invention removes perturbating peptidic truncations and excess of organic molecules for modification simultaneously and is thus a method for modification and at the same time purification of desired peptides.

DESCRIPTION

A first aspect of the invention relates to a method for modifying and purifying peptides. The method comprises the steps of
providing a crude linker-tagged peptide L-P, wherein the crude peptide is covalently bound to a linker molecule L,
in an immobilizing step, coupling the linker-tagged peptide L-P to a solid support yielding an immobilized linker-tagged peptide S-L-P,
in a modification step, modifying the immobilized linker-tagged peptide S-L-P with one or more organic molecules yielding an immobilized linker-tagged peptide S-L-mP,
in a releasing step, adding a reducing agent yielding a reduced intermediate RI and subsequent decomposition of the reduced intermediate RI yielding the modified peptide mP,
wherein the Linker L is a compound of formula 1,
$X-T_b-V_a—U—Y—Z$ (1), wherein
X is selected from a moiety of formula 2, 2a, 3, 3a or 4, in particular of formula 2, 2a, 3 or 3a, more particularly of formula 2 or 2a,

(2)

(2a)

(3)

(3a)

(4)

wherein
each $R^1$ and $R^2$ is independently from each other selected from H or B, wherein at least $R^1$ or $R^2$ is B, $R^3$ is selected from H or B, $R^4$ is selected from H, $C_1$-$C_{12}$-alkyl or aryl, wherein the aldehyde or keto group may be protected by an acid labile protecting group, B is an acid labile amine protecting group, T is a linear or branched spacer with b being 0 or 1, V is an electron-withdrawing moiety with a being 0 or 1, wherein the sum of a and b is 1 or 2, U is a phenyl or a five- or six-membered heteroaryl moiety, that is bound to at least one of the moieties V, $W_q$ and $E_n$ and that may optionally be substituted by $C_{1-6}$-alkyl, wherein W is selected from $—N_3$, $—S(=O)—R^8$, $—S—S—R^8$, $—O—CH_2—N_3$, $—O—C(=O)—O—CH_2—N_3$, $—N=N$-phenyl, $—N=N—R^8$,

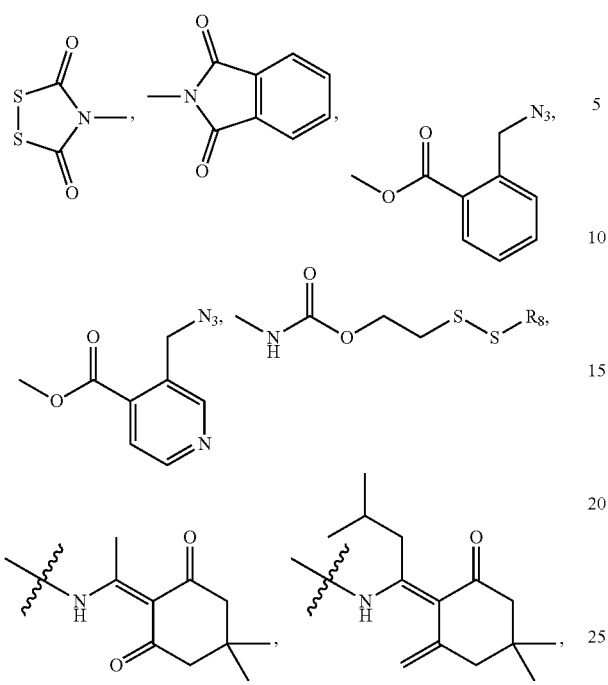

wherein $R^8$ is pyridyl, pyrimidinyl, pyrazinyl, pyridazyl, —$C_1$-$C_6$-alkyl or —$(CH_2)_p$—$NMe_2$, with q being 0, 1, 2, 3 or 4, E is an electron withdrawing group under acidic conditions, with n being 0, 1, 2, 3 or 4, Y is —$(CH_2)_m$—C(=O)— or —$(CH_2)_m$—O—C(=O)— with m being 1, 2 or 3, Z is an electron-withdrawing leaving group.

In certain embodiments, the method for modifying and purifying peptides comprises the steps of providing a crude linker-tagged peptide L-P, wherein the crude peptide is covalently bound to a linker molecule L, in an immobilizing step, coupling the linker-tagged peptide L-P to a solid support yielding an immobilized linker-tagged peptide S-L-P, in a modification step, modifying the immobilized linker-tagged peptide S-L-P with one or more organic molecules yielding an immobilized linker-tagged peptide S-L-mP, in a releasing step, adding a reducing agent yielding a reduced intermediate RI and subsequent decomposition of the reduced intermediate RI yielding the modified peptide mP, wherein the Linker L is a compound of formula 1, X-$T_b$-$V_a$—U—Y— (1), wherein X is selected from a moiety of formula 2, 2a, 3, 3a or 4, in particular of formula 2, 2a, 3 or 3a, more particularly of formula 2 or 2a,

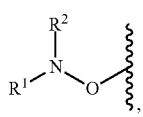
(2)

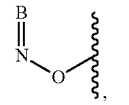
(2a)

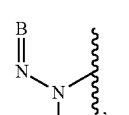
(3)

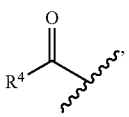
(3a)

(4)

wherein each $R^1$ and $R^2$ is independently from each other selected from H or B, wherein at least $R^1$ or $R^2$ is B, $R^3$ is selected from H or B, $R^4$ is selected from H, $C_1$-$C_{12}$-alkyl or aryl, wherein the aldehyde or keto group may be protected by an acid labile protecting group, B is an acid labile amine protecting group, T is a linear or branched spacer with b being 0 or 1, V is an electron-withdrawing moiety with a being 0 or 1, wherein the sum of a and b is 1 or 2, U is a phenyl or a five- or six-membered heteroaryl moiety, that is bound to at least one of the moieties V, $W_q$ and $E_n$ and that may optionally be substituted by $C_{1-6}$-alkyl, wherein W is selected from —$N_3$, —$NO_2$, —S(=O)—$R^8$, —S—S—$R^8$, —O—$CH_2$—$N_3$, —O—C(=O)—O—$CH_2$—$N_3$, —N=N-phenyl, —N=N—$R^8$,

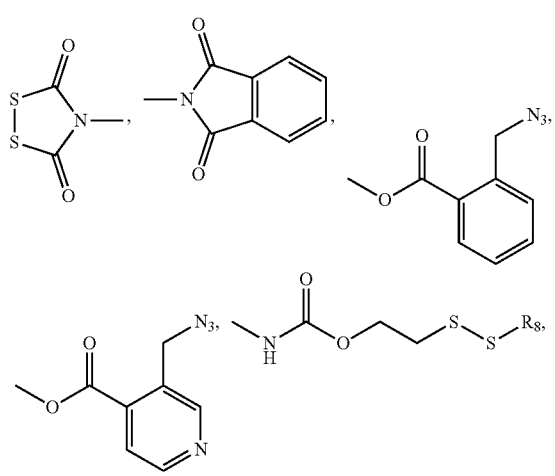

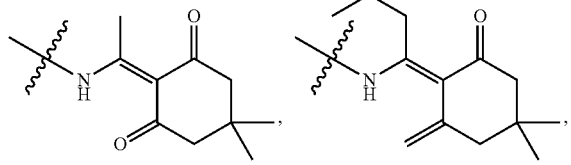

wherein R[8] is pyridyl, pyrimidinyl, pyrazinyl, pyridazyl, —C$_1$-C$_6$-alkyl or —(CH$_2$)$_p$—NMe$_2$, with q being 0, 1, 2, 3 or 4, particularly with q being 1, 2, 3 or 4, E is an electron withdrawing group under acidic conditions, with n being 0, 1, 2, 3 or 4, in case of U being a phenyl moiety and Y being —(CH$_2$)$_m$—O—C(=O)—, the sum of Hammett constants of V, W, E under acidic conditions is larger than 0.45, and wherein W is in ortho or para position in relation to Y, Y is —(CH$_2$)$_m$—C(=O)— or —(CH$_2$)$_m$—O—C(=O)— with m being 1, 2 or 3.

In certain embodiments, X is selected from a moiety of formula 2, 3, or 4, in particular of formula 2, or 3, more particularly X is formula 2.

Peptides obtained by solid phase peptide synthesis are usually purified after cleaving off the synthesis resin. Depending on the intended use, e.g. as peptide drug or drug candidate, the peptide may be further modified. As described above, the present invention allows peptide modification and purification on the same resin without the need of using orthogonal protection strategies for the modification of amino acids. The invention is summarized in FIG. 1.

In the context of the present invention, the term "amino acid" relates to molecules comprising at least one amine moiety and at least one carboxyl moiety. Particularly when used in the context of peptides, the term "amino acid" relates to alpha-amino acids, also referred to as α-amino acids or 2-amino acids, of the generic formula H$_2$NCHRCOOH (free amino acid) or —HNCHRCOO— (amino acid in a peptide), i.e. the amine and the carboxylic acid moieties are attached to the first (alpha-) carbon atom. R denotes the side chain of the amino acid. The term "amino acid" relates to the D- or L-isomer of an alpha-amino acid, in particular to the L-isomer. Particularly moieties that are not alpha-amino acids but nevertheless amino acids in the broader sense described above, are described within this specification by specific formulas.

After solid phase peptide synthesis on a synthesizing support, e.g. a synthesis resin, a crude peptide P is obtained. While still bound to the synthesis resin, the crude peptide may be coupled to a tracelessly cleavable linker molecule L of formula 1.

The linker molecule of formula 1 is suitable for the purification of peptides after solid phase peptide synthesis (SPPS).

A common approach for purifying peptides after SPPS using a linker molecule is coupling the linker molecule to the N-terminus of the peptide in a final coupling step. In this coupling step, the N-terminus of the peptide will nucleophilically attack the linker molecule to form a covalent carbamate or amide bond with the moiety Y of the linker while the electron withdrawing leaving group Z is released. Alternatively, a suitable moiety of a side chain of an amino acid of the peptide such as —NH$_2$ or —OH may be used for coupling the linker molecule to the peptide. This option may be used if the N-terminus is modified by the methods described herein. Suitable amino acids for coupling the linker to a side chain of an amino acid are lysine or serine.

Subsequently, the peptide-linker-construct is cleaved off the synthesis resin by addition of TFA. If the moiety X comprises an acid labile amine protecting group B, the moiety B is simultaneously removed by the addition of TFA.

Linkers according to the invention are stable under acidic conditions when the peptide-linker construct is cleaved off, e.g. by using TFA.

The moiety X of the linker may be coupled to a functionalized solid phase such as a resin that is used during purification. The moiety X may form a hydrazone bond or oxime bond by reacting with a suitable moiety of the functionalized solid phase such as aldehyde, ketone, aminooxy or hydrazine.

The moiety T represents a spacer that is non-reactive under commonly applied purification conditions.

The moiety T is either directly bound to the moiety U or via the moiety V.

The moiety U contributes to the stability of the linker molecule under acidic conditions, particularly TFA >50%, in the presence of water pH <0. This is either achieved by using a heterocyclic moiety or a phenyl moiety that is bound to at least one of the electron-withdrawing moieties E, W and V.

If electron-withdrawing moieties (E, W, V) are attached to the phenyl moiety, the benzylic position of the linker molecule linked to the peptide gets less electron density and is thus less susceptible to acid catalyzed degradation. For sufficient stability of the inventive linker molecule under acidic conditions, a certain threshold of electron-withdrawal has to be met. This threshold is expressed as the sum of Hammett constants ($\sigma_m$ and $\sigma_p$) of V, W, E under acidic conditions being larger than 0.45. Hammett constants are calculated according to Hansch and Taft (1991), Chem. Rev. 91:165-195. A positive Hammett constant reflects the ability of the substituent to exert an electron withdrawing effect on the phenyl moiety and a negative value indicates that the substituent exerts an electron donating effect.

Hammett constants are empirically determined constants for substituents of the phenyl core in benzoic acid derivates in meta ($\sigma_m$) and para position ($\sigma_p$) resulting in different acidities (pKa). In the context of the present invention, the position is determined in relation to the binding of the moiety Y. For substituents in ortho position, Hammett values for the para position are a good approximation and therefore used in the context of the present invention to calculate the sum of Hammett values of the substituents V, W and E.

Of note, the Hammett constants are calculated for the substituents V, W and E under acidic conditions. For example, an amine moiety at neutral pH is characterized by the Hammett constants $\sigma_m$=−0.16 and $\sigma_p$=−0.66 and thus an electron-pushing substituent. Under acidic conditions, the amine moiety is protonated. For protonated amines, the Hammett constants are $\sigma_m$=+0.86 and $\sigma_p$=+0.60 indicating that protonated amines are electron-withdrawing substituents, this also includes aromatic amines which are able to withdraw electrons through a conjugated π-system from U in their protonated form whether directly as substituents on U or in π-conjugation of U.

The threshold of the sum of Hammet constants being larger than 0.45 applies for U being a phenyl moiety and Y being —(CH$_2$)$_m$—O—C(=O)— with m=1, since the —O—C(=O)— comprise a good leaving group in the benzylic position, facilitating the acid catalyzed degradation. Therefore electron-density in the aromatic ring should be low enough to prevent stabilization of cations in the benzylic position in Y.

If the moiety Y is —$(CH_2)_m$—C(=O)—, this threshold is not necessary because —C(=O)— is not a good leaving group in the benzylic position.

For the stability of linker molecules under acidic conditions that comprise a heterocyclic moiety U, such extra threshold for the selection of specific moieties V, W and E is not necessary. As heterocyclic moieties per se are more electron-deficient compared to phenyl moieties, any combination of V, W and E appears to be sufficient for the stability of the linker molecule under acidic conditions. Especially when U is a nitrogen containing heterocycle, the nitrogen will be protonated during acidic release of the peptide rendering the aromatic system of U especially low in electron density, thus being not able to stabilize a benzylic cation.

The moiety Y is either a —C(=O)— or a —O—C(=O)— moiety. Upon coupling of the linker molecule, an amide (—C(=O)—NH—) or a carbamate (—O—C(=O)—NH—) moiety is formed between the linker molecule and the N-terminus of the peptide. After purification, the peptides are released from the linker molecule and thus the purification media under reductive conditions either by 1.4 or 1.6 elimination or nucleophilic attack. The reductive stimulus transforms W into its reduced version, now functioning as an electron donating group and a nucleophile, thus enabling the release of the peptide.

After cleavage from the synthesis resin, a linker-tagged peptide L-P is provided.

In certain embodiments, the linker-tagged peptide L-P is provided by connecting a crude peptide P, that has been synthesized on a synthesizing support SR, with a linker L yielding a linker-tagged, supported crude peptide L-P-SR, followed by cleavage of the linker-tagged peptide L-P from the synthesizing support SR yielding the linker-tagged peptide L-P.

In certain embodiments, the linker-tagged peptide L-P is provided by connecting a crude peptide P, that has been synthesized on a synthesizing support SR, with a free linker $L_f$ yielding a linker-tagged, supported crude peptide L-P-SR by releasing an electron withdrawing leaving group Z, wherein $L_f$ is a linker X-$T_b$-$V_a$—U—Y—Z with X, T, b, V, a, U and Y as defined above and Z being an electron withdrawing leaving group, followed by cleavage of the linker-tagged peptide L-P from the synthesizing support SR yielding the linker-tagged peptide L-P.

In certain embodiments, $L_f$ is a linker X-$T_b$-$V_a$—U—Y—Z with X being selected from formula 2, 2a, 3, 3a and 4, and with T, b, V, a, U and Y as defined above.

In certain embodiments, the free linker $L_f$ may be coupled to the N-terminus of the crude peptide P or to a free amine or hydroxyl of a side chain of an amino acid of the peptide P.

In certain embodiments, the free linker $L_f$ may be coupled to the N-terminus of the crude peptide P or to the amine in the side chain of an amino acid selected from lysine, ornithine, α-aminoglycine, α,γ-diaminobutyric acid, α,β-diaminopropionic acid, 2,6-diamino-4hexynoic acid, β-(1-piperazinyl)alanine, 4,5-dehydrolysine and d-hydroxylysine, in particular from lysine and ornithine, or to the hydroxyl moiety in the side chain of an amino acid selected from serine, tyrosine and threonine.

In certain embodiments, the free linker $L_f$ may be coupled to the N-terminus of the crude peptide P or to the amine in the side chain of a lysine or the hydroxyl moiety in the side chain of serine.

In certain embodiments, the free linker $L_f$ may be coupled to the N-terminus of the crude peptide P.

As the leaving group Z is released upon coupling the linker L to the N-terminus of the crude peptide, the linker-tagged, supported crude peptide comprises the moieties X-$T_b$-$V_a$—U—Y—P—SR and the released linker-tagged peptide comprises the moieties X-$T_b$-$V_a$—U—Y—P.

The release of the linker-tagged peptide from the synthesizing support is performed under commonly used acidic conditions. In contrast to linker molecules of the prior art, the linker of formula 1 is stable under acidic conditions such as TFA conditions. Only the acid labile amine protecting group B of the moiety X is removed during this step.

In certain embodiments, the cleavage of the linker-tagged peptide L-P- is achieved under acidic conditions.

In certain embodiments, the cleavage of the linker-tagged peptide L-P- is achieved by using TFA, HBr, HCl or acetic acid.

The linker-tagged peptide is immobilized on a solid support such as a purification resin applying standard methods known to a skilled person. A suitable solid support comprises a functional group such as an aldehyde, a ketone, an amino-oxy or a hydrazine moiety. The functional group forms a hydrazine bond or oxime bond with the moiety X of the linker.

As described above, the peptide is usually synthesized on synthesis resin and the linker is coupled to the peptide while still bound to the synthesis resin. Subsequently, the liker-tagged peptide is cleaved off the synthesis resin by addition of TFA, wherein acid labile protecting groups B of the moiety X are simultaneously removed. If the peptide is synthesized in solution or if the peptide is provided without being bound to a synthesizing support SR, the acid labile protecting group B is removed by using an acid as described above before the linker-tagged peptide L-P is coupled to a solid support in the immobilizing step.

In certain embodiments, the acid labile protecting group B is removed under acidic conditions and the linker-tagged peptide L-P is coupled to a solid support in the immobilizing step to yield an immobilized linker-tagged peptide S-L-P.

For immobilization of the linker-tagged peptide, suitable aldehyde-modified beads such as agarose or hydroxylated poly(methyl acrylate) beads may be used. Particularly for modifications such as disulfide formation or thioether stapling, hydroxylated poly(methyl acrylate) beads or agarose, particularly hydroxylated poly(methyl acrylate) beads are used.

In certain embodiments, the solid support is aldehyde-modified.

In certain embodiments, the solid support is aldehyde-modified and selected from agarose, hydroxylated poly(methyl acrylate), poly(glycidyl acrylate), poly(glycidyl methacrylate), polylysine, polyethylene glycol, polyamide, polyacrylamide, polystyrene and copolymers of those.

In certain embodiments, the solid support is aldehyde-modified and selected from agarose and hydroxylated poly(methyl acrylate) beads.

In certain embodiments, the immobilizing step is performed at a pH <5, particularly at pH 3-4, more particularly at pH 3.5.

In certain embodiments, the immobilizing step is performed in DMSO/sodium citrate/guanidium chloride, in TFA/water, in hexafluoroisopropanol (HFIP), or in trifluoroethanol, particularly in DMSO/sodium citrate/guadinium chloride, in TFA/water or in HFIP.

In certain embodiments, the immobilizing step is performed in DMSO/sodium citrate with 8 M guanidium chloride at pH 3.5, in TFA and water with the TFA content from 40-95%, in Hexafluoroisopropanol (HFIP) and in trifluoroethanol.

In certain embodiments, the immobilizing step is performed in DMSO/sodium citrate with 8 M guanidium chloride at pH 3.5 (9:1), TFA/water (1:1), TFA/water (83:27) and HFIP.

Subsequently, the peptide may be modified in the modification step (see below).

Finally, the modified peptide mP is released with a free N-terminus via a reduced intermediate RI.

In certain embodiments, the reducing agent in the releasing step is selected from triphenylphosphine, dithiothreitol (DTT), dithioerythritol (DTE), trimethylphosphine, triethylphosphine or tris(2-carboxyethyl)phosphine, particularly dithiothreitol, dithioerythritol or triphenylphosphine.

In certain embodiments, the reducing agent in the releasing step is selected from triphenylphosphine, dithiothreitol (DTT), trimethylphosphine, triethylphosphine or tris(2-carboxyethyl)phosphine.

In certain embodiments, the reducing agent in the releasing step is triphenylphosphine or dithiothreitol.

The reduced intermediate RI decomposes to release the modified peptide mP with a free N-terminus.

As described above, the moieties U, V, W and E contribute to the stability of the linker under acidic conditions. For example, linkers comprising a moiety U or V that comprises an amine or a heterocycle such as pyridine are stable under acidic conditions, particularly TFA >50%, in the presence of water pH <0, as the amine or heterocycle is protonated. Furthermore, the protonated linker improves the solubility of the linker-peptide complex. If the pH is higher than the pKa of the linker, the linker will rapidly decompose during the desired release of the peptide as the last step.

In certain embodiments, the reduced intermediate RI is decomposed by a pH change.

In certain embodiments, the reduced intermediate RI is decomposed by changing the pH to a pH that is higher than the pKa of the linker.

In certain embodiments, the reduced intermediate RI is decomposed by changing the pH to a pH that is lower than the pH used during reduction of the linker. For example, the reduced intermediate RI is obtained by adding a reducing agent at pH 8. Subsequently, the reduced intermediate is decomposed at pH <8, particularly at a pH between −0.7 to 0.7.

As described above, mainly two modifications are used to improve in vivo peptide stability and potency: Lipidation with fatty acids and cyclisation of linear peptides to form macrocycles.

Lipidation relates to the coupling of fatty acids to peptides. This modification affects the hydrophobicity, the secondary structure and the aggregation behaviour of the peptide. Furthermore, the metabolic stability and membrane permeability of the peptide may be enhanced.

The peptide may be composed of natural and/or unnatural amino acids. If an amino acid of the peptide comprises a nucleophilic amine in its side chain, it may form an amide bond with a carboxylic acid moiety of an organic molecule, e.g. a carboxylic acid moiety of a fatty acid.

In certain embodiments, the peptide comprises an amino acid comprising at least one nucleophilic amine.

In certain embodiments, the peptide comprises an amino acid comprising at least one nucleophilic amine in an amino acid side chain or the nucleophilic amine is the N-terminus of the peptide, i.e. the first residue of the peptide sequence. The amino acid that forms the N-terminus may be any amino acid.

In certain embodiments, the peptide comprises an amino acid selected from lysine, ornithine, α-aminoglycine, α,γ-diaminobutyric acid, α,β-diaminopropionic acid, 2,6-diamino-4hexynoic acid, β-(1-piperazinyl)alanine, 4,5-deydrolysine and d-hydroxylysine.

In certain embodiments, the peptide comprises an amino acid comprising at least one nucleophilic amine in an amino acid side chain, wherein the amino acid is selected from lysine, ornithine, α-aminoglycine, α,γ-diaminobutyric acid, α,β-diaminopropionic acid, 2,6-diamino-4hexynoic acid, β-(1-piperazinyl)alanine, 4,5-dehydrolysine and d-hydroxylysine.

In certain embodiments, the peptide comprises an amino acid selected from lysine and ornithine.

The organic molecule used for lipidation of the peptide may be a fatty acid (FA-OH) or an activated fatty acid (FA-A). The fatty acid or activated fatty acid is coupled to the nucleophilic amine by forming an amide. It is also possible that the fatty acid is connected via one or more further linker/spacer moieties Sp to the nucleophilic amine. Also here, the starting material may be the fatty acid-linker/spacer compound FA-Sp$_n$-OH or an activated fatty acid-linker/spacer compound FA-Sp$_n$-A. The moieties FA and Sp are connected by an amide bond. The linker/spacer Sp-OH or the activated linker/spacer Sp-A is also coupled to the nucleophilic of the peptide in an amidation reaction. In case of several linker/spacer moieties Sp, the linker/spacer moieties are connected to each other by amide bonds.

In certain embodiments, the organic molecule is a compound of formula 5a, 5b, 5c or 5d, particularly 5a or 5c, FA-Sp$_n$-A    (5a), FA-Sp$_n$-OH    (5b), FA-A    (5c), or FA-OH    (5d), wherein FA is a —C(=O)—C$_{1-24}$-alkyl or a —C(=O)—C$_{2-24}$-alkenyl, particularly a —C(=O)—C$_{5-17}$-alkyl or a —C(=O)—C$_{5-17}$-alkenyl, more particularly a —C(=O)—C$_{5-17}$-alkyl, wherein the alkyl or the alkenyl moiety may be unsubstituted or substituted by one or more substituents independently selected from —F and —COOH, Sp is a spacer comprising 2 to 50 atoms in length, a terminal —C(=O)— moiety and a —NH— moiety, wherein the spacer is connected to FA via the —NH— moiety, n is an integer between 1 and 10, A is selected from: —F, —Cl, —Br, —I, —N$_3$, —O(C=O)CH$_2$(C=O)OH, —SR$^{14}$, —OCF$_3$, —OCH$_2$CF$_3$, —OSO$_2$CF$_3$, —SO$_2$C$_6$H$_4$CH$_3$, —SO$_2$CF$_3$, —SO$_2$CH$_3$,

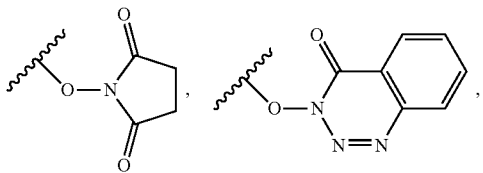

-continued

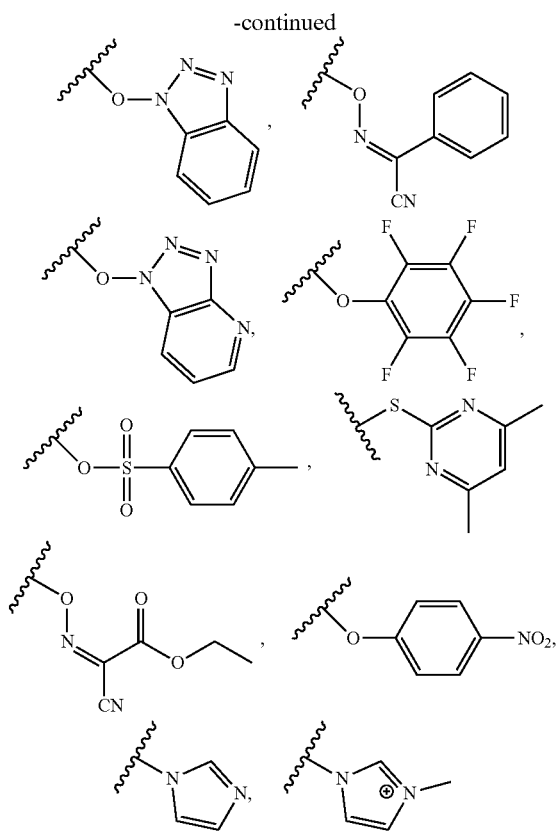

in particular, —Cl,

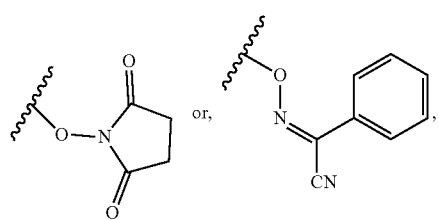 [SMILES: *ON1C(=O)CCC1=O ; *O/N=C(/C#N)c1ccccc1]

more particularly

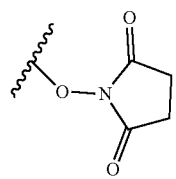

wherein $R^{14}$ is an $C_1$-$C_6$-alkyl-, an arylic- or benzylic substituent.

In certain embodiments, the organic molecule is a compound of formula 5a, 5b, 5c or 5d, particularly 5a or 5c, FA$_x$-Sp$_n$-A          (5a), FA$_x$-Sp$_n$-OH        (5b), FA-A                    (5c), or FA-OH                (5d), wherein FA is a —C(=O)—C$_{1-24}$-alkyl or a —C(=O)—C$_{2-24}$-alkenyl, particularly a —C(=O)—C$_{5-17}$-alkyl or a —C(=O)—C$_{5-17}$-alkenyl, more particularly a —C(=O)—C$_{5-17}$-alkyl, wherein the alkyl or the alkenyl moiety may be unsubstituted or substituted by one or more substituents independently selected from —F and —COOH, Sp is a spacer comprising 2 to 50 atoms in length, optional a terminal —C(=O)— moiety, and x linking moieties independently selected from —NH—, —O—, —S—, wherein the spacer is connected to FA via the linking moiety, x is an integer between 1 and 5, particularly between 1 and 3, n is an integer between 1 and 10, particularly 1 and 4, more particularly 1 and 2, A is selected from: —F, —Cl, —Br, —I, —N$_3$, —O(C=O)CH$_2$(C=O)OH, —SR$^{14}$, —OCF$_3$, —OCH$_2$CF$_3$, —OSO$_2$CF$_3$, —SO$_2$C$_6$H$_4$CH$_3$, —SO$_2$CF$_3$, —SO$_2$CH$_3$,

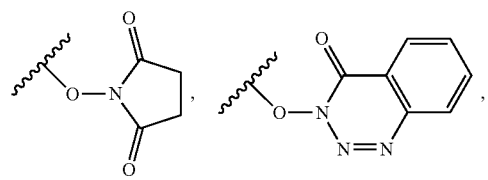

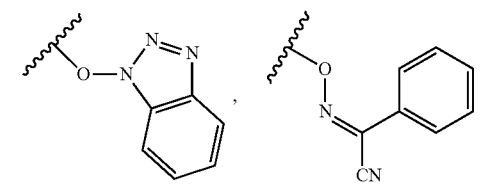

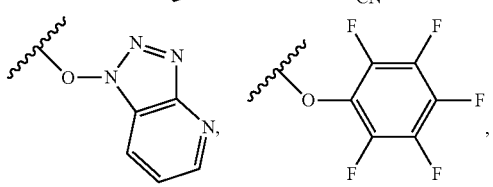

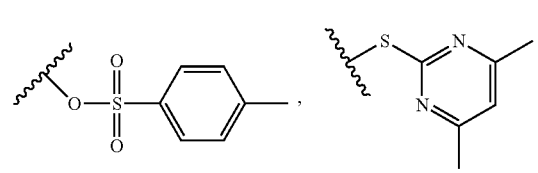

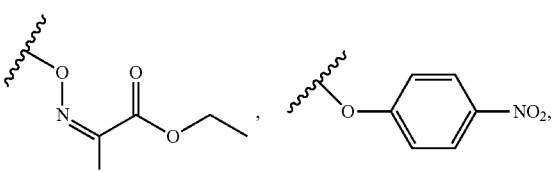

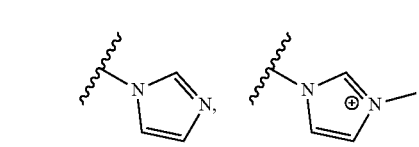

in particular, —Cl, —Br, —I,

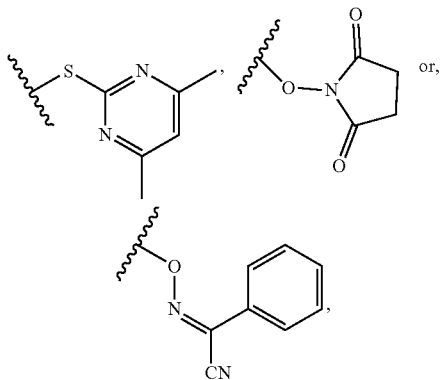

or, more particularly

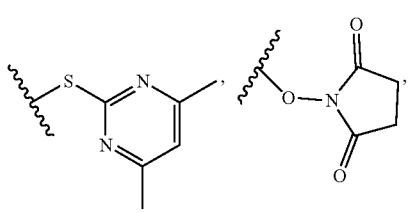

—Cl, —Br, —I, wherein R$^{14}$ is an C$_1$-C$_6$-alkyl-, an arylic- or benzylic substituent.

In certain embodiments, A is

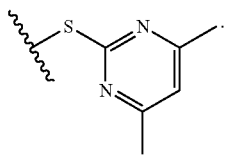

The terminal —C(=O) moiety of the spacer Sp is connected to A or —OH.

The C$_{1-24}$-alkyl moiety and the C$_{2-24}$-alkenyl moiety may be linear or branched. The C$_{2-24}$-alkenyl moiety comprises one or more carbon-carbon double bonds, particularly one carbon-carbon double bond.

In certain embodiments, the alkyl or the alkenyl moiety of FA is linear or branched.

In certain embodiments, the alkyl or alkenyl moiety of FA is linear.

In certain embodiments, FA is derived from palmitic acid, hexanoic acid, octanoic acid, decanoic acid, lauric acid, myristic acid, stearic acid, stearic diacid, perfluoro octanoic acid, perfluoro decanoic acid, perfluoro lauric acid, perfluoro myristic acid, more particularly palmitic acid. As described above, the moiety FA comprises a carbonyl moiety. This carbonyl moiety is derived from the carboxylic acid moiety of the acids described here.

The moiety FA may comprise one or more substituents. For example, the moiety FA may be derived from a perfluoro fatty acid. In this case, the alkyl or the alkenyl moiety of FA is fully substituted by —F. The moiety FA may also be derived from a fatty di-acid. In this case, the terminal methyl moiety (omega carbon) of the alkyl or the alkenyl moiety of FA is substituted by one —COOH moiety.

In certain embodiments, the moiety FA is unsubstituted, the moiety FA is fully substituted by —F or the moiety FA comprises one substituent —COOH.

In certain embodiments, the moiety FA is unsubstituted, the moiety FA is fully substituted by —F or the moiety FA comprises one substituent —COOH at the omega carbon.

In certain embodiments, the moiety FA is unsubstituted or the moiety FA is fully substituted by —F.

In certain embodiments, the moiety FA is unsubstituted or the moiety FA comprises one substituent —COOH, particularly one substituent —COOH at the omega carbon.

In certain embodiments, the moiety FA is unsubstituted or the moiety FA comprises a substitutent —COOH or —COOtBu, particularly —COOtBu.

After purification/modification, the —COOtBu has been removed and the moiety FA is substituted by —COOH.

In certain embodiments, the moiety FA is unsubstituted or the moiety FA comprises a substitutent —COOH or —COOtBu, particularly —COOtBu, at the omega carbon.

In certain embodiments, the moiety FA comprises a substitutent —COOH or —COOtBu, particularly —COOtBu, at the omega carbon.

In certain embodiments, the moiety FA is unsubstituted.

The spacer Sp may be derived from a natural or unnatural amino acid. As described above, the spacer is connected to the moiety FA by an amide bond and also to a further spacer moiety Sp or to the nucleophilic amine of the peptide by an amide bond. The amide bond to the moiety FA is formed by reaction of the N-terminal amine of an amino acid or an amine in the side chain of the amino acid with the carboxylic acid moiety of the fatty acid FA-OH or the activated carboxylic acid moiety of FA-A. The amide bond to a further spacer moiety Sp or to the nucleophilic amine of the peptide is formed by a reaction of the C-terminal carboxylic acid moiety or of a carboxylic acid moiety in the side chain of the amino acid with an amine moiety of a further spacer Sp or the nucleophilic amine of the peptide. Functional groups in the side chain, the N-terminus or the C-terminus of the amino acid may be protected, e.g. a carboxylic acid moiety may be protected by a tert-butyl protecting group.

In certain embodiments, Sp is independently selected from a linear or branched alkyl substituted by 1 to 5, particularly 1 to 3, linking moieties, wherein in particular the linking moiety is —O—, —NH—[C$_r$-alkyl-O]$_s$—C$_t$-alkyl-C(=O)— with r being independently selected from 1, 2 and 3, s being an integer between 1 and 10, particularly 1, 2, 3 or 4, and t being 1, 2 or 3, and an amino acid which may be protected or unprotected, wherein the N-terminus and/or an amine in the side chain is replaced by —NH— and the C-terminus and/or a carboxylic acid moiety in the side chain is replaced by —C(=O)—.

In case of n being larger than 1, the same or different moieties Sp may be combined.

In certain embodiments, the linear or branched alkyl is a C$_{1-12}$ alkyl, particularly a C$_{1-6}$ alkyl, more particularly a C$_{1-3}$ alkyl.

In certain embodiments, Sp is independently selected from
- a linear alkyl substituted by 1 to x linking moieties, wherein in particular the linking moiety is —O—,
- 2-(2-(2-aminoethoxy)ethoxy)acetic acid

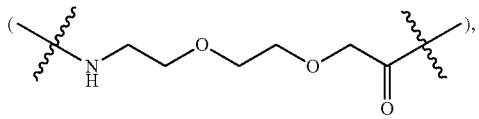 [SMILES: *NCCOCCOCC(*)=O]

alanine, arginine, asparagine, aspartic acid, cysteine, glutamine, glutamic acid, Glu-tBu, glycine, histidine, isoleucine, leucine, lysine, methionine, phenylalanine, proline, serine, threonine, tryptophan, tyrosine, or valine.

In certain embodiments, the linear alkyl is a $C_{1-12}$ alkyl, particularly a $C_{1-6}$ alkyl, more particularly a $C_{1-3}$ alkyl.

In certain embodiments, Sp is independently selected from —O-ethyl-,

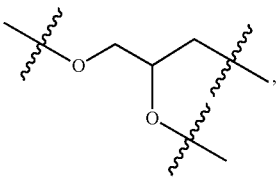 [SMILES: *CC(CO*)O*]

cysteine, glutamic acid, Glu-tBu or 2-(2-(2-Aminoethoxy)ethoxy)acetic acid.

In certain embodiments, Sp is an amino acid which may be protected or unprotected, wherein the N-terminus or an amine in the side chain is replaced by —NH— and the C-terminus or a carboxylic acid moiety in the side chain is replaced by —C(=O)—.

In certain embodiments, Sp is an amino acid selected independently from each other from alanine, arginine, asparagine, aspartic acid, cysteine, glutamine, glutamic acid, Glu-tBu, glycine, histidine, isoleucine, leucine, lysine, methionine, phenylalanine, proline, serine, threonine, tryptophan, tyrosine, valine or 2-(2-(2-Aminoethoxy)ethoxy) acetic acid, in particular glutamic acid, Glu-tBu or 2-(2-(2-Aminoethoxy)ethoxy)acetic acid, wherein the N-terminus or an amine in the side chain is replaced by —NH— and the C-terminus or a carboxylic acid moiety in the side chain is replaced by —C(=O)—.

The amino acid glutamic acid may be protected (Glu-tBu), e.g. the C-terminal carboxylic acid moiety may be protected by a tert-butyl protecting group.

In certain embodiments, n is 1 or 2.

In certain embodiments, n is 1.

In certain embodiments, the organic molecule is selected from $Pam_2$, Pam-Et, $Pam_3Cys$ and $Pam_2$-Et-Cys,

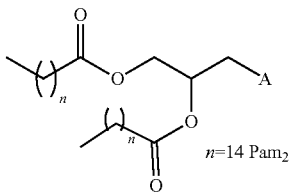

n=14 $Pam_2$

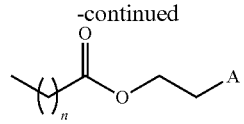

n=14 Pam-Et

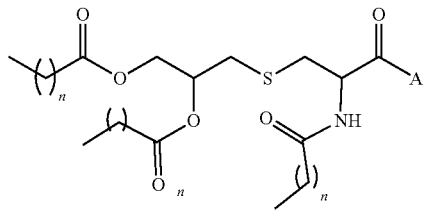

n=14 $Pam_3Cys$

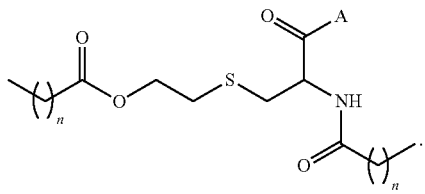

n=14 $Pam_2$-Et-Cys

In certain embodiments, the organic molecule of formula 5a or 5c is coupled to the at least one nucleophilic amine in the modification step in the presence of a non-nucleophilic base.

In certain embodiments, the organic molecule of formula 5b or 5d is coupled to the at least one nucleophilic amine in the modification step in the presence of an activating reactant, particularly in the presence of an activating reactant selected from tetramethylaminium tetra uoroborate (TBTU), (3-(Diethoxy-phosphoryloxy)-1,2,3-benzo[d] triazin-4(3H)-one) (DEPBT), (2-(6-Chloro-1H-benzotriazol-1-yl)-N,N,N',N'-tetramethylaminium hexa uoro-phosphate) (HCTU), tetramethylaminium hexa uorophosphate (HATU), (N-(3-Dimethylaminopropyl)-N'-ethylcar-bodiimide (EDC), Dicyclohexylcarbodiimide (DCC), Ethyl 2-cyano-2-(hydroximino)acetate (Oxyma), 1-Hydroxybenzotriazole (HOBt), 1-Hydroxy-7-aza-1H-benzotriazole (HOAt), NHS and diisopropylcarbodiimide (DIC).

In certain embodiments, the organic molecule of formula 5b or 5d is coupled to the at least one nucleophilic amine in the modification step in the presence of an activating reactant, particularly in the presence of an activating reactant selected from diisopropylcarbodiimide (DIC), (2-(6-Chloro-1H-benzotriazol-1-yl)-N,N,N',N'-tetramethylaminium hexa uorophosphate) (HCTU), and tetramethylaminium hexa uorophosphate (HATU).

Besides lipidation, cyclization is often used to improve in vivo peptide stability and potency: Cyclic peptides are highly resistant to exo- and endoproteases. Due to their more rigid conformation, good binding affinities to desired targets are observed. Cyclization may be achieved by intramolecular disulfide formation or in a two-component system using a scaffold molecule (intermolecular cyclization).

For both cyclization methods, functional groups of the peptide, such as thiol moieties, are utilized.

In certain embodiments, the peptide comprises at least two amino acids comprising a nucleophilic thiol.

In certain embodiments, the peptide comprises 2 to 6 acids comprising a nucleophilic thiol.

In certain embodiments, the peptide comprises 2 amino acids comprising a nucleophilic thiol.

In certain embodiments, the peptide comprises at least two amino acids independently selected from cysteine, homocysteine or penicillamine.

In certain embodiments, the peptide comprises 2 to 6 amino acids independently selected from cysteine, homocysteine or penicillamine.

In certain embodiments, the peptide comprises 2 amino acids independently selected from cysteine, homocysteine or penicillamine.

In the two-component-system (intermolecular cyclization), the functional groups of the peptides are used in reactions with an organic molecule, such as a bridging scaffold. Depending on the number of functional groups in the peptide and the scaffold molecule, mono-, bi- or multicycles can be formed by the peptide and the scaffold molecule. The most common method is to utilize the nucleophilic functional groups of the peptide, in particular thiols, to let it react with scaffolds bearing electrophilic reaction points. Such electrophilic centers can be nucleophilically attacked by thiols.

In certain embodiments, the organic molecule is an organic scaffold molecule comprising a scaffold having at least two electrophilic centers.

The scaffold may be a linear, branched, mono- or polycyclic system, which is aliphatic or aromatic. Particularly more rigid scaffolds such as cyclic systems are suitable for cyclization to maintain the peptide in the desired conformation. The scaffold may comprise heteroatoms, e.g. O, S or N. The scaffold further comprises substituents that form electrophilic centers. For example, a phenyl substituted by two ethyl substituents may form a scaffold and Br substituents at the ethyl moieties form electrophilic centers. The Br substituents are referred to as benzylic Br.

In certain embodiments, the organic molecule is an organic scaffold molecule comprising a scaffold having at least two electrophilic centers, wherein the electrophilic center is formed by halogen substituents and/or Michael acceptors.

In certain embodiments, the electrophilic center is formed by at least two benzylic halogen substituents, at least two acrylamides or at least two acryl ester.

In certain embodiments, the electrophilic center is formed by at least two acrylamides or at least two benzylic halogen substituents.

In certain embodiments, the organic molecule is selected from m-Xylylene dibromide (mDBX), 1,4-Bis(bromomethyl)benzene, 1,3,5-Tris(bromomethyl) benzene (TBMB), N,N'-bis(chloroacetyl)-1,2-ethylenediamine, N,N'-bis(chloroacetyl)-1,3-propylenediamine, N,N'((ethane-1,2-diylbis(oxy))bis(ethane-2,1-diyl))bis(2-chloroacetamide), N,N'-bis(bromoacetyl)-1,2-ethylenediamine, N,N'-bis(bromoacetyl)-1,3-propylenediamine, N,N'-((ethane-1,2-diylbis(oxy))bis(ethane-2,1-diyl))bis(2-bromoacetamide), 1,3,5-Triacryloyl-1,3,5-triazinan (TATA), 1,1',1"-(1,3,5-Triazinan-1,3,5-triyl)tris(2-bromoethanon) (TATB), N,N',N"-(benzene-1,3,5-triyl)-tris(2-bromoacetamide) (TBAB), N,N',N"-benzene-1,3,5-triyltrisprop-2-enamide (TAAB), 2,4,6-tris(bromomethyl)-s-triazine (TBMT), N,N',N"-(Nitrilotris(ethane-2,1-diyl))triacrylamide, N,N',N"-(Nitrilotris(ethane-2,1-diyl))tris(2-chloroacetamide), N,N',N"-(Nitrilotris(ethane-2,1-diyl))tris(2-bromoacetamide), N,N',N"-(Nitrilotris(ethane-2,1-diyl))triethenesulfonamide, N,N',N"-((1,3,5-Triazinane-1,3,5-triyl)tris(2-oxoethane-2,1-diyl))triacrylamide, N,N',N"-((1,3,5-Triazinane-1,3,5-triyl)tris(2-oxoethane-2,1-diyl))tris(2-chloroacetamide), N,N',N"-((1,3,5-Triazinane-1,3,5-triyl)tris(2-oxoethane-2,1-diyl))triethenesulfonamide, N,N',N"-(Benzene-1,3,5-triyltris(methylene))triacrylamide, N,N',N"-(Benzene-1,3,5-triyltris(methylene))tris(2-chloroacetamide), N,N',N"-(Benzene-1,3,5-triyltris(methylene))triethenesulfonamid, Tri(2-hydroxyethyl)isocyanurate triacrylate, 1,3,5-Tris(oxiran-2-ylmethyl)-1,3,5-triazinane-2,4,6-trione.

In certain embodiments the organic molecule is selected from m-Xylylene dibromide (mDBX), 1,3,5-Tris(bromomethyl) benzene (TBMB), Triazane, 1,3,5-Triacryloyl-1,3,5-triazinan (TATA), 1,1',1"-(1,3,5-Triazinan-1,3,5-triyl)tris(2-bromoethanon) (TATB).

In certain embodiments the organic molecule is selected α,α'-Dibromo-m-xylene (mDBX), 1,3,5-Tris(bromomethyl) benzene (TBMB), Triazane, 1,3,5-Triacryloyl-1,3,5-triazinan (TATA), 1,1',1"-(1,3,5-Triazinan-1,3,5-triyl)tris(2-bromoethanon) (TATB).

In the two-component-system (intermolecular cyclization), the nucleophilic thiol is obtained in a reducing step. Subsequently, the nucleophilic thiol attacks the electrophilic center in the organic scaffold molecule in a cyclization step.

In certain embodiments, the modification step comprises a reducing step followed by a cyclisation step, wherein
  the immobilized linker-tagged peptide S-L-P is treated with a reducing agent, particularly Dithiothreitol (DTT) or Tris-(2-carboxyethyl)-phosphin (TCEP), in the reducing step, and
  the organic scaffold molecule is coupled to the at least two nucleophilic thiols under basic conditions in the cyclisation step.

The cyclization step is performed under basic conditions to deprotonate the nucleophilic thiol.

In certain embodiments, the cyclization step is performed at pH ≥8.

In certain embodiments, the cyclization step is performed in the presence of $Na_2CO_3$, $NaHCO_3$, $NH_4HCO_3$, Guanidinhydrochlorid (GdmCl), Di-isopropylethylamine (DIPEA), Triethylamine ($NEt_3$) or N-methyl-morpholine (NMM).

In certain embodiments, the cyclization step is performed in the presence of $NH_4HCO_3$, Guanidinhydrochlorid (GdmCl), Di-isopropylethylamine (DIPEA), Triethylamine ($NEt_3$) or N-methyl-morpholine (NMM).

Cyclization may also be achieved by intramolecular disulfide bond formation. For example, the thiol moieties of two cysteine residues in the peptide may form a disulfide.

In certain embodiments, the number of nucleophilic thiols is even, and the nucleophilic thiols are oxidized by basic aqueous solutions with a pH >7 in the modification step to yield macrocyclic bridged peptides.

In certain embodiments, the nucleophilic thiols are oxidized by basic aqueous solutions with a pH >7 and/or in the presence of air (particularly in the presence of oxygen), and/or or in the presence of an oxidative additive, in particular selected from DMSO, iodine, N-chlorosuccinimide, $Tl(OAc)_3$, $Tl(CF_3COO)_3$, $CH_3SiCl_3$-Ph(SO)Ph, [Pt(ethylenediamine)$_2Cl_2$]$Cl_2$, 2,2'-Dithiobis(5-nitropyridine), 5,5'-dithiobis-(2-nitrobenzoic acid), trans-[Pt—$(CN)_4Cl_2$]$^{2-}$, glutathione-glutathione disulfide, $K_3Fe(CN)_6$.

The oxidative additives may be used as such or solved in a suitable solvent. The oxidation may be performed in organic, organic-aqueous, acidic or basic solutions.

In certain embodiments, the nucleophilic thiols are oxidized in the presence of air (particularly in the presence of oxygen), or in the presence of an oxidative additive, in particular selected from DMSO, iodine, N-chlorosuccinimide, $Tl(OAc)_3$, $Tl(CF_3COO)_3$, $CH_3SiCl_3$-Ph(SO)Ph, [Pt(ethylenediamine)$_2Cl_2$]$Cl_2$, 2,2'-Dithiobis(5-nitropyridine), 5,5'-dithiobis-(2-nitrobenzoic acid), trans-[Pt—$(CN)_4Cl_2$]$^{2-}$, glutathione-glutathione disulfide, $K_3Fe(CN)_6$.

In certain embodiments, the nucleophilic thiols are oxidized in the presence of DMSO, iodine, N-chlorosuccinimide, Tl(OAc)$_3$, [Pt(ethylenediamine)$_2$Cl$_2$]Cl$_2$, trans-[Pt—(CN)$_4$Cl$_2$]$^{2-}$, glutathione.

In certain embodiments, the nucleophilic thiols are oxidized in the presence of air (oxygen), DMSO, iodine, N-chlorosuccinimide, Tl(OAc)$_3$, Tl(CF$_3$COO)$_3$, CH$_3$SiCl$_3$-Ph(SO)Ph, [Pt(ethylenediamine)$_2$Cl$_2$]Cl$_2$, 2,2'-Dithiobis(5-nitropyridine), 5,5'-dithiobis-(2-nitrobenzoic acid), trans-[Pt—(CN)$_4$Cl$_2$]$^{2-}$, glutathione-glutathione disulfide, K$_3$Fe(CN)$_6$.

In certain embodiments, the nucleophilic thiols are oxidized in the presence of DMSO, iodine, N-chlorosuccinimide, Tl(OAc)$_3$, [Pt(ethylenediamine)$_2$Cl$_2$]Cl$_2$, trans-[Pt—(CN)$_4$Cl$_2$]$^{2-}$, glutathione.

In certain embodiments, the nucleophilic thiols are oxidized in the presence of N-Chlorosuccinimide, DMSO and glutathione-glutathione disulfide.

In certain embodiments, the nucleophilic thiols are oxidized in the presence of N-Chlorosuccinimide, DMSO and glutathione.

In certain embodiments,
X is selected from a moiety of formula 2, 2a, 3, 3a or 4, in particular of formula 2, 2a, 3 or 3a, more particularly of formula 2 or 2a,

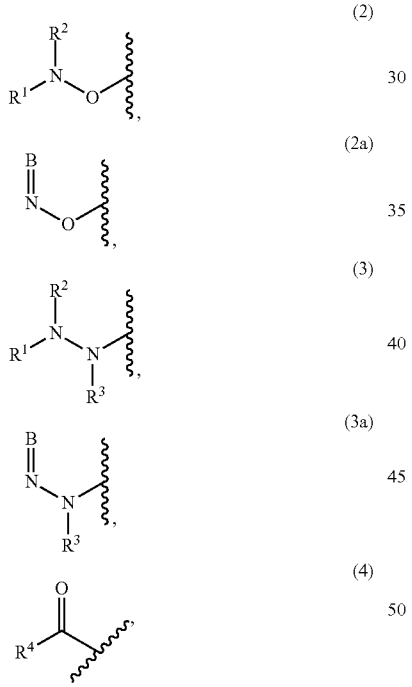

wherein
each $R^1$ and $R^2$ is independently from each other selected from H or B, wherein at least $R^1$ or $R^2$ is B,
$R^3$ is selected from H or B,
$R^4$ is selected from H, $C_1$-$C_{12}$-alkyl or aryl, wherein the aldehyde or keto group may be protected by an acid labile protecting group,
B is an acid labile amine protecting group,
T is a linear or branched spacer comprising at least one, particularly 1 to 5, of the moieties —$C_{1-12}$-alkyl-, (—$C_2H_4O$—)$_{1-12}$, —C(=O)—, —C(=O)—, -JR$^9$—, -JR$^9$—C(=O)—, -JR$^9$—, phenyl, 5- or 6-membered heteroaryl, wherein J is C or N, in particular N,
in particular T is a spacer selected from
—$C_1$-$C_{12}$-alkyl-, in particular $C_{1-6}$-alkyl, more particularly $C_{1-3}$-alkyl, —$R^5$—C(=O)—, —$R^5$—C(=O)—NR$^9$—R$^6$—, —$R^5$—C(=O)—NR$^9$—, —C(=O)—NR$^9$—R$^6$—, —$R^5$—NR$^9$—C(=O)—R$^6$—, —$R^5$—NR$^9$—R$^{5'}$—NR$^{9'}$C(=O)—R$^6$—, —$R^5$—C(=O)—NR$^9$—R$^{5'}$—NR$^{9'}$—C(=O)—R$^6$—, —$R^5$—NR$^9$—, —$R^5$—NR$^9$—R$^6$—, —$R^5$—NR$^9$—R$^{5'}$—NR$^{9'}$—R$^6$—, —$R^5$—C(=O)—NR$^9$—R$^{5'}$—NR$^{9'}$—R$^6$—, —$R^5$—C(=O)—O—R$^6$—, —C(=O)—O—R$^6$—, —$R^5$-phenyl-R$^6$—, —$R^5$-phenyl-, -phenyl-R$^6$—, -phenyl-, —$R^5$-pyrroyl, —$R^5$-pyrazoyl, —$R^5$-imidazoyl, $R^5$-piperazinyl-, —$R^5$-pyridinyl, —$R^5$-pyrimidinyl, —$R^5$-pyrazinyl, —$R^5$-pyridazinyl, —$R^5$-pyrroyl-R$^6$—, —$R^5$-pyrazoyl-R$^6$—, —$R^5$-imidazoyl-R$^6$—, —$R^5$-piperazinyl-R$^6$—, —$R^5$-pyridinyl-R$^6$—, —$R^5$-pyrimidinyl-R$^6$—, —$R^5$-pyrazinyl-R$^6$—, —$R^5$-pyridazinyl-R$^6$—, pyrroyl-R$^6$—, pyrazoyl-R$^6$—, imidazoyl-R$^6$-piparazinyl-R$^6$—, pyridinyl-R$^6$—, pyrimidinyl-R$^6$—, pyrazinyl-R$^6$—, pyridazinyl-R$^6$—, pyrroyl, pyrazoyl, imidazoyl, piperazinyl, pyridinyl, pyrimidinyl, pyrazinyl and pyridazinyl, wherein
$R^5$, $R^{5'}$ and $R^6$ are independently from each other selected from $C_1$-$C_{12}$-alkyl or (—$C_2H_4O$—)$_{1-12}$, in particular $C_1$-$C_6$ alkyl, particularly $C_1$-$C_3$ alkyl, and wherein
$R^9$ and $R^{9'}$ are independently from each other selected from H, $C_{1-4}$-alkyl, —$C_{1-6}$-alkyl-NH$_2$, —$C_{1-6}$-alkyl-NHB, —$C_{1-6}$-alkyl-NB$_2$, —$R^{15}$, —$C_{1-6}$-alkyl-R$^{15}$, —$C_{1-6}$-alkyl-NH—$R^{15}$, in particular from H and $C_{1-2}$-alkyl, more particularly $R^9$ is H, wherein
B is an independently selected acid labile amine protecting group,
$R^{15}$ is a blocking agent that is able to react with an aldehyde moiety, in particular $R^{15}$ is selected from cysteinyl, threoninyl, 2-mercaptoethanol, cysteamine, ethandithiole, hydroxylamine, O-methylhydroxylamine, N-methylhydroxylamine, dithiothreitol, hydrazine, in particular cysteinyl and N-methylhydroxylamine, more particularly cysteinyl, wherein amine and/or thiol moieties of the blocking agent may be protected by an independently selected acid labile amine protecting group B, particularly Boc, and/or an acid labile thiol protecting group, particularly trityl,
b is 0 or 1, in particular 1,
V is an electron-withdrawing moiety selected from —NR$^{11}$—C(=O)—, —C(=O)—NR$^{11}$—, —S(=O)—, —NR$^{12}$—(CH$_2$)$_p$—, -piperazinyl-(CH$_2$)$_p$—, -pyridinyl, pyrimidinyl, pyrazinyl, pyridazinyl,

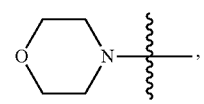

—C(=O)—, —C(=O)—O—, in particular —NR$^{11}$—C(=O)—, —C(=O)—NR$^{11}$—, —S(=O)—, —NR$^{12}$—(CH$_2$)$_p$—, -piperazinyl-(CH$_2$)$_p$—, -pyridinyl-, pyrimidinyl, more particularly from —NH—C(=O)—, —C(=O)—NH—, —N—(CH$_3$)—, -piperazinyl-(CH$_2$)$_p$—, -pyridinyl-, pyrimidinyl, wherein R[11] is selected from H and $C_{1-4}$-alkyl, in particular from H and $C_{1-2}$-alkyl, more particularly R[11] is H, R[12] is selected from H and $C_{1-4}$-alkyl, in particular from H and $C_{1-2}$-alkyl, more particularly R[12] is methyl, p is 0, 1 or 2, particularly 0 or 1, a is 0 or 1, wherein the sum of a and b is 1 or 2, U is a phenyl or a five- or six-membered heteroaryl moiety, in particular a phenyl or a six-membered heteroaryl moiety, more particularly a phenyl, that is bound to at least one of the moieties V, $W_q$ and $E_n$ and that may optionally be substituted by $C_{1-6}$-alkyl, in particular $C_{1-3}$-alkyl, wherein V is defined as described above, W is selected from —$N_3$, —$NO_2$, —S(=O)—R[8], —S—S—R[8], —O—$CH_2$—$N_3$, —O—C(=O)—O—$CH_2$—$N_3$, —N=N-phenyl, —N=N—R[8],

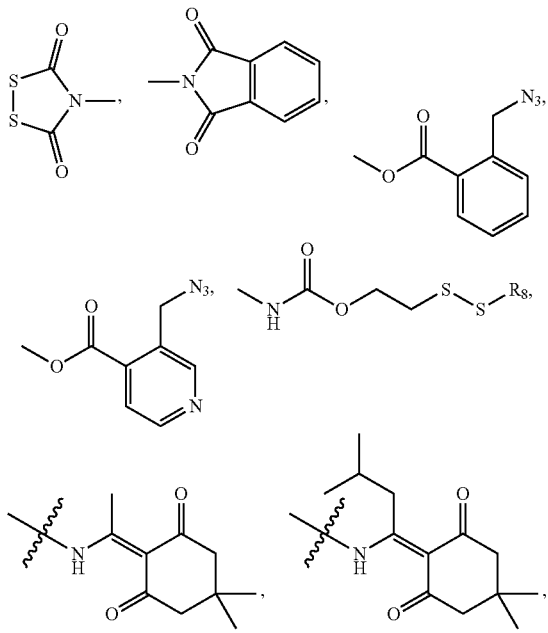

in particular —$N_3$, —N=N—R[8], —O—$CH_2$—$N_3$, —S—S—R[8], wherein

R[8] is pyridyl, pyrimidinyl, pyrazinyl, pyridazyl, —$C_1$-$C_6$-alkyl or —$(CH_2)_p$—$NMe_2$, in particular pyridyl or —$C_1$-$C_6$-alkyl, with p being 1, 2, 3 or 4, E is an electron withdrawing group under acidic conditions, n is an integer between 0 and 4, in particular 0 and 2, more particularly 0 or 1, and q is an integer between 0 and 4, in particular 0 and 2, more particularly 0 and 1, wherein the sum of n and q is equal or lower than 4, and wherein in case of U being a phenyl moiety and Y being —$(CH_2)_m$—O—C(=O)—, the sum of Hammett constants of V, W, E under acidic conditions is larger than 0.45, and wherein W is in ortho or para position in relation to Y, Y is —$(CH_2)_m$—C(=O)— or —$(CH_2)_m$—O—C(=O)— with m being 1, 2 or 3, in particular 1 or 2, more particularly 1, Z is an electron-withdrawing leaving group.

In certain embodiments, q is an integer between 1 and 4, in particular 1 and 2, more particularly q is 1.

In certain embodiments, E is selected from piperidinyl, piperazinyl, pyridyl, pyrimidinyl, pyrazinyl, pyridazyl, —$N(C_2H_4)_2NH_2$, —$N(C_2H_4)_2N$—B, —N=N-phenyl, —N=N—R[8], —$(CH_2)_r$—NH—$C_{1-6}$-alkyl, —$(CH_2)_r$—N$(C_{1-6}$-alkyl$)_2$-, —F, —Cl, —Br, —I, —CN, —$NO_2$, —$N_3$, —$CF_3$, —$SO_3H$, —$CO_2H$, —C(=O)$NH_2$, —$SO_2Me$, —SOMe, —$SO_2Et$, —SOEt, in particular pyridyl, pyrimidinyl, pyrazinyl, pyridazinyl, —N=N-phenyl, —N=N—R[8], —F, —Cl, —Br, —I, —CN, —$NO_2$, —$N_3$, —$CF_3$, —$SO_3H$, —$CO_2H$, more particularly pyridyl, pyrimidinyl, pyridazinyl or —Br with R[8] being pyridyl, pyrimidinyl, pyrazinyl, pyridazyl, —$C_1$-$C_6$-alkyl or —$(CH_2)_p$—$NMe_2$, in particular pyridyl or —$C_1$-$C_6$-alkyl, with p being 1, 2, 3 or 4, B being an acid labile amine protecting group, and r being 0, 1, 2, 3 or 4, particularly 0, 1 or 2.

In certain embodiments,

X is selected from a moiety of formula 2, 2a, 3, 3a or 4, in particular of formula 2, 2a, 3 or 3a, more particularly of formula 2 or 2a,

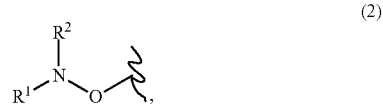

(2)

(2a)

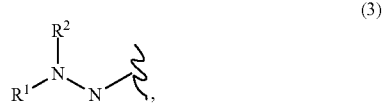

(3)

(3a)

(4)

wherein each R[1] and R[2] is independently from each other selected from H or B, wherein at least R[1] or R[2] is B, R[3] is selected from H or B, R[4] is selected from H, $C_1$-$C_{12}$-alkyl or aryl, wherein the aldehyde or keto group may be protected by an acid labile protecting group, B is an acid labile amine protecting group, T is a linear or branched spacer comprising at least one of the moieties —$C_{1-12}$-alkyl-, (—$C_2H_4O$—)$_{1-12}$, —C(=O)—, —C(=O)-$JR^9$—, -$JR^9$—C(=O)—, -$JR^9$—, wherein J is C or N, in particular N, in particular T is a spacer selected from —$C_1$-$C_{12}$-alkyl-, in particular —$C_{1-6}$-alkyl-, more particularly —$C_{1-3}$-alkyl-, —$R^5$—C(=O)—, —$R^5$—C(=O)—$NR^9$—$R^6$—, —$R^5$—C(=O)—$NR^9$—, —C(=O)—$NR^9$—$R^6$—, —$R^5$—$NR^9$—C(=O)—

$R^6$—, —$R^5$—$NR^9$—$R^{5'}$—$NR^{9'}$C(=O)—$R^6$—, —$R^5$—C(=O)—$NR^9$—$R^{5'}$—$NR^{9'}$—C(=O)—$R^6$—, —$R^5$—$NR^9$—, —$R^5$—$NR^9$—$R^6$—, —$R^5$—$NR^9$—$R^{5'}$—$NR^{9'}$—$R^6$—, —$R^5$—C(=O)—$NR^9$—$R^{5'}$—$NR^{9'}$—$R^6$—, —$R^5$—C(=O)—O—$R^6$—, —C(=O)—O—$R^6$—, —$R^5$-phenyl-$R^6$—, —$R^5$-phenyl-, -phenyl-$R^6$—, -phenyl-, wherein $R^5$, $R^{5'}$ and $R^6$ are independently from each other selected from $C_1$-$C_{12}$-alkyl or (—$C_2H_4O$—)$_{1-12}$, in particular $C_1$-$C_6$ alkyl, particularly $C_1$-$C_3$ alkyl, and wherein $R^9$ and $R^{9'}$ are independently from each other selected from H, $C_{1-4}$-alkyl, —$C_{1-6}$-alkyl-$NH_2$, —$C_{1-6}$-alkyl-NHB, —$C_{1-6}$-alkyl-$NB_2$, —$R^{15}$, —$C_{1-6}$-alkyl-$R^{15}$, —$C_{1-6}$-alkyl-NH—$R^{15}$, in particular from H and $C_{1-2}$-alkyl, more particularly $R^9$ is H, wherein B is an independently selected acid labile amine protecting group, $R^{15}$ is a blocking agent that is able to react with an aldehyde moiety, in particular $R^{15}$ is selected from cysteinyl, threoninyl, 2-mercaptoethanol, cysteamine, ethandithiole, hydroxylamine, O-methylhydroxylamine, N-methylhydroxylamine, dithiothreitol, hydrazine, in particular cysteinyl and N-methylhydroxylamine, more particularly cysteinyl, wherein amine and/or thiol moieties of the blocking agent may be protected by an independently selected acid labile amine protecting group B, particularly Boc, and/or an acid labile thiol protecting group, particularly trityl.

b is 0 or 1, in particular 1,

V is an electron-withdrawing moiety selected from —$NR^{11}$—C(=O)—, —C(=O)—$NR^{11}$—, —S(=O)—, —$NR^{12}$—, -piperazinyl-, -pyridinyl, pyrimidinyl, pyrazinyl, pyridazinyl,

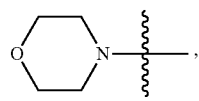

—C(=O)—, —C(=O)—O—, in particular —$NR^{11}$—C(=O)—, —C(=O)—$NR^{11}$—, —S(=O)—, —$NR^{12}$—, -piperazinyl-, -pyridinyl-, pyrimidinyl, more particularly from —NH—C(=O)—, —C(=O)—NH—, —N—($CH_3$)—, -piperazinyl-, -pyridinyl-, pyrimidinyl, wherein $R^{11}$ is selected from H and $C_{1-4}$-alkyl, in particular from H and $C_{1-2}$-alkyl, more particularly $R^{11}$ is H, $R^{12}$ is selected from H and $C_{1-4}$-alkyl, in particular from H and $C_{1-2}$-alkyl, more particularly $R^{12}$ is methyl, a is 0 or 1, wherein the sum of a and b is 1 or 2, U is a phenyl or a five- or six-membered heteroaryl moiety, in particular a phenyl or a six-membered heteroaryl moiety, more particularly a phenyl, that is bound to at least one of the moieties V, $W_q$ and $E_n$, and that may optionally be substituted by $C_{1-6}$-alkyl, in particular $C_{1-3}$-alkyl, wherein V is defined as described above, W is selected from —$N_3$, —S(=O)—$R^8$, —S—S—$R^8$, —O—$CH_2$—$N_3$, —O—C(=O)—O—$CH_2$—$N_3$, —N=N-phenyl, —N=N—$R^8$,

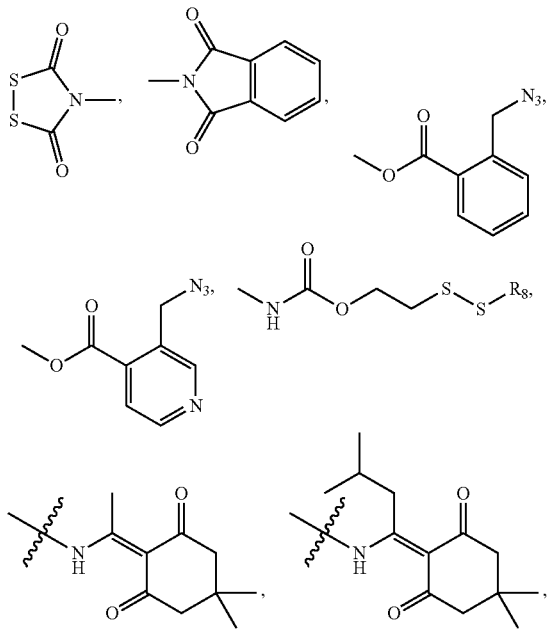

in particular —$N_3$, —N=N—$R^8$, —O—$CH_2$—$N_3$, —S—S—$R^8$, wherein $R^8$ is pyridyl, pyrimidinyl, pyrazinyl, pyridazyl, —$C_1$-$C_6$-alkyl or —($CH_2$)$_p$—$NMe_2$, in particular pyridyl or —$C_1$-$C_6$-alkyl, with p being 1, 2, 3 or 4, E is an electron withdrawing group under acidic conditions, n being is an integer between 0 and 4, in particular 0 and 2, more particularly 0 or 1, and q is an integer between 0 and 4, in particular 0 and 2, more particularly 0 and 1, wherein the sum of n and q is equal or lower than 4, and wherein in case of U being a phenyl moiety and Y being —($CH_2$)$_m$—O—C(=O)—, the sum of Hammett constants of V, W, E under acidic conditions is larger than 0.45, Y is —($CH_2$)$_m$—C(=O)— or —($CH_2$)$_m$—O—C(=O)— with m being 1, 2 or 3, in particular 1 or 2, more particularly 1, Z is an electron-withdrawing leaving group.

In certain embodiments,

X is selected from a moiety of formula 2, 2a, 3, 3a or 4, in particular of formula 2, 2a, 3 or 3a, more particularly of formula 2 or 2a,

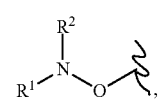 (2)

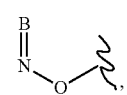 (2a)

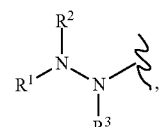 (3)

-continued (3a)

(4)

wherein
each $R^1$ and $R^2$ is independently from each other selected from H or B, wherein at least $R^1$ or $R^2$ is B,
$R^3$ is selected from H or B,
$R^4$ is selected from H, $C_1$-$C_{12}$-alkyl or aryl, wherein the aldehyde or keto group may be protected by an acid labile protecting group,
B is an acid labile amine protecting group,
T is a spacer selected from
—$C_1$-$C_{12}$-alkyl-, in particular $C_{1-6}$-alkyl, more particularly $C_{1-3}$-alkyl, —$R^5$—C(=O)—, —$R^5$—C(=O)—$NR^9$—$R^6$—, —$R^5$—C(=O)—$NR^9$—, —C(=O)—$NR^9$—$R^6$—, —$R^5$—$NR^9$—C(=O)—$R^6$—, —$R^5$—$NR^9$—$R^{5'}$—$NR^{9'}$C(=O)—$R^6$—, —$R^5$—C(=O)—$NR^9$—$R^{5'}$—$NR^{9'}$—C(=O)—$R^6$—, —$R^5$—C(=O)—O—$R^6$—, —C(=O)—O—$R^6$—, —$R^5$-phenyl-$R^6$—, —$R^5$-phenyl-, -phenyl-$R^6$—, -phenyl-, wherein
$R^5$, $R^{5'}$ and $R^6$ are independently from each other selected from $C_1$-$C_{12}$-alkyl, in particular $C_1$-$C_6$ alkyl, particularly $C_1$-$C_3$ alkyl, and wherein $R^9$ and $R^{9'}$ are independently from each other selected from H and $C_{1-4}$-alkyl, in particular from H and $C_{1-2}$-alkyl, more particularly $R^9$ is H,
b is 0 or 1, in particular 1,
V is an electron-withdrawing moiety selected from —$NR^{11}$—C(=O)—, —C(=O)—$NR^{11}$—, —S(=O)—, —$NR^{12}$—, -piperazinyl-, -pyridinyl, pyrimidinyl, pyrazinyl, pyridazinyl, C(=O)—, —C(=O)—O—, in particular —$NR^{11}$—C(=O)—, —C(=O)—$NR^{11}$—, S(=O)—, —$NR^{12}$—, -piperazinyl-, -pyridinyl-, pyrimidinyl, more particularly from —NH—C(=O)—, —C(=O)—NH—, —N—(CH$_3$)—, -piperazinyl-, -pyridinyl-, pyrimidinyl, wherein
$R^{11}$ is selected from H and $C_{1-4}$-alkyl, in particular from H and $C_{1-2}$-alkyl, more particularly $R^{11}$ is H,
$R^{12}$ is selected from H and $C_{1-4}$-alkyl, in particular from H and $C_{1-2}$-alkyl, more particularly $R^{12}$ is methyl,
a is 0 or 1, wherein the sum of a and b is 1 or 2,
U is a phenyl or a five- or six-membered heteroaryl moiety, in particular a phenyl or a six-membered heteroaryl moiety, more particularly a phenyl, that is bound to at least one of the moieties V, $W_q$ and $E_n$ and that may optionally be substituted by $C_{1-6}$-alkyl, in particular $C_{1-3}$-alkyl, wherein V is defined as described above,
W is selected from —$N_3$, —S(=O)—$R^8$, —S—S—$R^8$, —O—CH$_2$—$N_3$, —O—C(=O)—O—CH$_2$—$N_3$, —N=N-phenyl, —N=N—$R^8$, in particular —$N_3$, —N=N—$R^8$, —O—CH$_2$—$N_3$, —S—S—$R^8$, wherein
$R^8$ is pyridyl, pyrimidinyl, pyrazinyl, pyridazyl, —$C_1$-$C_6$-alkyl or —(CH$_2$)$_p$—NMe$_2$, in particular pyridyl or —$C_1$-$C_6$-alkyl, with p being 1, 2, 3 or 4,
E is an electron withdrawing group under acidic conditions,
n being is an integer between 0 and 4, in particular 0 and 2, more particularly 0 or 1, and q is an integer between 0 and 4, in particular 0 and 2, more particularly 0 and 1, wherein the sum of n and q is equal or lower than 4, and wherein
in case of U being a phenyl moiety and Y being —(CH$_2$)$_m$—O—C(=O)—, the sum of Hammett constants of V, W, E under acidic conditions is larger than 0.45,
Y is —(CH$_2$)$_m$—C(=O)— or —(CH$_2$)$_m$—O—C(=O)— with m being 1, 2 or 3, in particular 1 or 2, more particularly 1,
Z is an electron-withdrawing leaving group.
In certain embodiments,
X is selected from a moiety of formula 2, 2a, 3, 3a or 4, in particular of formula 2, 2a, 3 or 3a, more particularly of formula 2 or 2a, most particularly from 2, (2)

(2a)

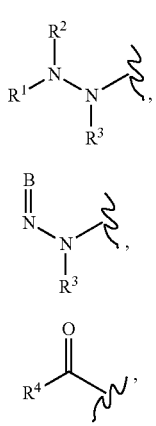

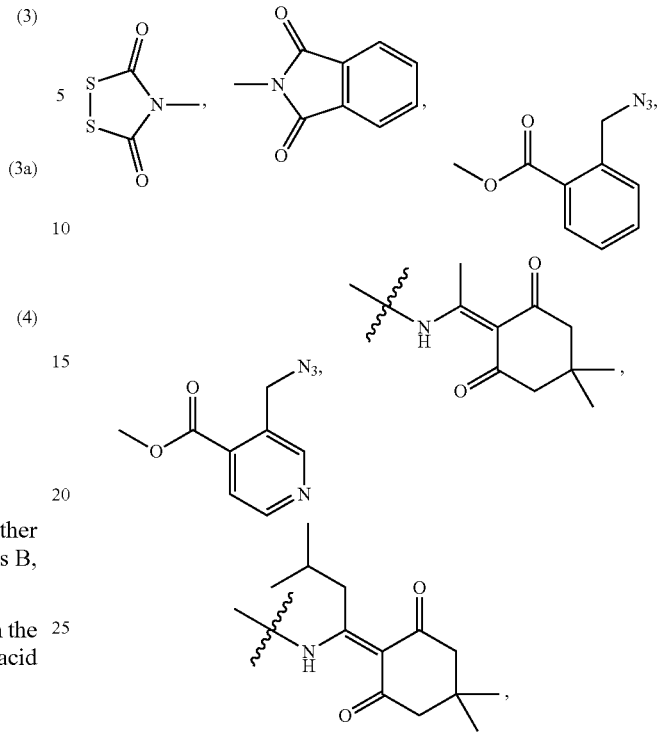

wherein each $R^1$ and $R^2$ is independently from each other selected from H or B, wherein at least $R^1$ or $R^2$ is B, $R^3$ is selected from H or B, $R^4$ is selected from H, $C_1$-$C_{12}$-alkyl or aryl, wherein the aldehyde or keto group may be protected by an acid labile protecting group, B is an acid labile amine protecting group, T is a spacer selected from
—$C_1$-$C_{12}$-alkyl-, in particular $C_{1-6}$-alkyl, more particularly $C_{1-3}$-alkyl, —$R^5$—C(=O)—$NR^9$—$R^6$—, —C(=O)—$NR^9$—$R^6$—, —$R^5$—$NR^9$—$R^5$—$NR^9$C(=O)—$R^6$—, —$R^5$—$NR^9$—C(=O)—$R^6$—, —$R^5$—C(=O)—O—$R^6$—, —C(=O)—O—$R^6$—, —$R^5$-phenyl-$R^6$—, —$R^5$-phenyl-, -phenyl-$R^6$—, -phenyl-, wherein $R^5$ and $R^6$ are independently from each other selected from $C_1$-$C_{12}$-alkyl, in particular $C_1$-$C_6$ alkyl, particularly $C_1$-$C_3$ alkyl, and wherein $R^9$ is selected from H and $C_{1-4}$-alkyl, in particular from H and $C_{1-2}$-alkyl, more particularly $R^9$ is H, b is 0 or 1, in particular 1, V is an electron-withdrawing moiety selected from —$NR^{11}$—C(=O)—, —C(=O)—$NR^{11}$—, —S(=O)—, —$NR^{12}$—, -pyridinyl, pyrimidinyl, pyrazinyl, pyridazyl, —C(=O)—, —C(=O)—O—, in particular —$NR^{11}$—C(=O)—, S(=O)—, —$NR^{12}$—, -pyridinyl-, pyrimidinyl, wherein $R^{11}$ is selected from H and $C_{1-4}$-alkyl, in particular from H and $C_{1-2}$-alkyl, more particularly $R^{11}$ is H, $R^{12}$ is selected from H and $C_{1-4}$-alkyl, in particular from H and $C_{1-2}$-alkyl, more particularly $R^{12}$ is methyl, a is 0 or 1, wherein the sum of a and b is 1 or 2, U is a phenyl or a five- or six-membered heteroaryl moiety, in particular a phenyl or a six-membered heteroaryl moiety, that is bound to at least one of the moieties V, W and E, wherein V is defined as described above, W is selected from —$N_3$, —S(=O)—$R^8$, —$SSR^8$, —$OCH_2N_3$, —OC(=O)$OCH_2$—$N_3$, —N=N-phenyl, —N=N-pyridine, wherein $R^8$ is pyridyl, pyrimidinyl, pyrazinyl, pyridazyl, —$C_1$-$C_6$-alkyl or —$(CH_2)_p$—$NMe_2$ with p being 1, 2, 3 or 4, E is selected from pyridyl, pyrimidinyl, pyrazinyl, pyridazyl, —F, —Cl, —Br, —I, —CN, —$NO_2$, —$N_3$, —$CF_3$, —$SO_3H$, —$CO_2H$, —C(=O)$NH_2$, —$SO_2Me$, —SOMe, —$SO_2Et$, —SOEt, in particular pyridyl, pyrimidinyl, pyrazinyl, pyridazyl, —F, —Cl, —Br, —I, —CN, —$NO_2$, —$N_3$, —$CF_3$, —$SO_3H$, —$CO_2H$, with $R^{13}$ being selected from —F, —Cl, —Br, —I, —$PF_6$, and wherein in case of U being a phenyl moiety and Y being —$(CH_2)_m$—O—C(=O)—, the sum of Hammett constants of V, W, E under acidic conditions is larger than 0.45, Y is —$(CH_2)_m$—C(=O)— or —$(CH_2)_m$—O—C(=O)— with m being 1, 2 or 3, in particular 1 or 2, more particularly 1, Z is an electron-withdrawing leaving group.

In certain embodiments, X is selected from a moiety of formula 2 or 3.

In certain embodiments, X is selected from a moiety of formula 2.

The reaction time required for the coupling of the moiety X to a functionalized solid phase by formation of a hydrazone or oxime bond is longer when a linker with a moiety of formula 4 is used and shorter when a linker with a moiety of formula 2 or 3 is used. The formation of the hydrazone bond between an aldehyde or ketone moiety of a solid support and a moiety X of formula 3 is reversible. Due to this reversibility, the inventors observed up to approximately 10% loss of peptide material after each washing step during purification. In contrast to this, almost no loss of peptide material was observed when a linker with a moiety of formula 2 was used.

In certain embodiments, U is substituted by $C_{1-6}$-alkyl.
In certain embodiments, U is substituted by $C_{1-3}$-alkyl.
In certain embodiments, U is substituted by methyl.

If U is further substituted by one or more alkyl moieties, the Hammett values of the alkyl moieties are taken into consideration. In case of U being further substituted by a phenyl moiety or heteroatomic, the sum of Hammett values of V, W, E and the optional alkyl substituent is larger than 0.45.

In certain embodiments, E is selected from pyridyl, pyrimidinyl, pyrazinyl, pyridazyl, —N=N— phenyl, —N=N—$R^8$, —F, —Cl, —Br, —I, —CN, —NO$_2$, —N$_3$, —CF$_3$, —SO$_3$H, —CO$_2$H, —C(=O)NH$_2$, —SO$_2$Me, —SOMe, —SO$_2$Et, —SOEt with $R^8$ being pyridyl, pyrimidinyl, pyrazinyl, pyridazyl, —C$_1$-C$_6$-alkyl or —(CH$_2$)$_p$—NMe$_2$, in particular pyridyl or —C$_1$-C$_6$-alkyl, with p being 1, 2, 3 or 4.

In certain embodiments, E is selected from pyridyl, pyrimidinyl, pyrazinyl, pyridazinyl, —N=N— phenyl, —N=N—$R^8$, —F, —Cl, —Br, —I, —CN, —NO$_2$, —N$_3$, —CF$_3$, —SO$_3$H, —CO$_2$H with $R^8$ being pyridyl, pyrimidinyl, pyrazinyl, pyridazyl, —C$_1$-C$_6$-alkyl or —(CH$_2$)$_p$—NMe$_2$, in particular pyridyl or —C$_1$-C$_6$-alkyl, with p being 1, 2, 3 or 4.

In certain embodiments, E is selected from pyridyl, pyrimidinyl, pyrazinyl, pyridazyl, —F, —Cl, —Br, —I, —CN, —NO$_2$, —N$_3$, —CF$_3$, —SO$_3$H, —CO$_2$H, —C(=O)NH$_2$, —SO$_2$Me, —SOMe, —SO$_2$Et, —SOEt.

In certain embodiments, E is selected from pyridyl, pyrimidinyl, pyrazinyl, pyridazinyl, —F, —Cl, —Br, —I, —CN, —NO$_2$, —N$_3$, —CF$_3$, —SO$_3$H, —CO$_2$H.

In certain embodiments, E is selected pyridyl, pyrimidinyl, pyridazinyl or —Br.

In certain embodiments, B is selected from
Boc (—C(=O)OtBu), Eei (=CMeOEt, 1-ethoxyethylidene), trityl (—C(Ph)$_3$), Mmt (—C(Ph)$_2$C$_6$H$_4$OMe), DMT (—C(Ph)(C$_6$H$_4$OMe)$_2$), Cbz (—C(=O)OCH$_2$Ph), benzylideneamine (=CPh), phtalimides (=(CO)$_2$C$_6$H$_4$), p-toluenesulfonamides (—SO$_2$C$_6$H$_4$Me), benzylamine (—CH$_2$Ph), acetamides (—COMe), trifluoroacetamide (—COCF$_3$), Dde (1-(4,4-dimethyl-2,6-dioxocyclohex-1-ylidene)-3-ethyl) and 1-(4,4-dimethyl-2,6-dioxocyclohex-1-ylidene)-3-methylbutyl (ivDde), wherein particularly B is Boc or Eei, wherein more particularly B is Boc, or the
acetal- or ketal protecting groups are selected from

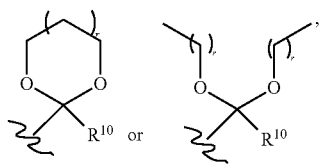

wherein r is 0 to 12, in particular 0 to 6, more particularly 0, 1 or 2, and
$R^{10}$ is a —C$_1$-C$_{12}$-alkyl-, in particular C$_{1-6}$-alkyl, more particularly C$_{1-3}$-alkyl.

In certain embodiments, B is selected from Boc (—C(=O)OtBu), Eei (=CMeOEt, 1-ethoxyethylidene), trityl (—C(Ph)$_3$), Mmt (—C(Ph)$_2$C$_6$H$_4$OMe), DMT (—C(Ph)(C$_6$H$_4$OMe)$_2$), Cbz (—C(=O)OCH$_2$Ph), benzylideneamine (=CPh), phtalimides (=(CO)$_2$C$_6$H$_4$), p-toluenesulfonamides (—SO$_2$C$_6$H$_4$Me), benzylamine (—CH$_2$Ph), acetamides (—COMe), trifluoroacetamide (—COCF$_3$), Dde (1-(4,4-dimethyl-2,6-dioxocyclohex-1-ylidene)-3-ethyl) and 1-(4,4-dimethyl-2,6-dioxocyclohex-1-ylidene)-3-methylbutyl (ivDde).

In certain embodiment, B is Boc or Eei (=CMeOEt, 1-ethoxyethylidene).

In certain embodiment, B is Boc.

In certain embodiments, B is selected from acetal- or ketal protecting groups are selected from

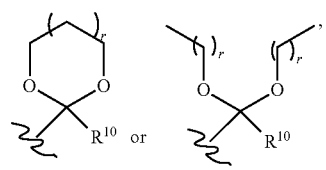

wherein r is 0 to 12, in particular 0 to 6, more particularly 0, 1 or 2, and $R^{10}$ is —C$_1$-C$_{12}$-alkyl-, in particular C$_{1-6}$-alkyl.

In certain embodiments, T is a linear or branched spacer comprising at least one of the moieties —C$_{1-12}$-alkyl-, (—C$_2$H$_4$O—)$_{1-12}$, —C(=O)—, —C(=O)-JR$^9$—, -JR$^9$—C(=O)—, -JR$^9$—, wherein J is C or N, in particular N, wherein $R^9$ is independently selected from H, C$_{1-4}$-alkyl, —C$_{1-6}$-alkyl-NH$_2$, —C$_{1-6}$-alkyl-NHB, —C$_{1-6}$-alkyl-NB$_2$, in particular from H and C$_{1-2}$-alkyl, more particularly $R^9$ is H, wherein B is an independently selected acid labile amine protecting group.

In certain embodiments, the total length of the spacer T is between 0.5 and 100 nm.

In certain embodiments, T is selected from —C$_1$-C$_{12}$-alkyl-, in particular C$_{1-6}$-alkyl, more particularly C$_{1-3}$-alkyl, —R$^5$—C(=O)—, —R$^5$—C(=O)—NR$^9$—, —R$^5$—NR$^9$—C(=O)—R$^6$—, —R$^5$—C(=O)—NR$^9$—R$^6$—, —R$^5$—C(=O)—NR$^9$—R$^{5'}$—NR$^{9'}$C(=O)—R$^6$—, in particular C$_{1-3}$-alkyl, —R$^5$—C(=O)—NR$^9$—, —R$^5$—NR$^9$—C(=O)—R$^6$—, more particularly C$_{1-3}$-alkyl or —R$^5$—C(=O)—NR$^9$—, with R$^5$, R$^{5*}$, R$^6$, R$^{9'}$ and R$^9$ being as defined above.

In certain embodiments, T is a linear or branched spacer comprising at least one of the moieties —C$_{1-12}$-alkyl-, —C(=O)—, —C(=O)—NR$^9$—, —NR$^9$—C(=O)—, —NR$^9$—, wherein $R^9$ is independently selected from H, C$_{1-4}$-alkyl, —C$_{1-6}$-alkyl-NH$_2$, —C$_{1-6}$-alkyl-NHB, —C$_{1-6}$-alkyl-NB$_2$, —R$^{15}$, —C$_{1-6}$-alkyl-R$^{15}$, —C$_{1-6}$-alkyl-NH—R$^{15}$, in particular from H and C$_{1-2}$-alkyl, more particularly $R^9$ is H, wherein B is an independently selected acid labile amine protecting group, $R^{15}$ is a blocking agent that is able to react with an aldehyde moiety, in particular $R^{15}$ is selected from cysteinyl, threoninyl, 2-mercaptoethanol, cysteamine, ethandithiole, hydroxylamine, O-methylhydroxylamine, N-methylhydroxylamine, dithiothreitol, hydrazine, in particular cysteinyl and N-methylhydroxylamine, more particularly cysteinyl, wherein amine and/or thiol moieties of the blocking agent may be protected by an independently selected acid labile amine protecting group B, particularly Boc, and/or an acid labile thiol protecting group, particularly trityl.

As described above, the spacer T is generally non-reactive under commonly applied purification conditions with the exception of the removal of protecting groups under acidic conditions. The spacer T may enhance the solubility of the linker molecule. In particular branched spacers that comprise a protected or unprotected amine moiety at $R^9$ contribute to an enhanced solubility. Under acidic conditions, the amine protection group B is removed and the amine is protonated.

In certain embodiments, T is a linear or branched spacer comprising at least one of the moieties —$C_{1-12}$-alkyl-, —C(═O)—, —C(═O)—$NR^9$—, —$NR^9$—C(═O)—, —$NR^9$—, wherein $R^9$ is independently selected from H, $C_{1-4}$-alkyl, —$C_{1-6}$-alkyl-$NH_2$, —$C_{1-6}$-alkyl-NHB, —$C_{1-6}$-alkyl-$NB_2$, in particular from H and $C_{1-2}$-alkyl, more particularly $R^9$ is H, wherein B is an independently selected acid labile amine protecting group.

The spacer T may also comprise a blocking function. In particular a branched spacer may comprise a blocking agent that is suitable to bind to aldehyde moieties. When the solid phase used for peptide purification comprises aldehyde moieties, e.g. agarose beads, the moiety X of the linker compound may be covalently bound to the solid phase, e.g by formation of a oxime bond. Non-reacted aldehyde moieties may cause unwanted side reactions during subsequent purification. To prevent such side reactions, the non-reacted aldehyde moieties of the solid phase can be blocked by the blocking function of the spacer, e.g. a cysteinyl moiety.

In certain embodiments, T is a linear or branched spacer comprising at least one of the moieties —$C_{1-12}$-alkyl-, —C(═O)—, —C(═O)—$NR^9$—, —$NR^9$—C(═O)—, —$NR^9$—, wherein $R^9$ is independently selected from H, $C_{1-4}$-alkyl, —$R^{15}$, —$C_{1-6}$-alkyl-$R^{15}$, —$C_{1-6}$-alkyl-NH—$R^{15}$, in particular from H and $C_{1-2}$-alkyl, more particularly $R^9$ is H, wherein B is an independently selected acid labile amine protecting group, $R^{15}$ is a blocking agent that is able to react with an aldehyde moiety, in particular $R^{15}$ is selected from cysteinyl, threoninyl, 2-mercaptoethanol, cysteamine, ethandithiole, hydroxylamine, O-methylhydroxylamine, N-methylhydroxylamine, dithiothreitol, hydrazine, in particular cysteinyl and N-methylhydroxylamine, more particularly cysteinyl, wherein amine and/or thiol moieties of the blocking agent may be protected by an independently selected acid labile amine protecting group B, particularly Boc, and/or an acid labile thiol protecting group, particularly trityl.

In certain embodiments, T is selected from —$C_1$-$C_{12}$-alkyl-, in particular $C_{1-6}$-alkyl, more particularly $C_{1-3}$-alkyl, —$R^5$—C(═O)—$NR^9$—$R^6$—, —C(═O)—$NR^9$—$R^6$—, —$R^5$—$NR^9$—C(═O)—$R^6$—, —$R^5$—C(═O)—O—$R^6$—, —C(═O)—O—$R^6$—, —$R^5$—$NR^9$—$R^5$—$NR^9$C(═O)—$R^6$—, particularly from —$C_1$-$C_{12}$-alkyl-, in particular $C_{1-6}$-alkyl, more particularly $C_{1-3}$-alkyl, —$R^5$—$NR^9$—C(═O)—$R^6$—, —$R^5$—C(═O)—$NR^9$—$R^6$—, —$R^5$—$NR^9$—$R^5$—$NR^9$C(═O)—$R^6$—, most particularly —$R^5$—$NR^9$—C(═O)—$R^6$—, with $R^5$, $R^6$ and $R^9$ being as defined above.

As described above, the moieties U, V, W and E contribute to the stability of the linker under acidic conditions. For example, linkers comprising a moiety U or V that comprises an amine or a heterocycle such as pyridine are stable under acidic conditions, particularly TFA >50%, in the presence of water pH <0, as the amine or heterocycle is protonated. Furthermore, the protonated linker improves the solubility of the linker-peptide complex. If the pH is higher than the pKa of the linker, the linker will rapidly decompose during the desired release of the peptide as the last step.

V is an electron-withdrawing moiety selected from —$NR^{11}$—C(═O)—, —C(═O)—$NR^{11}$—, —S(═O)—, —$NR^{12}$—, -piperazinyl-, -pyridinyl, pyrimidinyl, pyrazinyl, pyridazinyl,

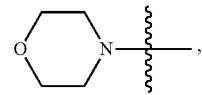

—C(═O)—, —C(═O)—O—, wherein $R^{11}$ is selected from H and $C_{1-4}$-alkyl, in particular from H and $C_{1-2}$-alkyl, more particularly $R^{11}$ is H, $R^{12}$ is selected from H and $C_{1-4}$-alkyl, in particular from H and $C_{1-2}$-alkyl, more particularly $R^{12}$ is methyl.

V is an electron-withdrawing moiety selected from —$NR^{11}$—C(═O)—, —C(═O)—$NR^{11}$—, —S(═O)—, —$NR^{12}$—, -piperazinyl-, -pyridinyl, pyrimidinyl, pyrazinyl, pyridazinyl, —C(═O)—, —C(═O)—O—, wherein $R^{11}$ is selected from H and $C_{1-4}$-alkyl, in particular from H and $C_{1-2}$-alkyl, more particularly $R^{11}$ is H, $R^{12}$ is selected from H and $C_{1-4}$-alkyl, in particular from H and $C_{1-2}$-alkyl, more particularly $R^{12}$ is methyl.

V is an electron-withdrawing moiety selected from —$NR^{11}$—C(═O)—, —C(═O)—$NR^{11}$—, —S(═O)—, —$NR^{12}$—, -piperazinyl-, -pyridinyl-, pyrimidinyl, wherein $R^{11}$ is selected from H and $C_{1-4}$-alkyl, in particular from H and $C_{1-2}$-alkyl, more particularly $R^{11}$ is H, $R^{12}$ is selected from H and $C_{1-4}$-alkyl, in particular from H and $C_{1-2}$-alkyl, more particularly $R^{12}$ is methyl.

V is an electron-withdrawing moiety selected from —$NR^{11}$—C(═O)—, —C(═O)—$NR^{11}$—, —$NR^{12}$—, -piperazinyl-, -pyridinyl-, pyrimidinyl, wherein $R^{11}$ is selected from H and $C_{1-4}$-alkyl, in particular from H and $C_{1-2}$-alkyl, more particularly $R^{11}$ is H, $R^{12}$ is selected from H and $C_{1-4}$-alkyl, in particular from H and $C_{1-2}$-alkyl, more particularly $R^{12}$ is methyl.

V is an electron-withdrawing moiety selected from —NH—C(═O)—, —C(═O)—HN—, —N—($CH_3$)—, -piperazinyl-, -pyridinyl-, pyrimidinyl, pyrazinyl, pyridazinyl.

V is an electron-withdrawing moiety selected from —NH—C(═O)—, —C(═O)—HN—, —N—($CH_3$)—, -piperazinyl-, -pyridinyl-, pyrimidinyl.

In certain embodiments, V is an electron-withdrawing moiety selected from —$NR^{11}$—C(═O)—, —C(═O)—$NR^{11}$—, —S(═O)—, —$NR^{12}$—, -pyridinyl, pyrimidinyl, pyrazinyl, pyridazyl, —C(═O)—, —C(═O)—O—.

In certain embodiments, V is selected from —$NR^{11}$—C(═O)—, —C(═O)—$NR^{11}$, —S(═O)—, —$NR^{12}$— and -pyridinyl-, pyrimidinyl, wherein $R^{11}$ is selected from H and $C_{1-4}$-alkyl, in particular from H and $C_{1-2}$-alkyl, more particularly $R^{11}$ is H, and $R^{12}$ is selected from H and $C_{1-4}$-alkyl, in particular from H and $C_{1-2}$-alkyl, more particularly $R^{12}$ is methyl.

In certain embodiments, V is selected from —$NR^{11}$—C(═O)—, S(═O)—, —$NR^{12}$—, -pyridinyl-, pyrimidinyl, wherein $R^{11}$ is selected from H and $C_{1-4}$-alkyl, and $R^{12}$ is selected from H and $C_{1-4}$-alkyl.

In certain embodiments, V is selected from —$NR^{11}$—C(═O)—, S(═O)—, —$NR^{12}$—, -pyridinyl-, pyrimidinyl, wherein $R^{11}$ is selected from H and $C_{1-2}$-alkyl, and $R^{12}$ is selected from H and $C_{1-2}$-alkyl.

In certain embodiments, V is selected from —NH—C(═O)—, —N—($CH_3$)—, -pyridinyl-, pyrimidinyl.

In certain embodiments, W is selected from —$N_3$, —S(═O)—$R^8$, —S—S—$R^8$, —O—$CH_2$—$N_3$, —N═N—$R^8$, in particular —$N_3$, —N═N—$R^8$, —O—$CH_2$—$N_3$, —S—S—$R^8$, wherein $R^8$ is pyridyl, pyrimidinyl, pyrazinyl, pyridazyl, —$C_1$-$C_6$-alkyl or —$(CH_2)_p$—$NMe_2$, in particular pyridyl or —$C_1$-$C_6$-alkyl, with p being 1, 2, 3 or 4.

In case $R^8$ is a $C_{1-6}$-alkyl, the alkyl moiety may be linear or branched, e.g. tert-butyl. In particular in case of W being —S—S—$R^8$, $R^8$ may be pyridyl or —$C_1$-$C_4$-alkyl, particularly pyridyl or tert-butyl.

Linkers that comprise a moiety W=—S—S—$R^8$ may be cleaved with thiols. Therefore, the cleavage of the peptide-linker complex from the synthesis resin used during SPPS under acidic conditions (e.g. TFA >50%, in the presence of water pH <0) may be performed without thiols when such linkers are used for peptide purification.

In certain embodiments, W is selected from —$N_3$, —S(=O)—$R^8$, —S—S—$R^8$, —O—$CH_2$—$N_3$, —N=N—$R^8$, in particular —$N_3$, —N=N—$R^8$, —O—$CH_2$—$N_3$, —S—S—$R^8$, wherein $R^8$ is pyridyl, pyrimidinyl, pyrazinyl, pyridazyl or —$C_1$-$C_6$-alkyl or, in particular pyrimidinyl, pyridyl or —$C_1$-$C_6$-alkyl, more particularly pyridyl or —$C_1$-$C_6$-alkyl.

In certain embodiments, U is selected from phenyl or a five- or six-membered heterocycle, wherein the five- or six-membered heterocycle comprises 1 or 2 heteroatoms.

In certain embodiments, U is selected from phenyl or a five- or six-membered heterocycle, wherein the five- or six-membered heterocycle comprises 1 heteroatom.

In certain embodiments, U is selected from phenyl or a six-membered heterocycle.

In certain embodiments, U is selected from phenyl or a six-membered heterocycle, wherein the six-membered heterocycle comprises 1 or 2 heteroatoms.

In certain embodiments, the five- or six-membered heteroaryl moiety of U comprises 1 or 2 heteroatoms, in particular the five-membered heteroaryl moiety of the moiety U is selected from pyrazole, imidazole, and the six-membered heteroaryl moiety of the moiety U is selected from pyridine, pyridazine, pyrimidine, pyrazine, particularly pyridine.

In certain embodiments, U is selected from phenyl or a six-membered heterocycle, wherein the six-membered heterocycle comprises 1 heteroatom. In certain embodiments, the five-membered heterocycle of the moiety U is selected from pyrazole, imidazole, and the six-membered heterocycle of the moiety U is selected from pyridine, pyridazine, pyrimidine, pyrazine.

In certain embodiments, U is selected from phenyl, pyridine, pyridazine, pyrimidine, pyrazine, particularly phenyl or pyridine, more particularly phenyl.

In certain embodiments, U is selected from a moiety of formula 5, 6, 7 or 8,

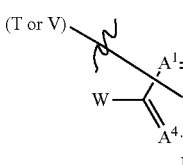

(5)

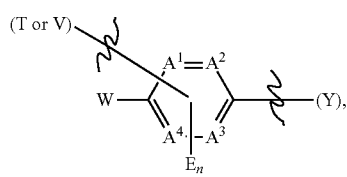

(6)

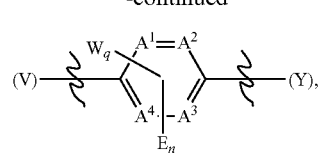

(7)

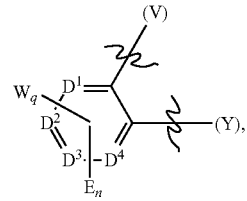

(8)

wherein
T, V, Y, W and E are defined as described above,
in case of formula 5 and 6, U is bound to the moiety T or V,
in case of formula 7 and 8, U is bound to the moiety V,
$A^1$, $A^2$, $A^3$, $A^4$ and $D^1$, $D^2$, $D^3$, $D^4$ are independently from each other selected from C, N, S and O, in particular from C and N, wherein 2 to 4 moieties of $A^1$, $A^2$, $A^3$ and $A^4$ or of $D^1$, $D^2$, $D^3$ and $D^4$ are C, particularly 3 or 4 moieties of $A^1$, $A^2$, $A^3$ and $A^4$ or of $D^1$, $D^2$, $D^3$ and $D^4$ are C, more particularly all moieties $A^1$, $A^2$, $A^3$ and $A^4$ or of $D^1$, $D^2$, $D^3$ and $D^4$ are C,
n is
in case of formulas 5 and 6 an integer between 0 and 3,
in case of formulas 7 and 8 an integer between 0 and 4,
q is an integer between 0 and 4, wherein the sum of n and q is equal or lower than 4.

In certain embodiments, U is selected from a moiety of formula 5 or 6.

In certain embodiments, U is selected from a moiety of formula 5, 6, 7 or 8, wherein
T, V, Y, W and E are defined as described above,
in case of formula 5 and 6, U is bound to the moiety T or V,
in case of formula 7 and 8, U is bound to the moiety V,
$A^1$, $A^2$, $A^3$, $A^4$ and $D^1$, $D^2$, $D^3$, $D^4$ are independently from each other selected from C, N, S and O, in particular from C and N,
n is
in case of formulas 5 and 6 an integer between 0 and 2,
in case of formulas 7 and 8 an integer between 0 and 2, in particular 0 and 1,
q is an integer between 0 and 2, in particular 0 and 1.

In certain embodiments, U is selected from a moiety of formula 9, 10, 11 or 12, in particular of formula 9 or 10,

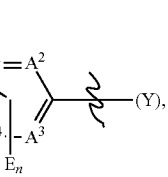

(9)

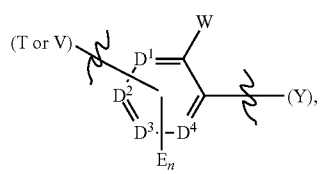

(10)

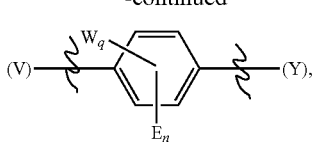
(11)

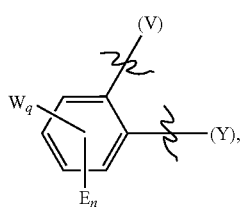
(12)

wherein
T, V, Y, W, E, q and n are defined as described above,
in case of formula 9 and 10, U is bound to the moiety T or V,
in case of formula 11 and 12, U is bound to the moiety V,
all moieties $A^2$, $A^3$ and $A^4$ are C or two of $A^2$, $A^3$ and $A^4$ are C and the other two of $A^2$, $A^3$ and $A^4$ is N, in particular $A^2$ and $A^3$ are both C, and
$D^2$ is C or N, in particular C.

In certain embodiments, U is selected from a moiety of formula 9, 10, 11 or 12,

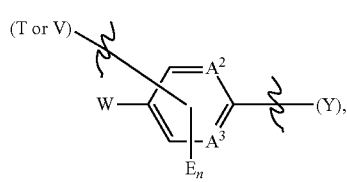
(9)

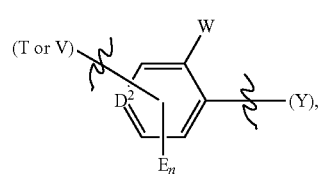
(10)

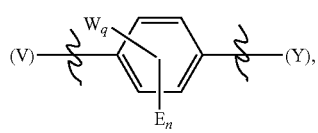
(11)

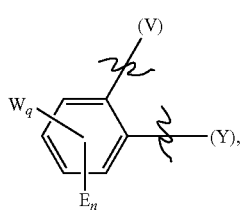
(12)

wherein
T, V, Y, W, E, q and n are defined as described above,
in case of formula 9 and 10, U is bound to the moiety T or V,
in case of formula 11 and 12, U is bound to the moiety V,
$A^2$ and $A^3$ are both C or one of $A^2$ and $A^3$ is C and the other one of $A^2$ and $A^3$ is N,
$D^2$ is C or N.

If the moiety U comprises a N-containing heteroaryl, the N atom is protonated under acidic conditions and increases therefore the solubility of the linker molecule.

In certain embodiments, U is selected from a moiety of formula 13, 14, 15, 16, 17, 18, 19, 20 or 21, in particular of formula 13 to 19, more particular of formula 15 or 19,

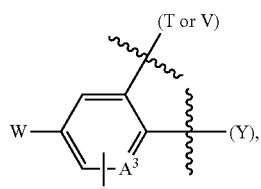
(13)

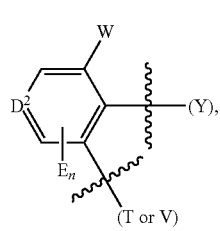
(14)

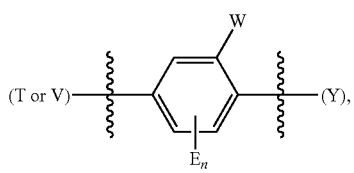
(15)

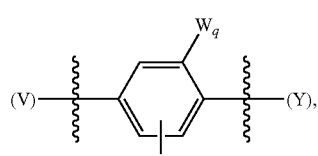
(16)

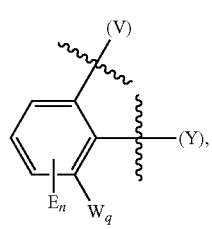
(17)

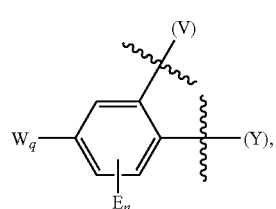
(18)

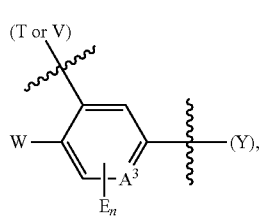
(19)

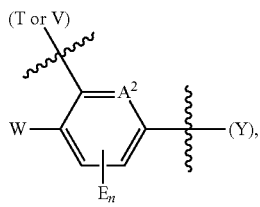
(20)

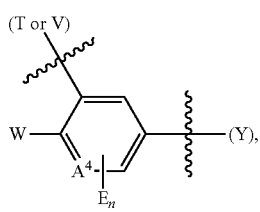
(21)

wherein

T, V, Y, W, E, q and n are defined as described above, in case of formula 13, 14 and 15, U is bound to the moiety T or V, in case of formula 16, 17 and 18, U is bound to the moiety V, $A^2$, $A^3$ and $A^4$ is C or N, in particular C, $D^2$ is C or N.

In certain embodiments, U is selected from a moiety of formula 13, 14, 15, 16, 17 or 18,

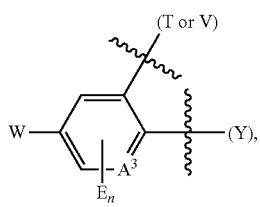
(13)

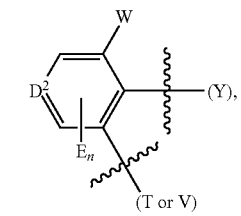
(14)

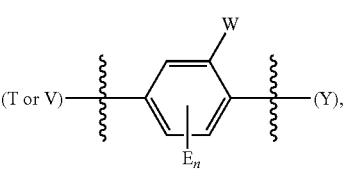
(15)

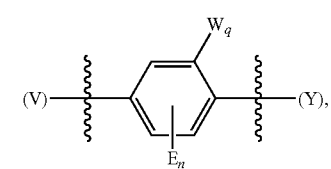
(16)

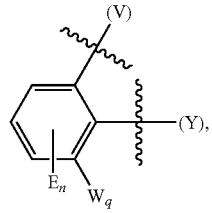
(17)

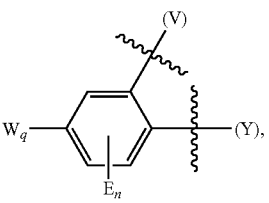
(18)

wherein

T, V, Y, W, E, q and n are defined as described above, in case of formula 13, 14 and 15, U is bound to the moiety T or V, in case of formula 16, 17 and 18, U is bound to the moiety V, $A^3$ is C or N, $D^2$ is C or N.

In certain embodiments, Z is selected from: —F, —Cl, —Br, —I, —$N_3$, —OH, —O(C═O)$CH_2$(C═O)OH—$SR^{14}$, —$OCF_3$, —$OCH_2CF_3$, —$OSO_2CF_3$, —$SO_2C_6H_4CH_3$, —$SO_2CF_3$, —$SO_2CH_3$

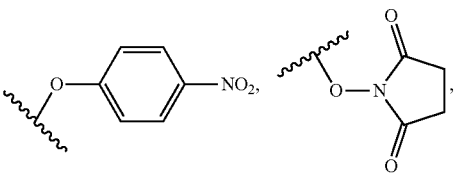

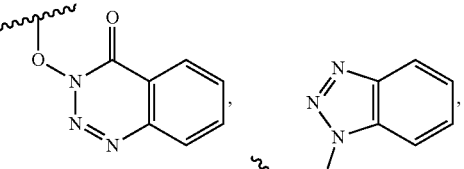

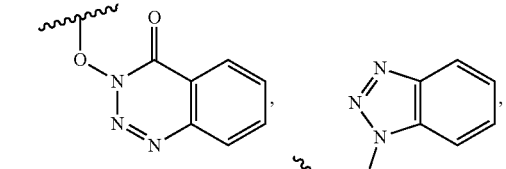

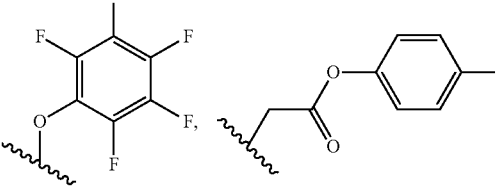

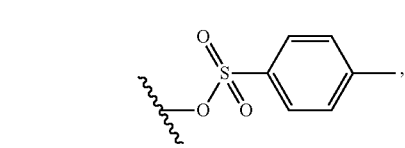

in particular —OH, —Cl,

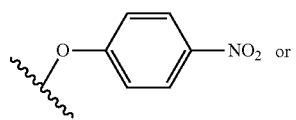 or 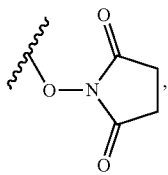, in particular —OH,

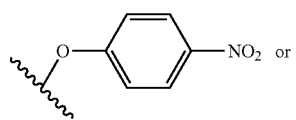 or 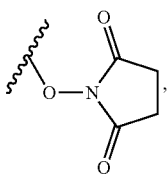, wherein $R^{14}$ is an $C_1$-$C_6$-alkyl-, an arylic- or benzylic substituent.

In certain embodiments, Z is selected from: —F, —Cl, —Br, —I, —N$_3$, —OH, —SR$^{14}$, —OCF$_3$, —OCH$_2$CF$_3$, —OSO$_2$CF$_3$, —SO$_2$C$_6$H$_4$CH$_3$, —SO$_2$CF$_3$, —SO$_2$CH$_3$

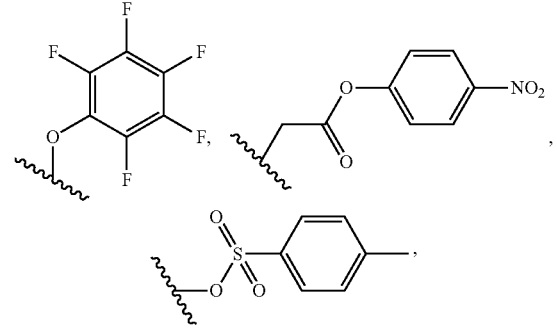

in particular —OH, —Cl,

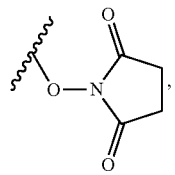

in particular —OH,

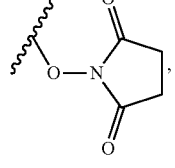

wherein $R^{14}$ is an $C_1$-$C_6$-alkyl-, an arylic- or benzylic substituent.

In certain embodiments, the compound of formula 1 is selected from a compound of formula X1, X2, X3, X4, X5, X7, X8, X9, X10, X11, X12, X14, X15, X16, X17, X18, X19, X20, X21, X22, X23 X24, X25 or X26.

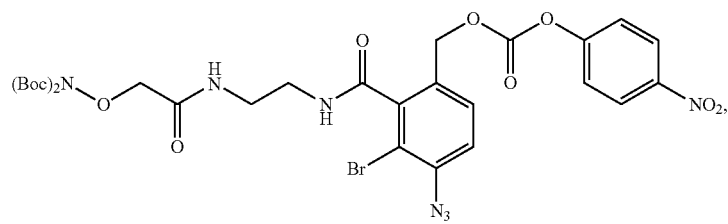

(X1)

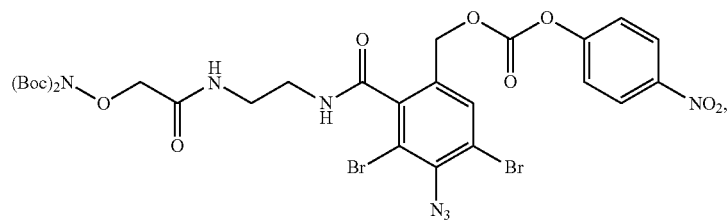

(X2)

-continued
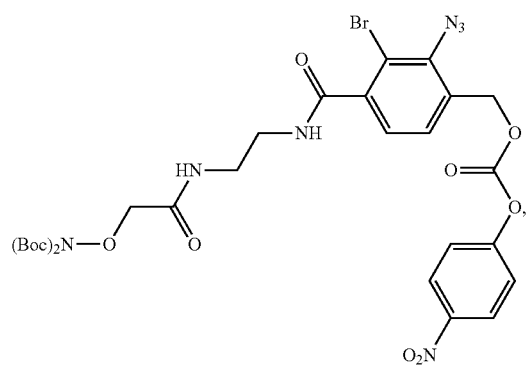 (X3)
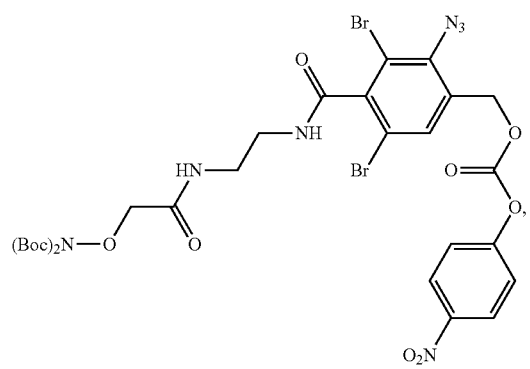 (X4)
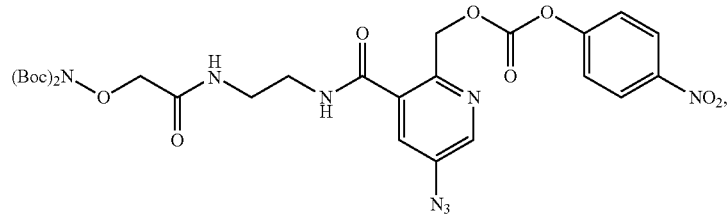 (X5)
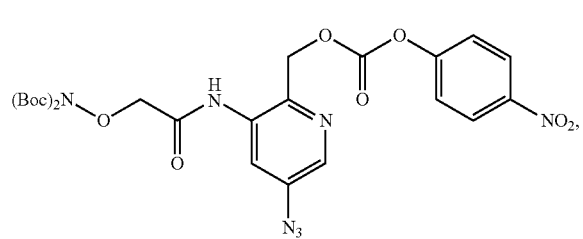 (X7)
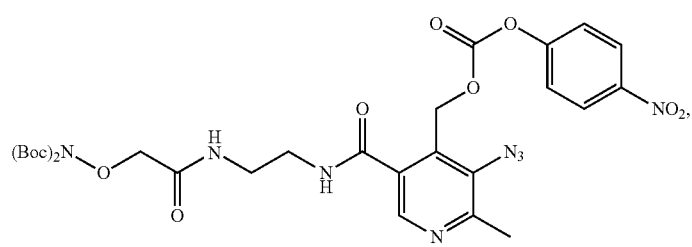 (X8)
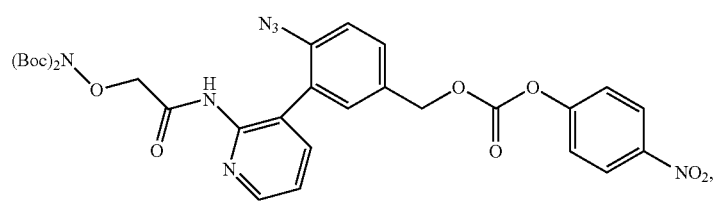 (X9)
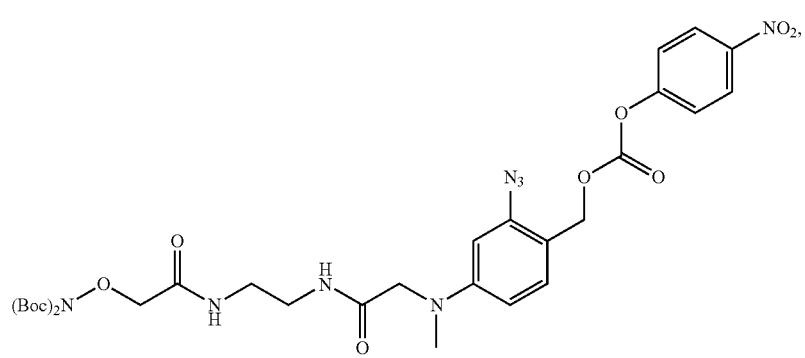 (X10)

(X11)
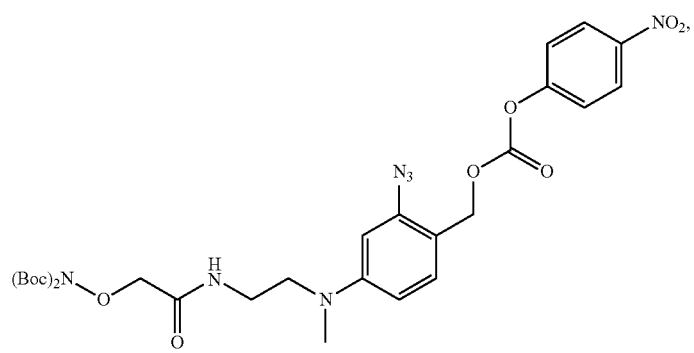
(X12)
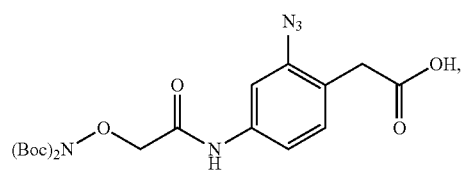
(X14)
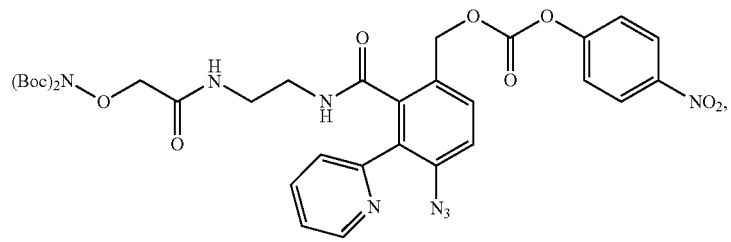
(X15)
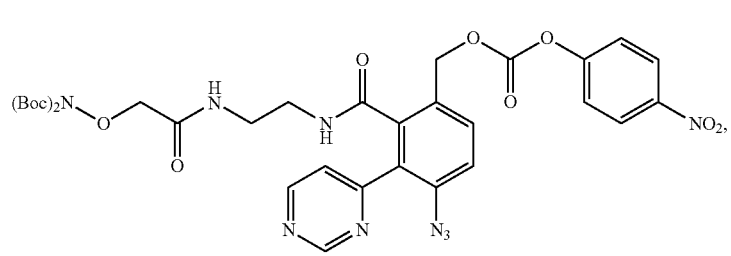
(X16)
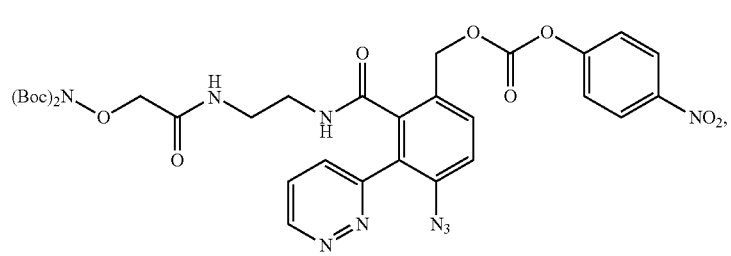

(X17)
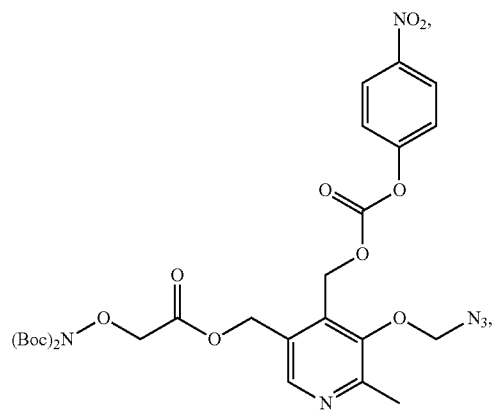
(X18)
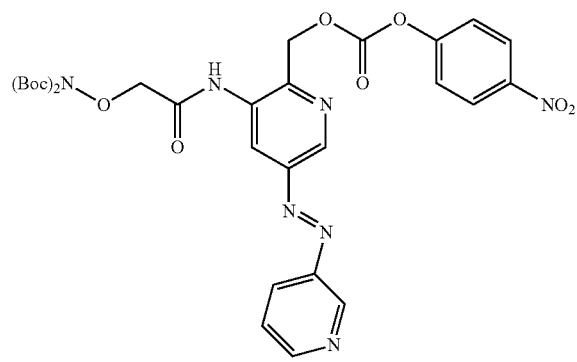
(X19)
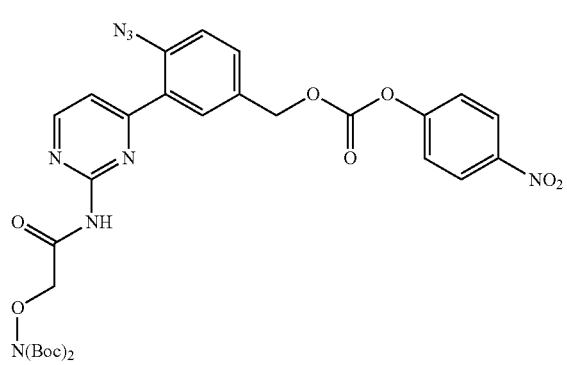
(X20)
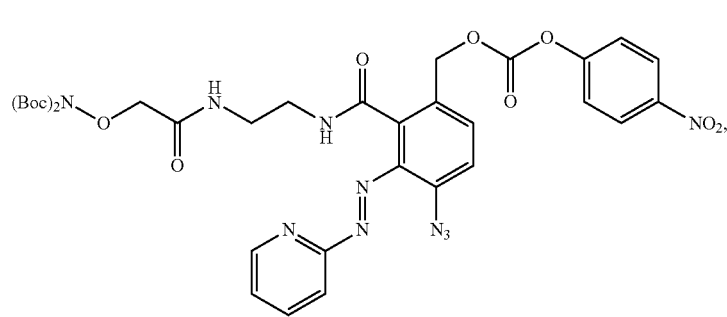
(X21)
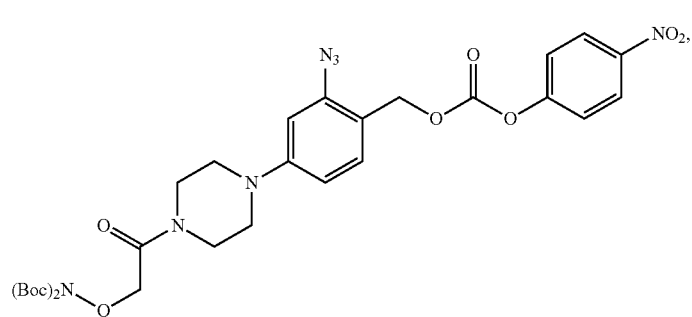

-continued

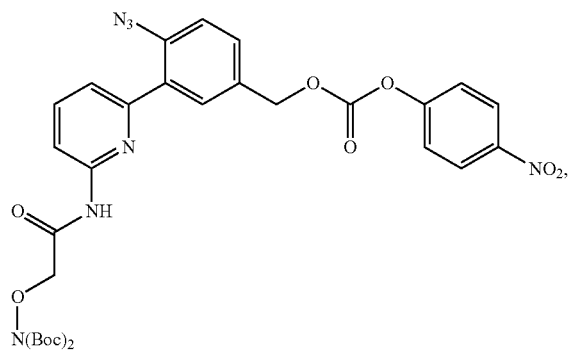
(X22)

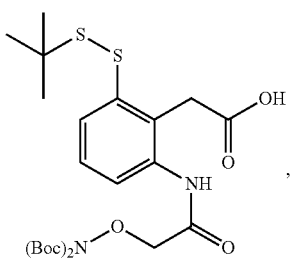
(X23)

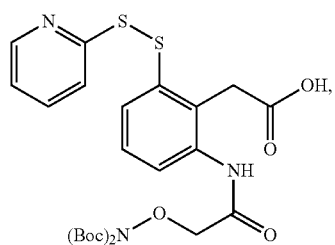
(X24)

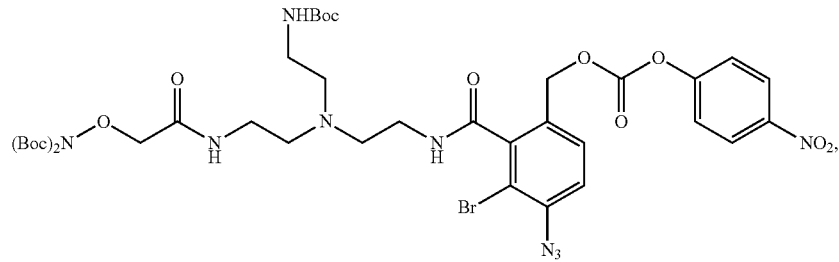
(X25)

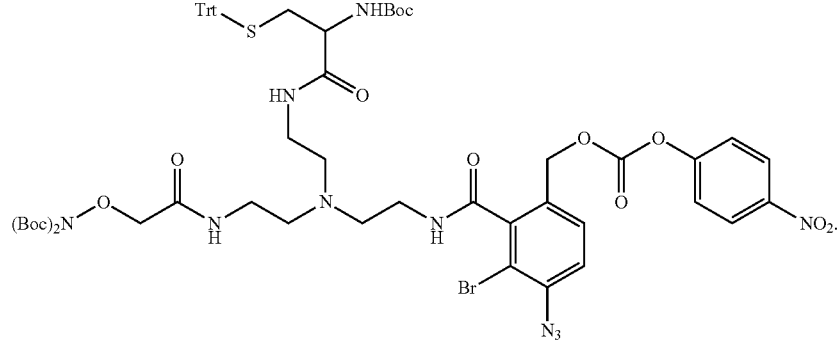
(X26)

In certain embodiments, the compound of formula 1 is a compound of formula X9, X12, X19, X22, X8, X18, X1, X14, X15, X20, X7, X11, X17, X21, X2, X16, X23 or X24.

In certain embodiments, the compound of formula 1 is a compound of formula X9, X12, X19, X22, X8, X18, X1, X14, X15 or X20.

In certain embodiments, the compound of formula 1 is a compound of formula X9, X12, X19, X22 or X8.

In certain embodiments, the compound of formula 1 is a compound of formula X1 or X2.

(H-AK(Palm-γE-OH)EFIAWLVRGRG-NH₂)

by usage of inventive linker molecule X1. A=absorption (210 nm), B=time/min; 1.) Chromatogram of trail cleavage of crude peptide sample before linker coupling to P1. 2.) Chromatogram of P1 after linker (X1) coupling and final TFA-cleavage. 3.) Chromatogram of P1 after modification by Palm-γGlu(OH)-OtBu coupling and purification as described in claims 1-9.

Figure 3:
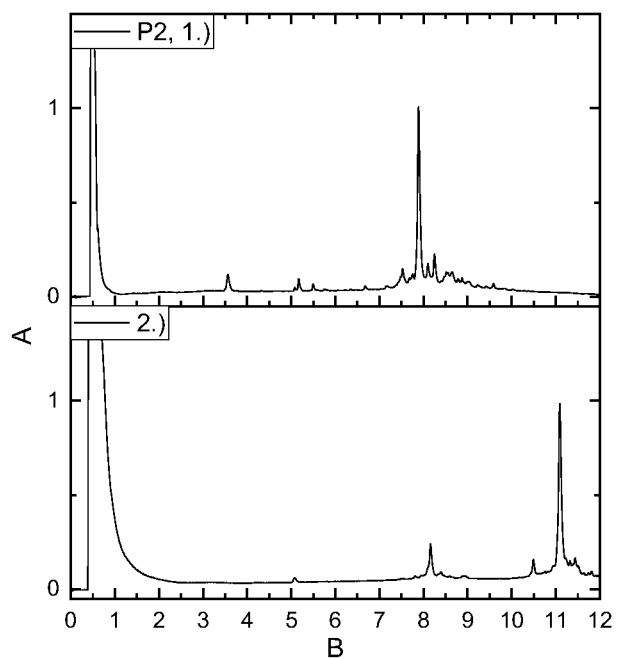

FIG. 3 shows an example of the inventive peptide modification/purification of peptide P2

(H-HAEGTFTSDVSSYLEGQAAKEFIAWLVRGRG-NH₂)

by usage of inventive linker molecule X1. A=absorption (210 nm), B=time/min; 1.) Chromatogram of trail cleavage of crude peptide sample before linker (X1) coupling to P1. 2.) Chromatogram of P2 after modification by Palm-γGlu (OH)-OtBu coupling and purification as described in claims 1-9.

Figure 4:
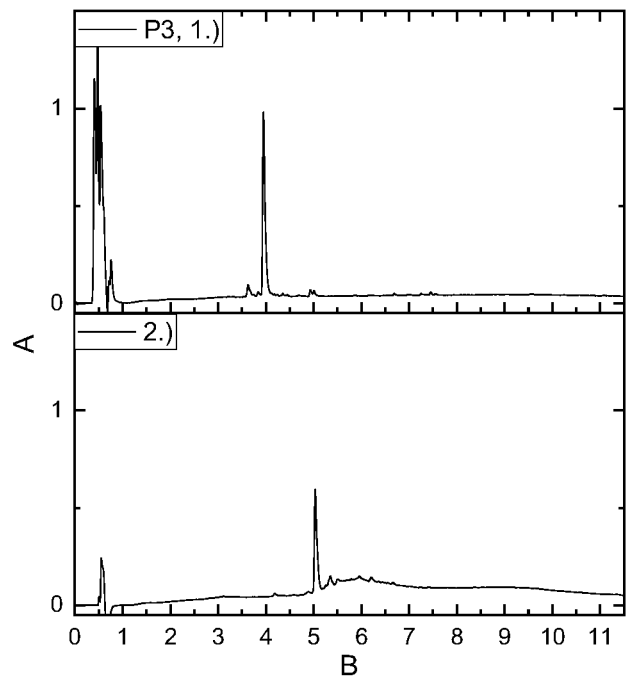

FIG. 4 shows an example of the inventive peptide modification/purification of peptide P3 (H-CRVPGDAHHAD-SLC-NH₂) by usage of inventive linker molecule X1. A=absorption (210 nm), B=time/min; 1.) Chromatogram of trail cleavage of crude peptide sample before linker (X1) coupling to P1. 2.) Chromatogram of P3 after modification by m-Xylylene dibromide coupling and purification as described in claims 1 to 5 and 10 to 12.

Figure 5:
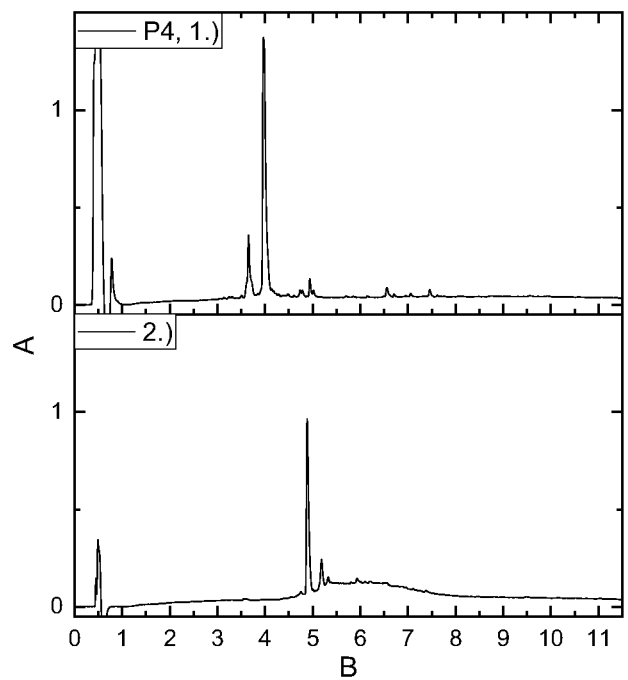

FIG. 5 shows an example of the inventive peptide modification/purification of peptide P4 (H-VRCPGAAHHAD-SLC-NH₂) by usage of inventive linker molecule X1. A=absorption (210 nm), B=time/min; 1.) Chromatogram of trail cleavage of crude peptide sample before linker (X1) coupling to P1. 2.) Chromatogram of P4 after modification by m-Xylylene dibromide coupling and purification as described in claims 1 to 5 and 10 to 12.

Figure 6:
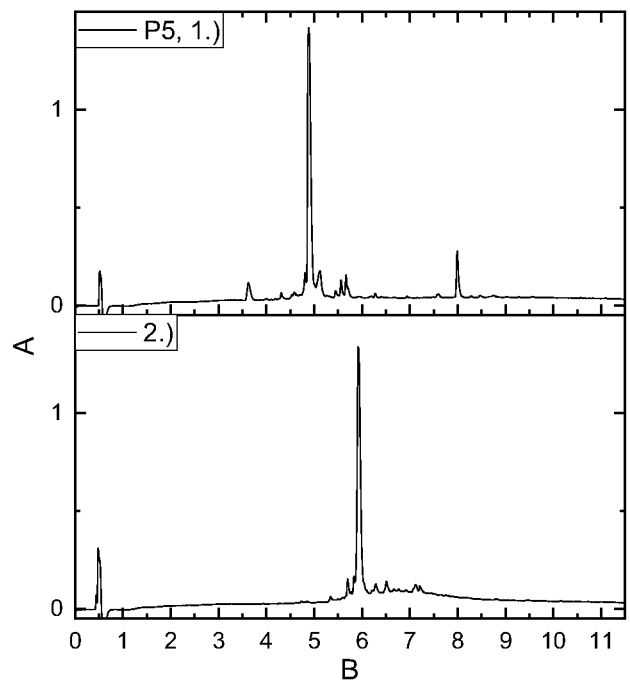

FIG. 6 shows an example of the inventive peptide modification/purification of peptide P5 (H-VRVPGCAHCAD-SLY-NH₂) by usage of inventive linker molecule X1. A=absorption (210 nm), B=time/min; 1.) Chromatogram of trail cleavage of crude peptide sample before linker (X1) coupling to P1. 2.) Chromatogram of P5 after modification by m-Xylylene dibromide coupling and purification as described in claims 1 to 5 and 10 to 12.

Figure 7:
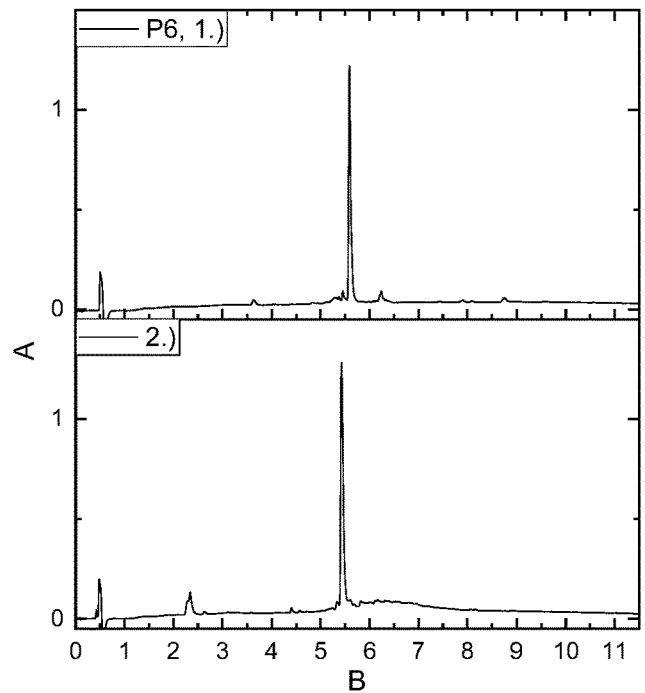

FIG. 7 shows an example of the inventive peptide modification/purification of peptide P6 (H-ACSWPAR-CLHQDLCA-NH₂) by usage of inventive linker molecule X1. A=absorption (210 nm), B=time/min; 1.) Chromatogram of trail cleavage of crude peptide sample before linker (X1) coupling to P1. 2.) Chromatogram of P6 after modification by 1,3,5-Tris(bromomethyl) benzene coupling and purification as described in claims 1 to 5 and 10 to 12.

Figure 8:
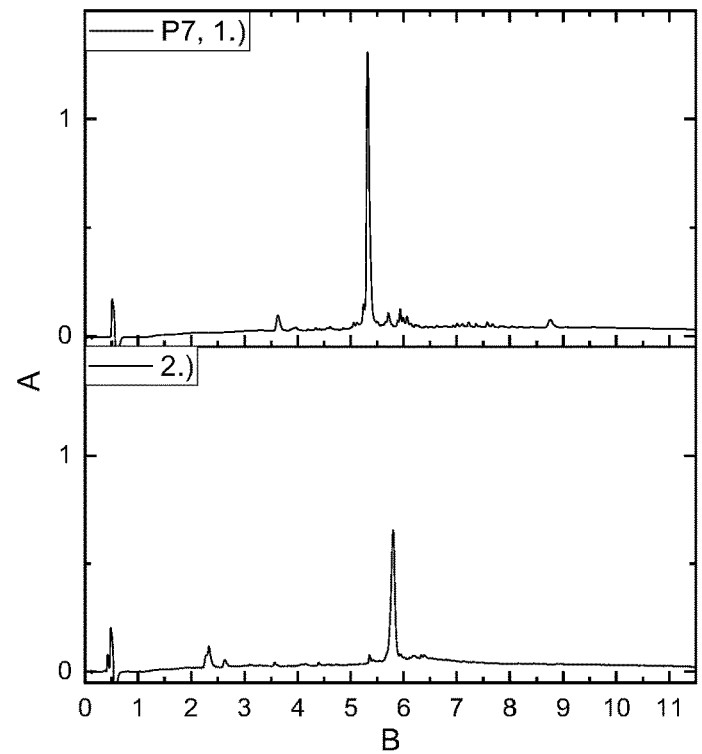

FIG. 8 shows an example of the inventive peptide modification/purification of peptide P7 (H-ACREGFLR-CLHRPTVCG-NH₂) by usage of inventive linker molecule X1. A=absorption (210 nm), B=time/min; 1.) Chromatogram of trail cleavage of crude peptide sample before linker (X1) coupling to P1. 2.) Chromatogram of P7 after modification by 1,3,5-Tris(bromomethyl) benzene coupling and purification as described in claims 1 to 5 and 10 to 12.

Figure 9:
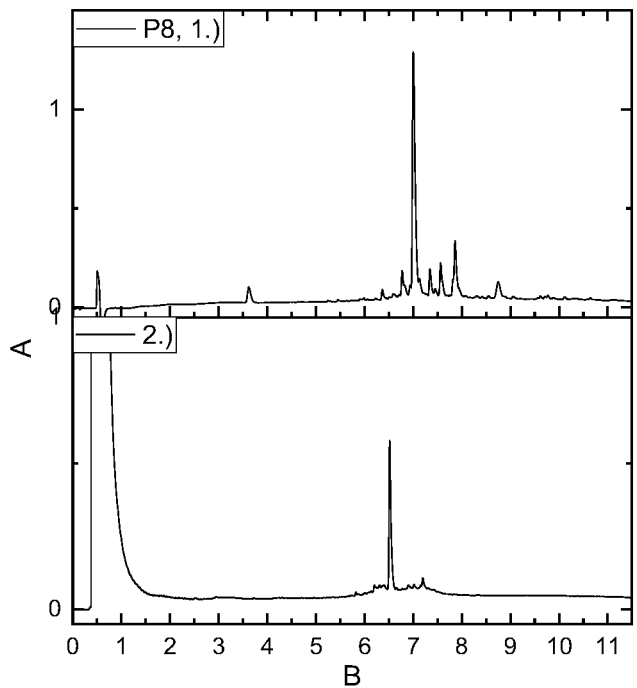

FIG. 9 shows an example of the inventive peptide modification/purification of peptide P8 (H-ACYN-EFGCEDFYDICA-NH₂) by usage of inventive linker molecule X1. A=absorption (210 nm), B=time/min; 1.) Chromatogram of trail cleavage of crude peptide sample before linker (X1) coupling to P1. 2.) Chromatogram of P8 after modification by 1,1',1''-(1,3,5-Triazinan-1,3,5-triyl)tris (2-bromoethanon) coupling and purification as described in claims 1 to 5 and 10 to 12.

Figure 10:
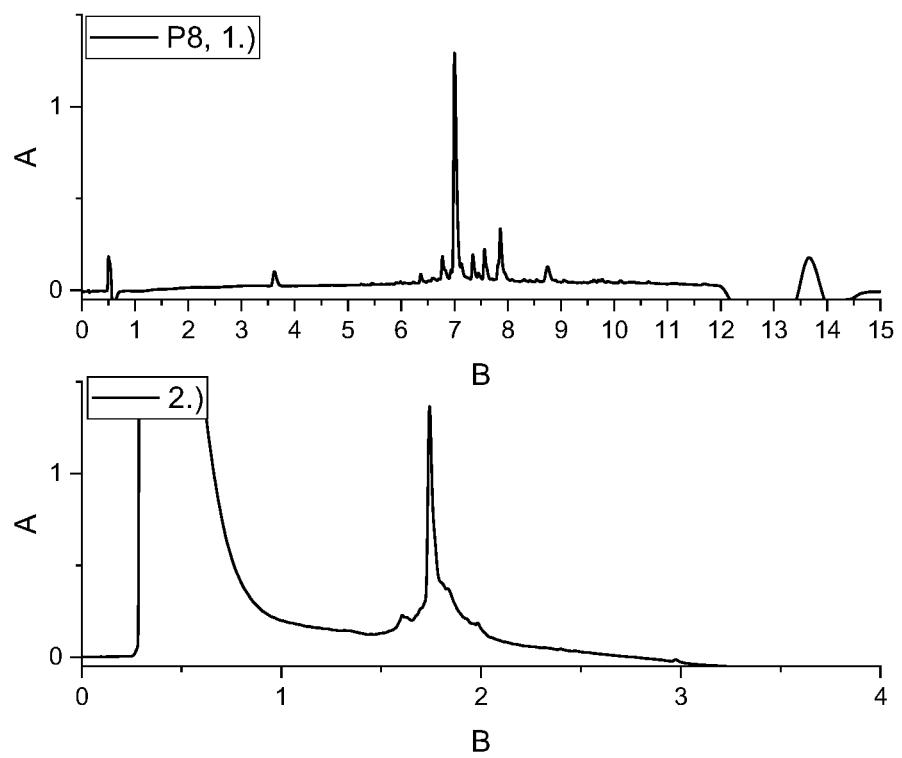

FIG. 10 shows an example of the inventive peptide modification/purification of peptide P8 (H-ACYN-EFGCEDFYDICA-NH₂) by usage of inventive linker molecule X1. A=absorption (210 nm), B=time/min; 1.) Chromatogram of trail cleavage of crude peptide sample before linker (X1) coupling to P8. 2.) Chromatogram of P8 after modification by 1,3,5-Triacryloyl-1,3,5-triazinan and purification as described in claims 1 to 5 and 10 to 12.

Figure 11:
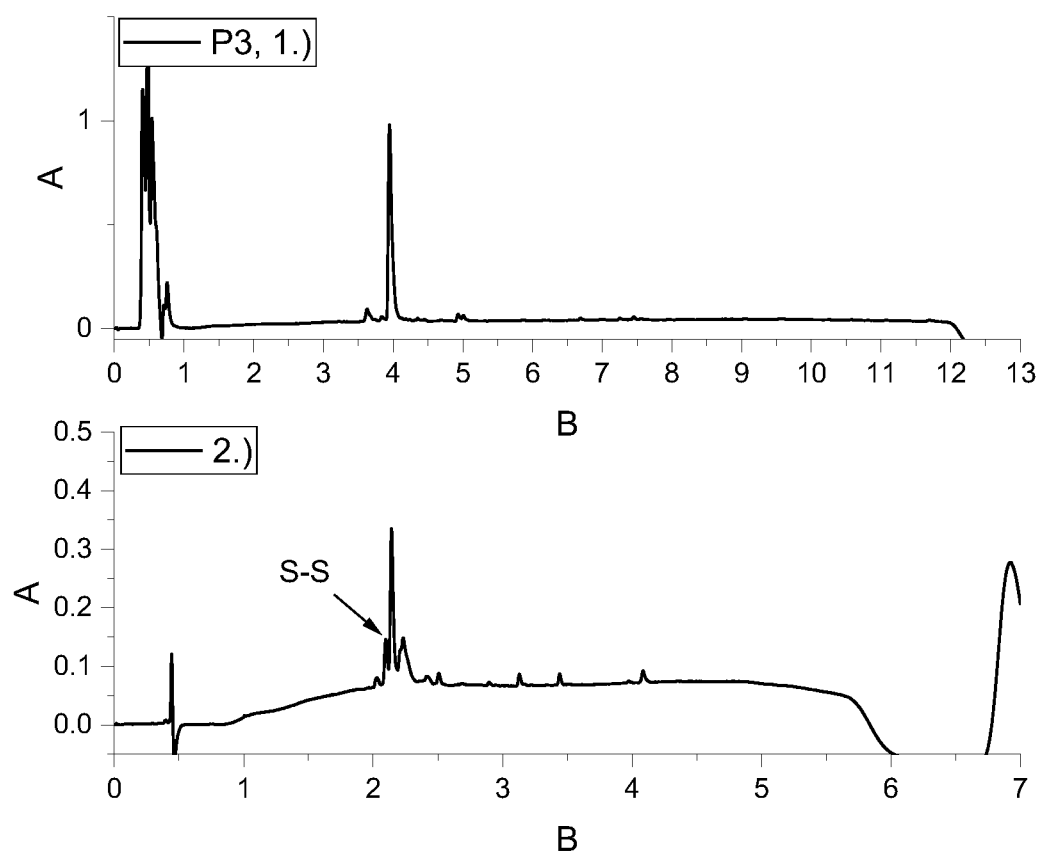

FIG. 11 shows an example of the inventive peptide modification/purification of peptide P3 (H-CRVPG-DAHHADSLC-NH₂) by usage of inventive linker molecule X1. A=absorption (210 nm), B=time/min; 1.) Chromatogram of trail cleavage of crude peptide sample before linker (X1) coupling to P3. 2.) Chromatogram of P3 after modification by air oxidation in DMSO/(NH₄)₂CO₃ pH 8.7 and purification as described in claims 1 to 5 and claim 13.

Figure 12:
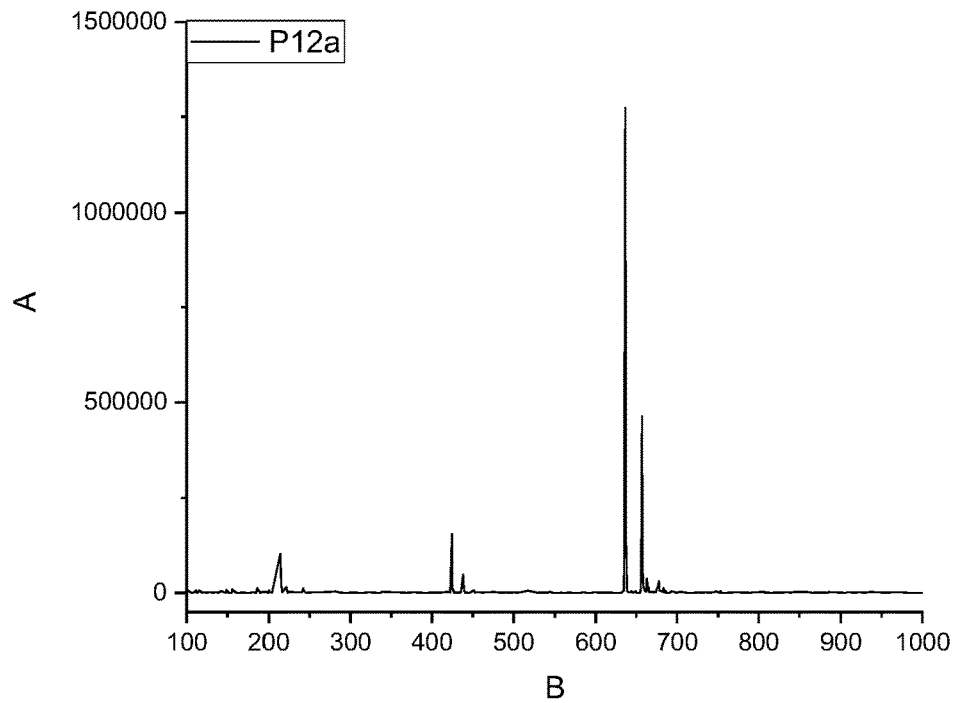

FIG. 12 shows the ESI-MS spectrum of the inventive modified peptide P12a (H-KKKKSC(C₃H₅O₂-diPalm)-NH₂) by usage of 1-bromopropyl-2,3-dipalmitate (Pam₂-Br). A=intensity, B=m/z.

Figure 13:
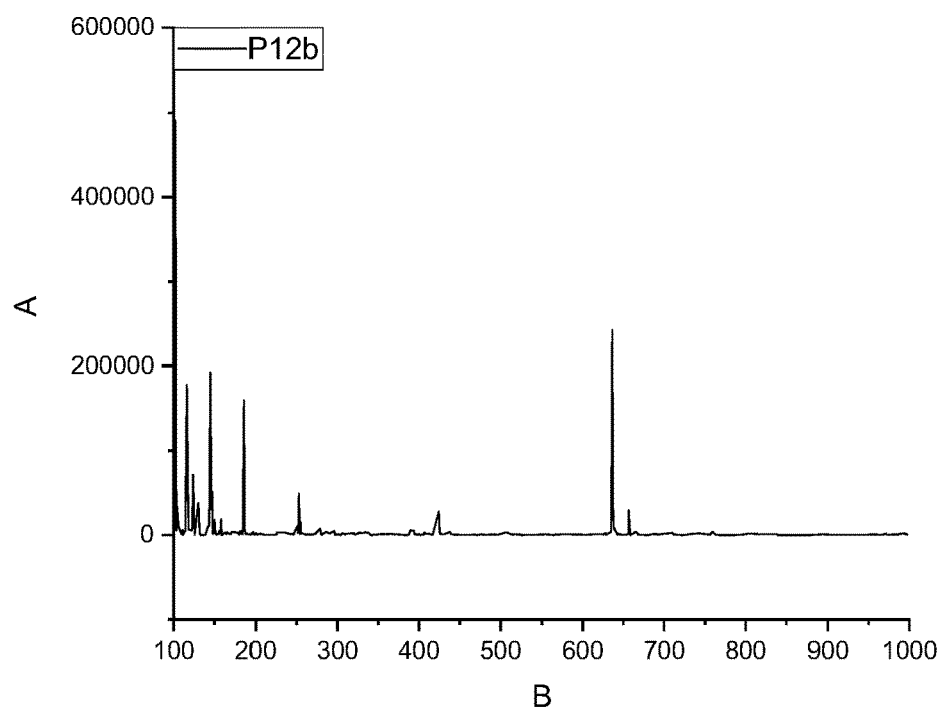

FIG. 13 shows the ESI-MS spectrum of the inventive modified peptide P12b (H-KKKKSC(C₃H₅O₂-diPalm)-NH₂) by usage of 1-iodopropyl-2,3-dipalmitate (Pam₂-I). A=intensity, B=m/z.

Figure 14:
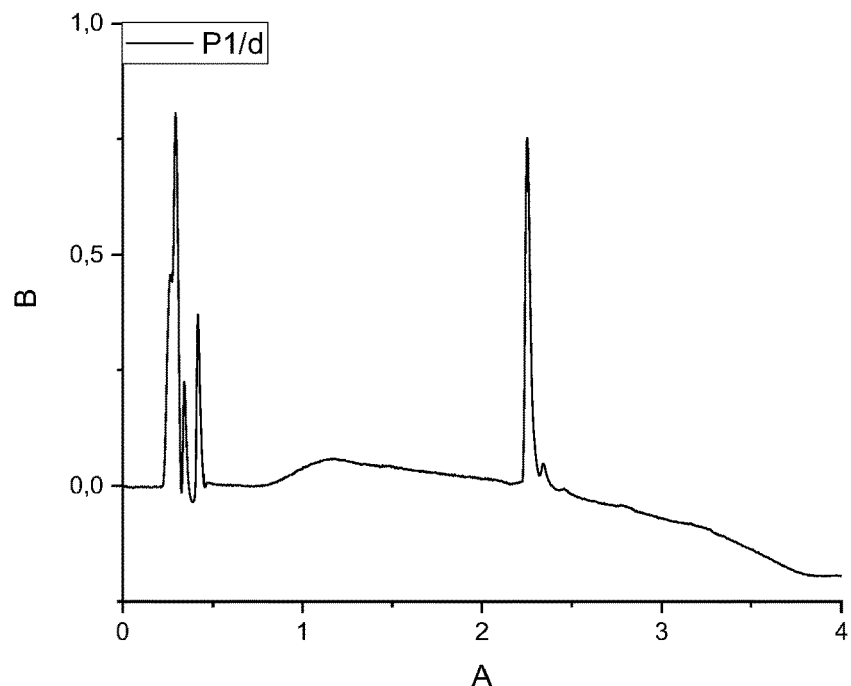

FIG. 14 shows the UV chromatogram of the inventive modified peptide P12d (H-KKKKSC(C₂H₄O-Palm)-NH₂) by usage of Palm-OC₂H₄I (Pam-Et-I). A=absorption (210 nm), B=time/min.

Figure 15:
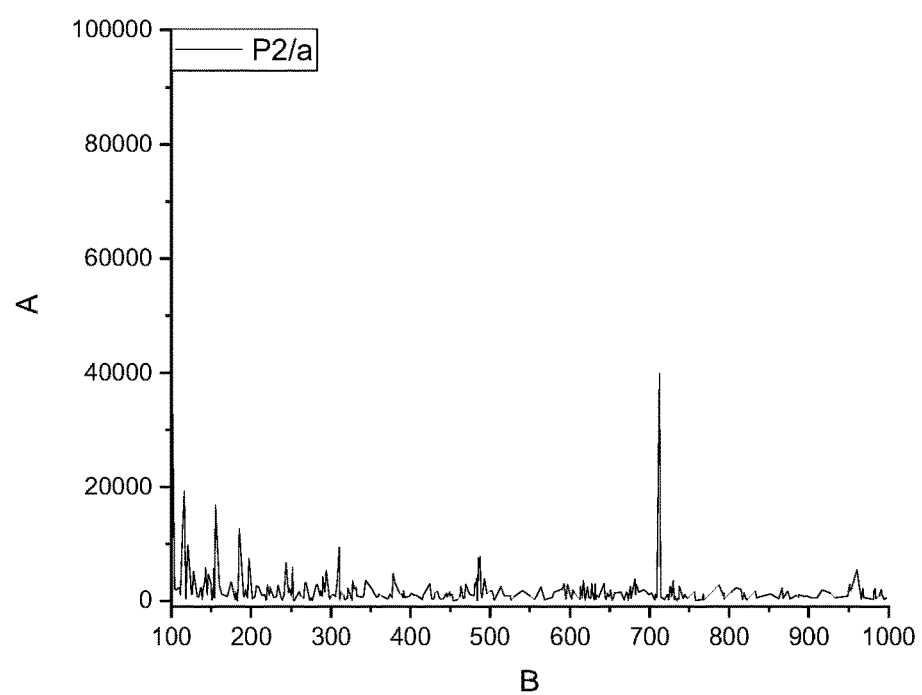

FIG. 15 shows the ESI-MS spectrum of the inventive modified peptide P13a (H-KEKFSINSEDNNGC(C₃H₅O₂-diPalm)-NH₂) by usage of 1-bromopropyl-2,3-dipalmitate (Pam₂-OTs). A=intensity, B=m/z.

Figure 16:
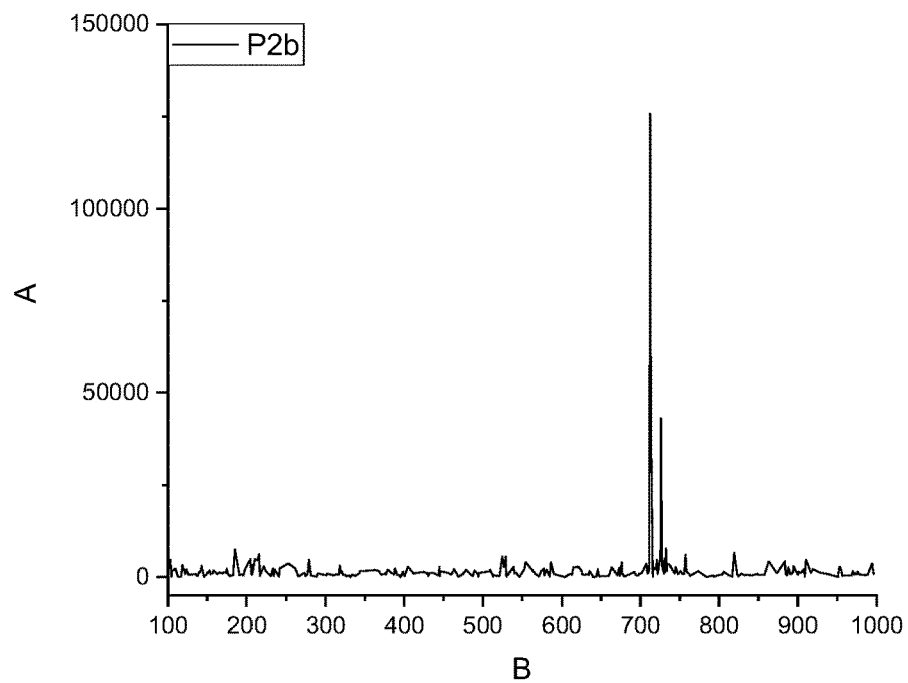

FIG. 16 shows the ESI-MS spectrum of the inventive modified peptide P13b (H-KEKFSINSEDNNGC(C₃H₅O₂-diPalm)-NH₂) by usage of 1-iodopropyl-2,3-dipalmitate (Pam2-I). A=intensity, B=m/z.

Figure 17:
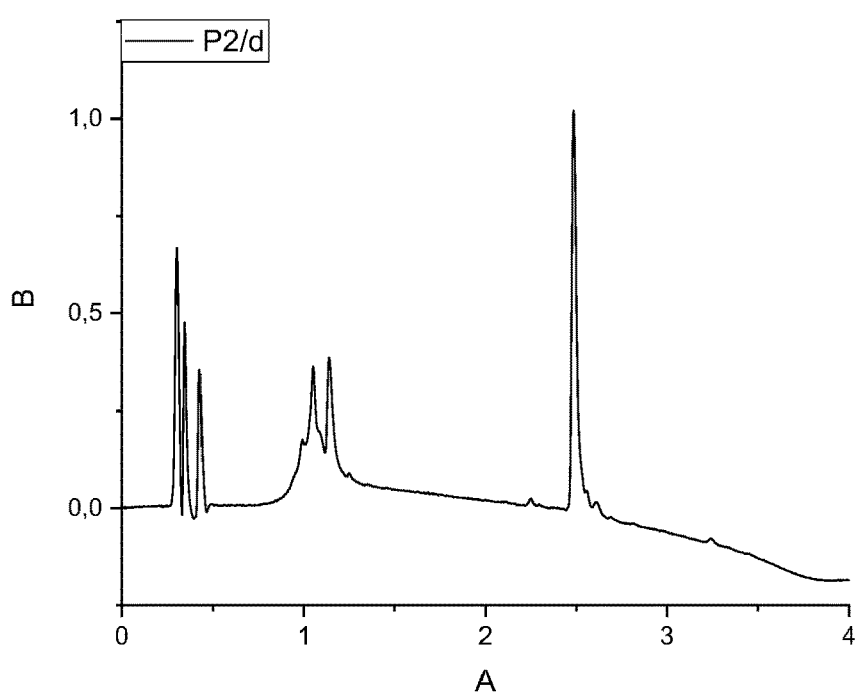

FIG. 17 shows the UV chromatogram of the inventive modified peptide P14d (H-KKKKSC(C₂H₄O-Palm)-NH₂) by usage of Palm-OC₂H₄I (Pam-Et-I); retention time=2.25 min. A=absorption (210 nm), B=time/min.

Figure 18:
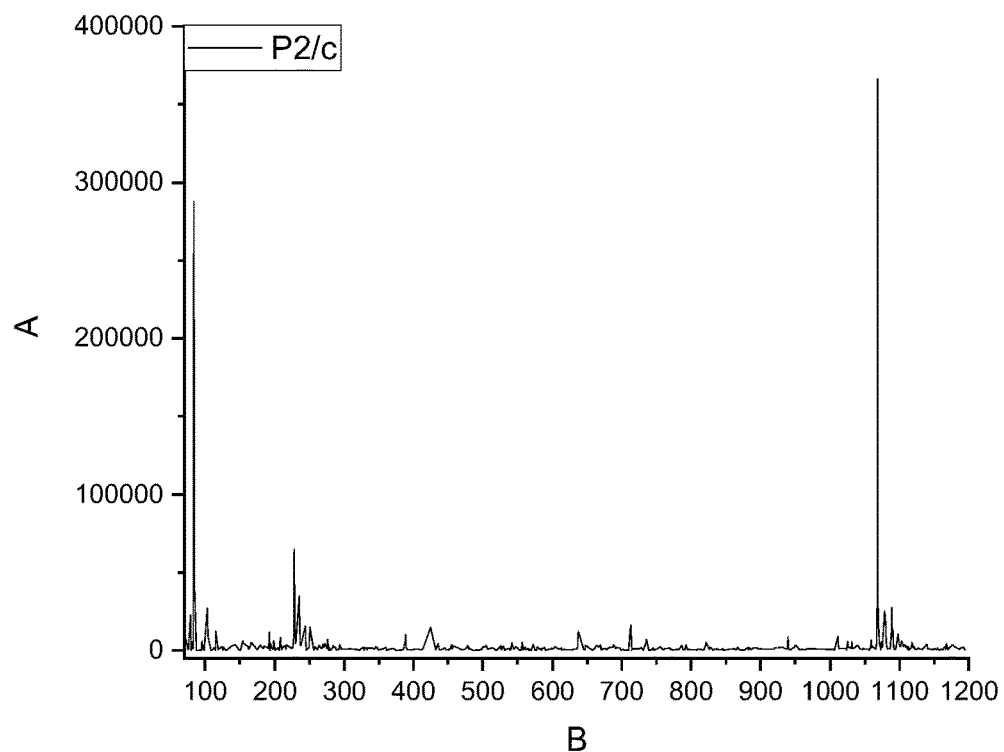

FIG. 18 shows the ESI-MS spectrum of the inventive modified peptide P2/c (H-KEKFSINSEDNNGC(propyl-di-Palm)-NH₂) by usage of 1-tosylpropyl-2,3-dipalmitate (X3). A=intensity, B=m/z.

Figure 19:
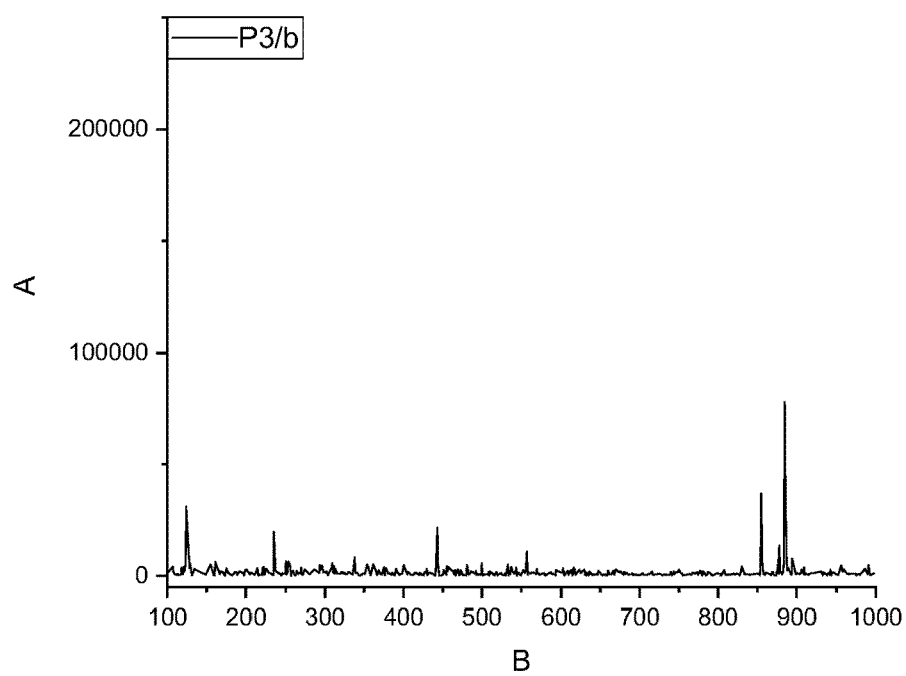

FIG. 19 shows the ESI-MS spectrum of the inventive modified peptide P14b (H—C(C3H5O2-diPalm)RG-NH₂) by usage of 1-iodopropyl-2,3-dipalmitate (Pam2-I). A=intensity, B=m/z.

Figure 20:
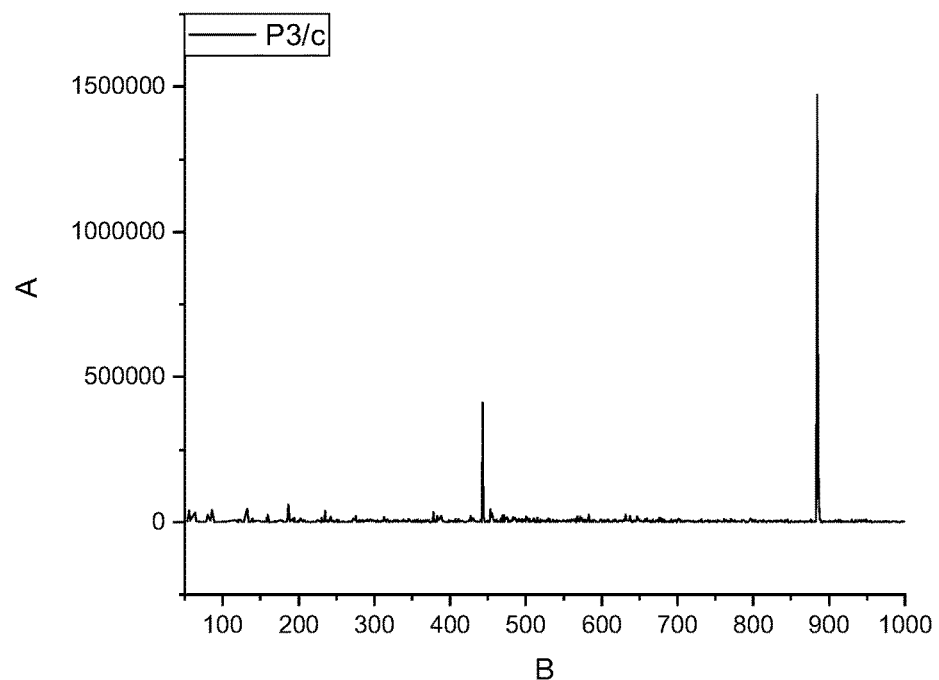

FIG. 20 shows the ESI-MS spectrum of the inventive modified peptide P14c (H—C(C3H5O2-diPalm)RG-NH₂) by usage of 1-tosylpropyl-2,3-dipalmitate (Pam2-OTs). A=intensity, B=m/z.

Figure 21:
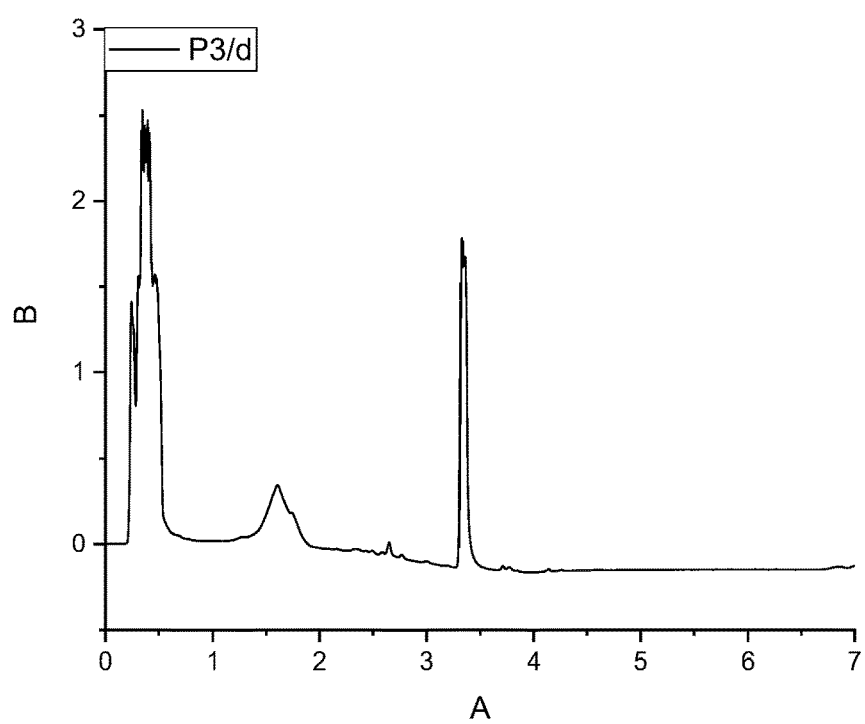

FIG. 21 shows the UV chromatogram of the inventive modified peptide P14d H—C(C₂H₄O—Palm)RG-NH₂ by usage of Palm-OC₂H₄I (Pam-Et-I); retention time=1.61 min. A=absorption (210 nm), B=time/min.

Figure 22:
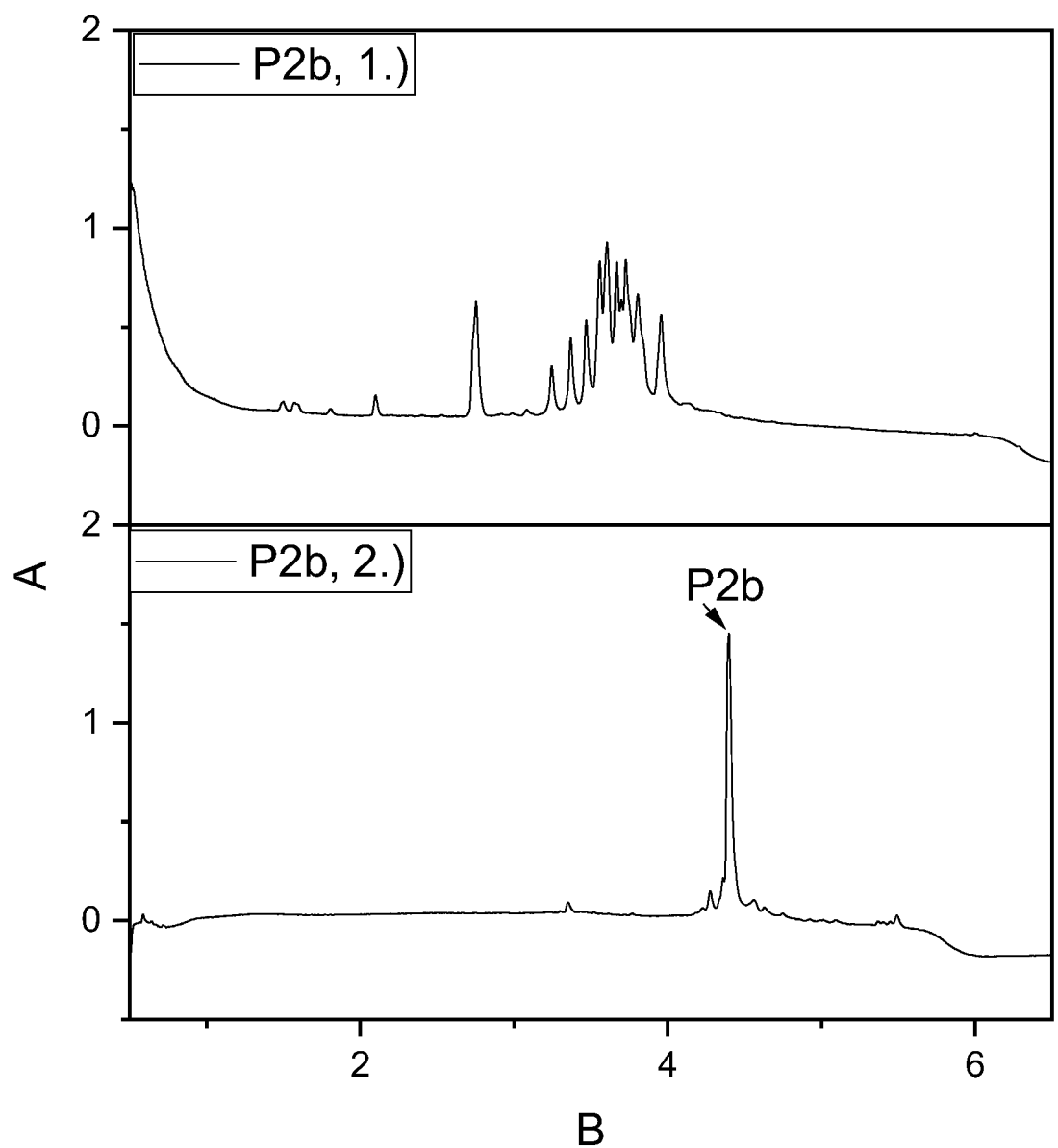

FIG. 22 shows examples of the inventive peptide modification/purification of peptide P2b (H-HAEGTFTSDVS-SYLEGQAAK(Palm-Glu-OH)EFIAWLVRGRG-OH) by usage of inventive linker molecule X1. A=absorption (210 nm), B=time/min; 1.) Chromatogram after TFA cleavage of crude peptide sample after linker coupling to P2b. 2.) Chromatogram of P2b after lipidation on solid support as described in Example Example 8 using Palm-Glu(OSu)-OtBu as the —OSu activated fatty acid spacer conjugate.

Figure 23:
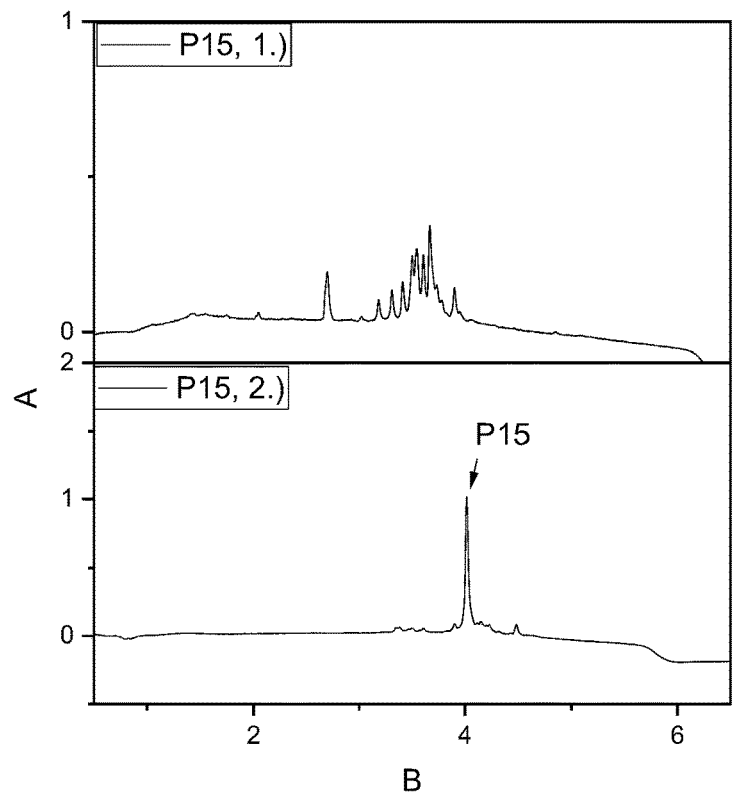

FIG. 23 shows examples of the inventive peptide modification/purification of peptide P15 (H-HAibEGTFTSDVS-SYLEGQAAK(CO$_2$H-Ste-Glu(aeea-aeea-OH)—OH)EFI-AWLVRGRG-OH) by usage of inventive linker molecule X1. A=absorption (210 nm), B=time/min; 1.) Chromatogram after TFA cleavage of crude peptide sample after linker coupling to P15. 2.) Chromatogram of P15 after lipidation on solid support as described in Example Example 9 using tBuOC(O)-Ste-Glu(aeea-aeea-OSu)-OtBu as the —OSu activated fatty acid spacer conjugate.

Figure 24:
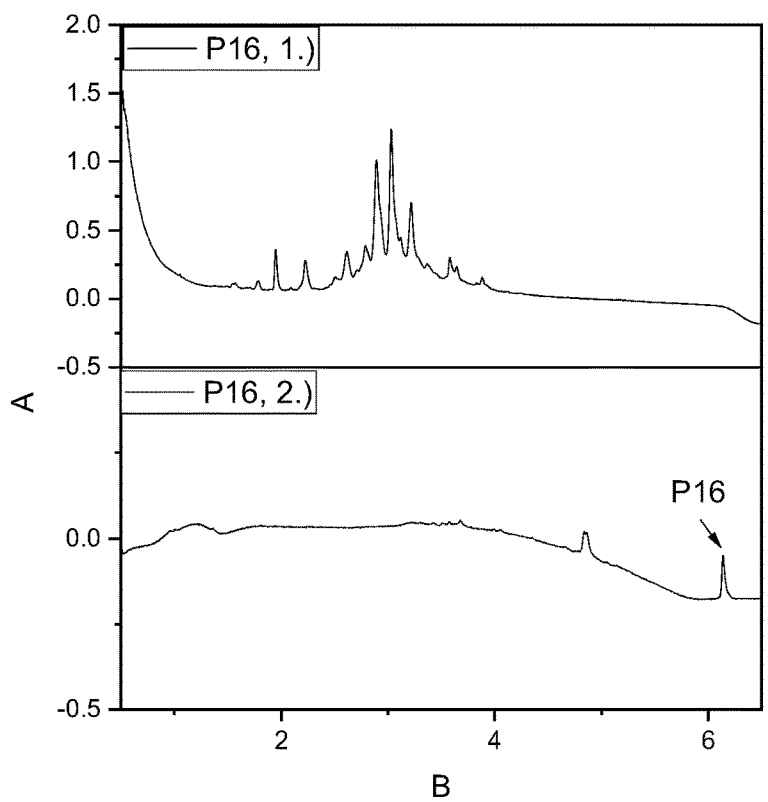

FIG. 24 shows examples of the inventive peptide modification/purification of peptide P16 (Palm-SGGK(Palm)WSK(Palm)SSVIGWPAVRER-NH$_2$) by usage of inventive linker molecule X1. A=absorption (210 nm), B=time/min; 1.) Chromatogram of trial cleavage of crude peptide sample after linker coupling to P16. 2.) Chromatogram of P16 after lipidation on solid support as described in Example Example 10 using Palm-S as an activated lipid.

Figure 25:
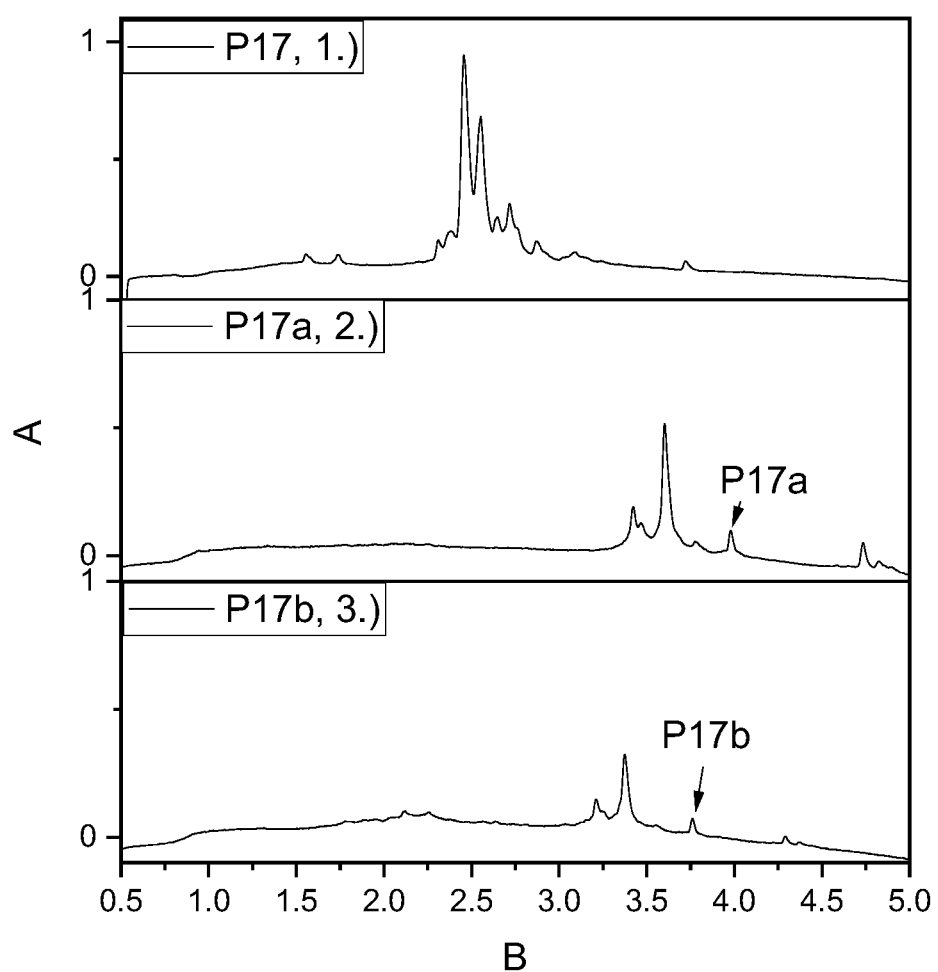

FIG. 25 shows examples of the inventive peptide modification/purification of peptide P17a (Palm-SGGKWSK(Palm)SSVIGWPAVRER-NH$_2$) P17b (Myr-SGGKWSK(Myr) SSVIGWPAVRER-NH$_2$) by usage of inventive linker molecule X1. A=absorption (210 nm), B=time/min; 1.) Chromatogram of trial cleavage of crude peptide sample after linker coupling to P17. 2.) Chromatogram of P17a after lipidation on solid support as described in Example Example 10 using Palm-S as the activated lipid with spacer. 2.) Chromatogram of P17a after lipidation on solid support as described in Example Example 11 using Myr-OSu as an activated lipid.

Figure 26:
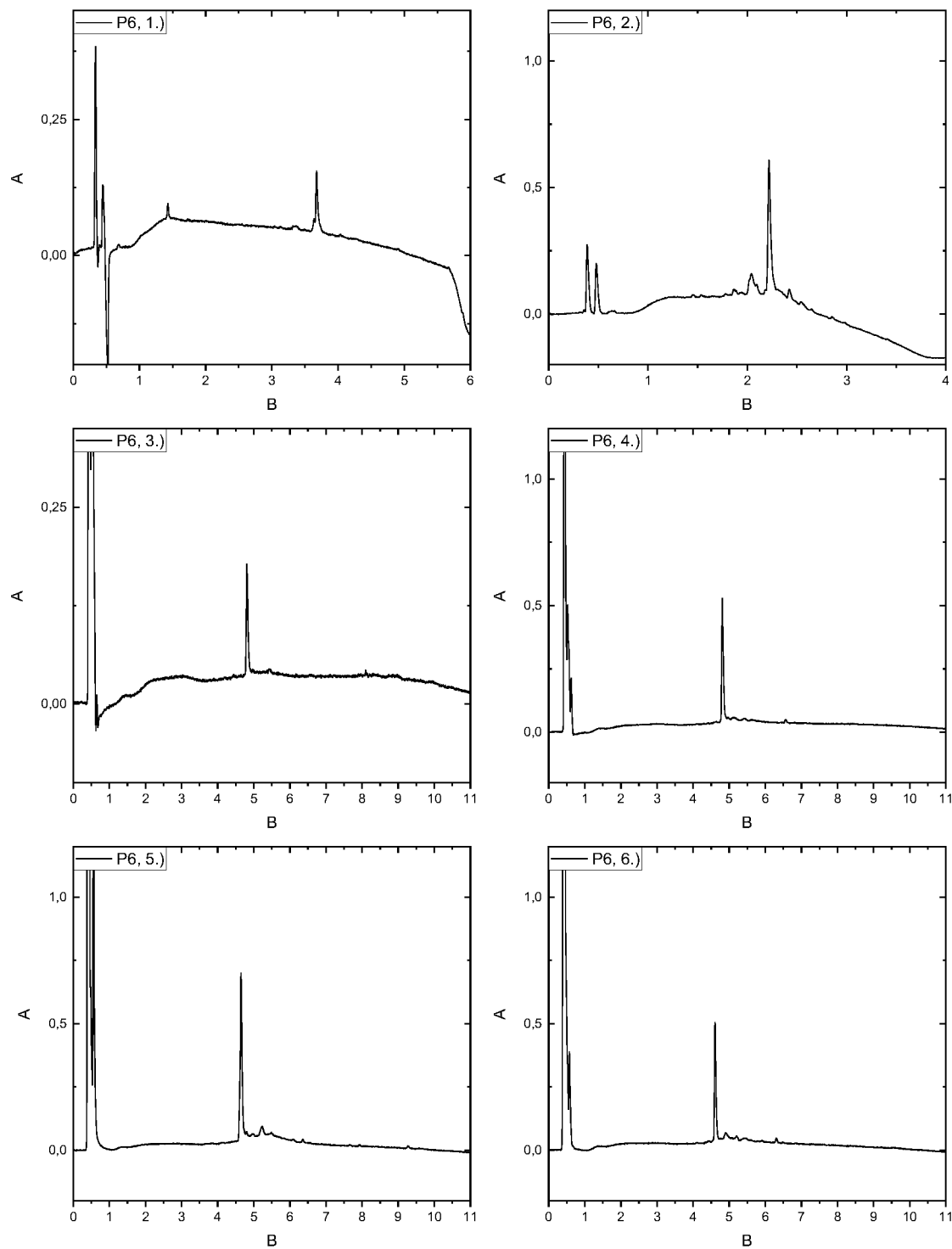

FIG. 26 shows examples of the inventive peptide modification/purification of peptide

P6
(H-ACSWPARCLHQDLCA-NH$_2$)

by usage of inventive linker molecule X1. A=absorption (210 nm), B=time/min; 1.) Chromatogram of trial cleavage of crude peptide sample before linker coupling to P6. 2.) Chromatogram of P6 after linker (LuS1) coupling and TFA cleavage from SPPS resin. 3.) Chromatogram of P6 after intramolecular bicyclization with TATB and purification as described in Example 12 using aldehyde-modified Agarose as solid phase and DMSO+10 vol. % Immobilization Buffer 2 as peptide solvent for immobilisation. 4.) Chromatogram of P6 after intramolecular bicyclization with TATB and purification as described in Example 13 using aldehyde-modified poly (methyl acrylate) beads as solid phase and pure HFIP as peptide solvent for immobilisation. 5.) Chromatogram of P6 after intramolecular bicyclization with TATB and purification as described in claims Example 14 using aldehyde-modified Agarose as solid phase and 1 M SDS in DMSO+10 vol. % Immobilization Buffer 2 as peptide solvent for immobilisation. 6.) Chromatogram of P6 after intramolecular bicyclization with TATB at 1° C. and purification as described in Example 16 using aldehyde-modified poly (methyl acrylate) beads as solid phase and pure HFIP as peptide solvent for immobilisation.

Figure 27:
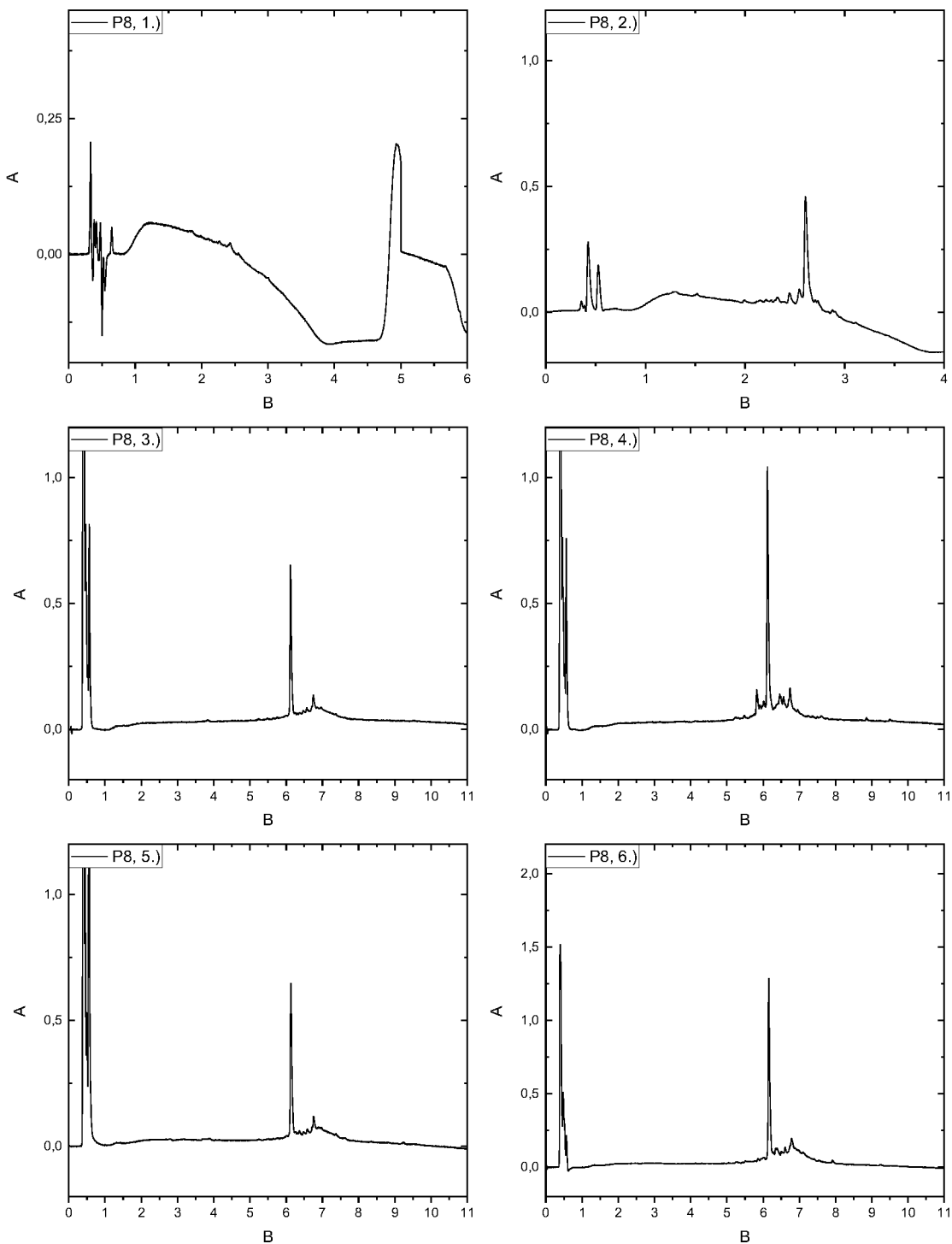

FIG. 27 shows examples of the inventive peptide modification/purification peptide

P8
(H-ACYNEFGCEDFYDICA-NH$_2$)

by usage of inventive linker molecule X1. A=absorption (210 nm), B=time/min; 1.) Chromatogram of trial cleavage of crude peptide sample before linker coupling to P8. 2.) Chromatogram of P8 after linker (LuS1) coupling and TFA cleavage from SPPS resin. 3.) Chromatogram of P8 after intramolecular bicyclization with TATB and purification as described in Example 12 using aldehyde-modified Agarose as solid phase and DMSO+10 vol. % Immobilization Buffer 2 as peptide solvent for immobilisation. 4.) Chromatogram of P8 after intramolecular bicyclization with TATB and purification as described in Example 13 using aldehyde-modified poly (methyl acrylate) beads as solid phase and pure HFIP as peptide solvent for immobilisation. 5.) Chromatogram of P8 after intramolecular bicyclization with TATB and purification as described in Example 14 using aldehyde-modified Agarose as solid phase and 1 M SDS in DMSO+10 vol. % Immobilization Buffer 2 as peptide solvent for immobilisation. 6.) Chromatogram of P8 after intramolecular bicyclization with TATB at 1° C. and purification as described in Example 16 using aldehyde-modified poly (methyl acrylate) beads as solid phase and pure HFIP as peptide solvent for immobilisation.

Figure 28:
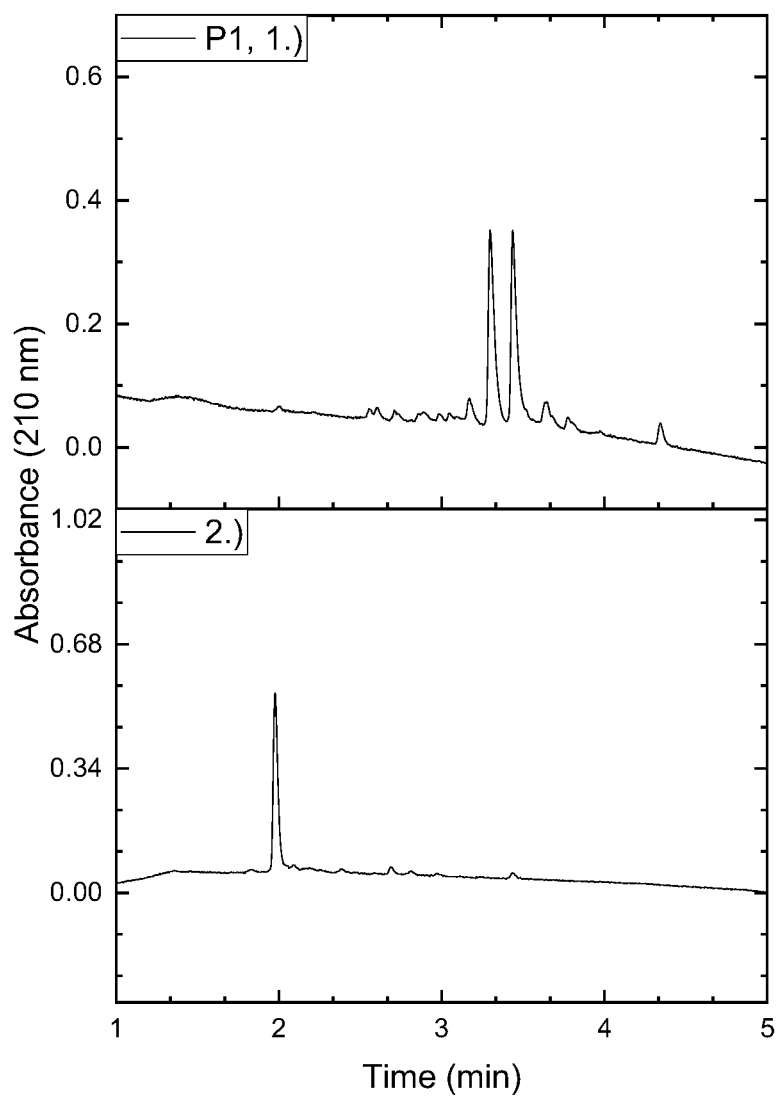

FIG. 28 shows an example of the inventive peptide modification/purification of peptide

P3
(H-CRVPGDAHHADSLC-NH$_2$)

by usage of inventive linker molecule X1. A=absorption (210 nm), B=time/min; 1.) Chromatogram of P3 after linker (X1) coupling and final TFA-cleavage. 2.) Chromatogram of P3 after disulfide formation and purification as described in claims 1-9.

Figure 29:
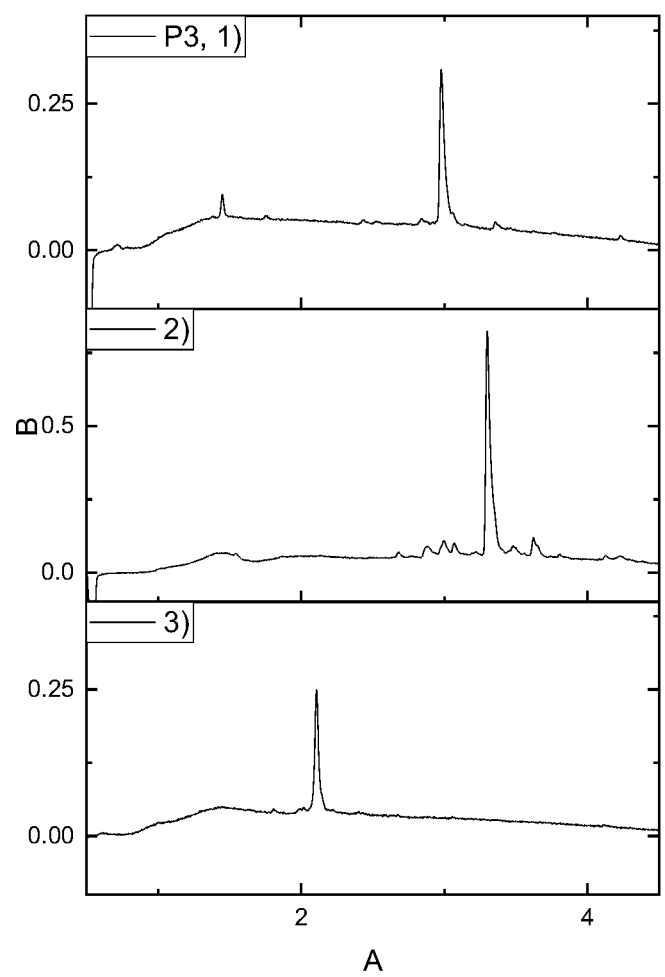

FIG. 29 shows an example of the inventive peptide modification/purification peptide

P4
(H-VRCPGAAHHADSLC-NH$_2$)

by usage of inventive linker molecule X1. A=absorption (210 nm), B=time/min; 1.) Chromatogram of trail cleavage of crude peptide sample before linker coupling to P3. 2.) Chromatogram of P4 after linker (X1) coupling and final TFA-cleavage. 3.) Chromatogram of P4 after disulfide formation and purification as described in claims 1-9.

Figure 30:
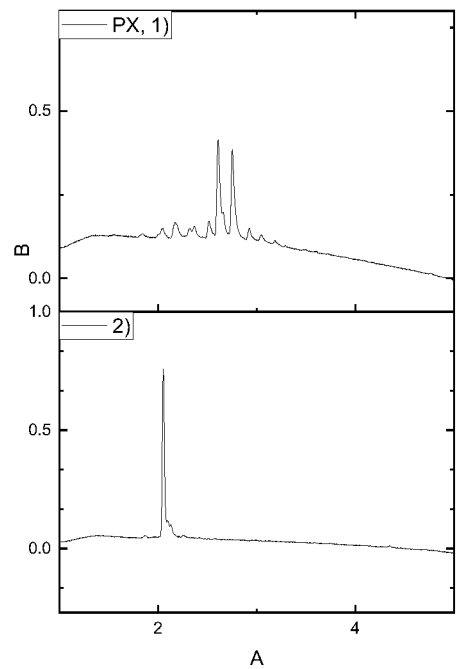

FIG. 30 shows an example of the inventive peptide modification/purification of peptide

P9
(H-CYFQNCPRG-NH$_2$)

by usage of inventive linker molecule X1. A=absorption (210 nm), B=time/min; 1.) Chromatogram of P9 after linker (X1) coupling and final TFA-cleavage. 2.) Chromatogram of P9 after disulfide formation and purification as described in claims 1-9.

Figure 31:
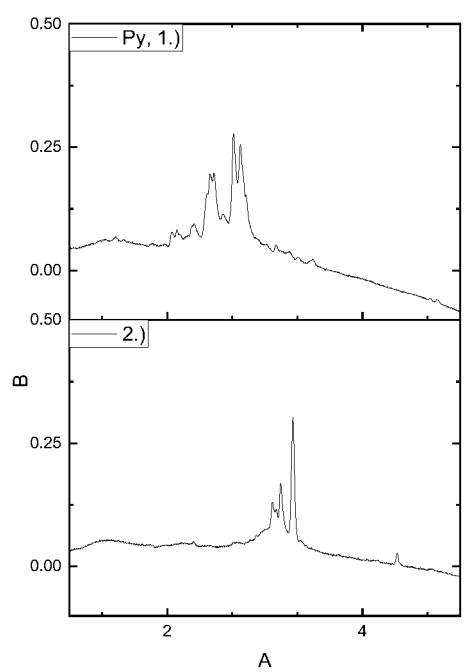

FIG. 31 shows an example of the inventive peptide modification/purification of peptide

PY
(H-KCNTATCATQRLANFLVHSSNFGPILPPTNVGSNTY-NH$_2$)

by usage of inventive linker molecule X1. A=absorption (210 nm), B=time/min; 1.) Chromatogram of PY after linker (X1) coupling and final TFA-cleavage. 2.) Chromatogram of PY after disulfide formation and purification as described in claims 1-9.

Figure 32:
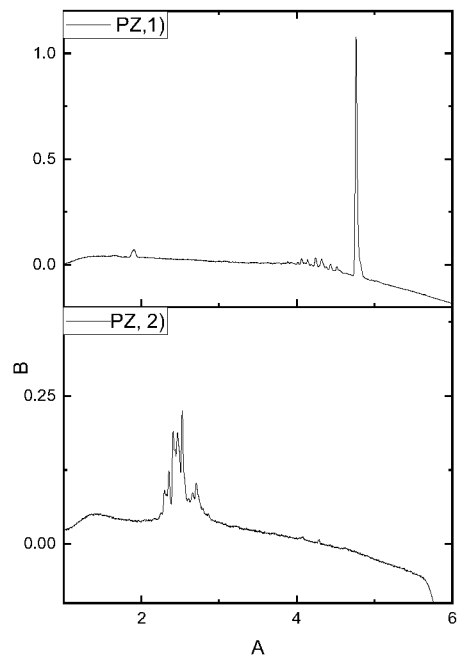

FIG. 32 shows an example of the inventive peptide modification/purification of peptide PZ (H-CCEYCCN-PACTGCY-NH$_2$) by usage of inventive linker molecule X1. A=absorption (210 nm), B=time/min; 1.) Chromatogram of PY after linker (X1) coupling and final TFA-cleavage. 2.) Chromatogram of PY after disulfide formation and purification as described in claims 1-9.

Figure 33:
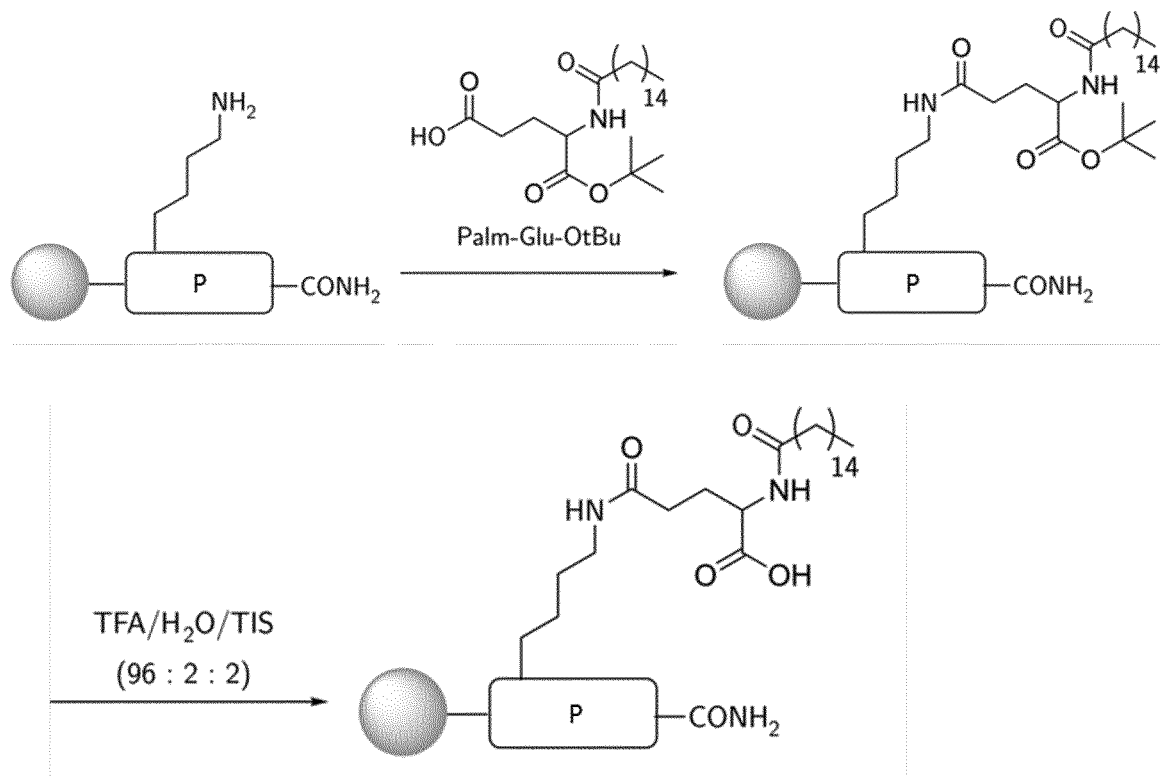

FIG. 33 shows formation of a lipidated peptide P. The peptide P is immobilized on a solid support (grey sphere) and the peptide comprises a lysine. In a first step, an organic molecule Palm-Glu-OtBu is coupled to the lysine side chain. Palmitoyl (Palm) corresponds to the moiety FA, the glutamic acid moiety protectec by tert-butyl(Glu-OtBu) corresponds to the spacer Sp-OH. In a second step, the protecting tert-butyl protecting group is removed under acidic conditions.

EXAMPLES

General Methods
Solid Phase Peptide Synthesis (SPPS) Linker Coupling and TFA-Cleavage:

The peptide sequences P1-P8 were synthesized in 100 µmol scale under standard solid phase peptide synthesis conditions on a Intavis MultiPep RSi, whereby the synthetic resin was treated with acetic anhydride and pyridine after each amino-acid coupling to block unreacted amino groups. The resin was preswollen for 15 min prior to linker coupling. Linker X1 was coupled to P1-P17 on resin by usage of 4 eq linker X1 (301 mg), 6 eq oxyma (86 mg) and 6 eq diisopropylamine (DIEA, 105 µL) for 2 h in 1.3 mL DMF. The amounts used were based on the loading of the SPPS resin (Rinkamide RAM). The reaction mixture was shaken for 120 min, filtered off, washed (3×DMF, 3×DCM) and dried.

The dried resin was incubated with TFA-Cleavage cocktail (TFA/H$_2$O/PhOH/PHSH/Ethandithiol, 82.5:5:5:52.5, v/v/w/v/v, 10 mL per 100 µmol synthetic scale) for 120 min. The cleavage solution was separated from the synthesis resin by filtration and collected in a Falcon tube 10 times the volume of the solution. By adding 9-fold the volume of refrigerated diethyl ether, the peptide was precipitated. The vessel was centrifuged at 5000 rpm for 3.5 min, the supernatant solution decanted off and the peptide pellet washed again with diethyl ether followed by decantation. The peptides were then dissolved in H$_2$O/MeCN/TFA, (99.95:99.95: 0.1, v/v/v), frozen with liquid nitrogen and lyophilized under high vacuum.

General Procedure to Modify and Purify Peptides by the Inventive Method
Dissolution and Immobilization of Crude Linker-Tagged Peptides The crude linker-tagged peptide mixture was dissolved in pure DMSO (4.5 mL for 100 µmol synthetic scale). After complete dissolution 10 vol. % Immobilisation Buffer 2 (0.1 M citric Acid/Na$_2$CO$_3$ pH 3.5 with 8 M guanidinium chloride, 0.45 mL for 100 µmol synthetic scale) was added.

The linker-tagged peptide is immobilized on 1.5 times the amount of aldehyde-modified agarose loaded with 100 µmol/1 mL settled beads (100 µmol/2 mL of slurried beads) or on hydroxylated poly(methyl acrylate) beads. After aliquoting, the beads material is washed with 3× milli-Q water and 3× immobilization buffer 1 (0.1 M citric Acid/Na$_2$CO$_3$ pH 4.5). The dissolved crude linker-tagged peptide mixture was then added to the agarose and shaken. Of note, the beads should have a free and good fluctuation in the immobilization solution. After a reaction time of 90 minutes, the immobilization solution is filtered off with suction.

Washing

After immobilization the supernatant was removed and beads linker-connected to the peptides were washed each, three-times 5 mL (for 100 µmol scale) with DMSO. Thereafter a mixture of L-Cysteine in 0.1 M citric Acid/Na$_2$CO$_3$ pH 4.5 is added, and reactors are shaken for 15 min or longer. This mixture was removed and beads were washed three-times with 5 mL (for 100 µmol scale) with the following solvents and solutions:
1) DMSO with 0.9 M guanidinium chloride
3) 70% ethanol in with 0.1 M NaCl Milli-Q water Modification of Immobilized Peptide on Solid Support Generally, modification of target peptides was preformed after immobilization of the linker-tagged peptide on the modification/purification support and washing of said peptide-support conjugate.

In case of fatty acid modification of peptide, after immobilization and washing of target peptide, possibly build imines of lysine side chains with excess aldehydes and said aldehydes were transformed into oximes by addition of O-methylhydroxylamine hydrochloride or L-Cysteine. Thereafter the fatty acid is added together with a coupling reagent, with organic base after a preactivation time to the peptide on support. Thereafter excess of reagents are washed out and the peptide is released as described below.

In case of macrocycle formation via electrophilic scaffolds, after immobilization and washing of target peptide possibly build disulfide were reduced by addition of a small amount of DTT. After washing DTT out, the electrophilic scaffold was added to the support. If necessary, this step can be repeated to increase conversion to the macrocyclic product. Thereafter excess of reagents are washed out and the peptide is released as described below.

In case of disulfide formation, after immobilization and washing of target peptide, possibly build imines of lysine side chains and thioacetals of cysteine side chains with excess aldehydes and said aldehydes were transformed into thiazolidines by addition guanidinium chloride. Disulfide were formed in a 1 to 1 mixture of DMSO and 0.4 M (NH$_4$)$_2$CO$_3$, 6M GdmCl on the support. Thereafter the oxidation buffer was washed out and the peptide is released as described below.

Release of Modified Peptides 500 mg of dithiothreitol (DTT) are dissolved in 5 ml of 5 w. % NaHCO$_3$ pH 8, added to the agarose or poly(methyl acrylate) material were 5 mL MeCN was already on the beads and shaken for 15 min. The supernatant is discarded, and the agarose material is washed 3× with water and 2× with MeCN to remove excess DTT and oxidized DTT. Subsequently, 2 mL TFA/H$_2$O (2:3) are added and shaken for a further 60 min. Then another 2 mL of pure TFA are added to the solution, the mixture is eluted and collected in a Falcon tube. It is eluted two more times with 2 mL each of TFA/H$_2$O (95:5). The linker peptide is precipitated by addition of 9 times the volume of deep-frozen diethyl ether and then centrifuged 5000 rpm for 3.5 min and the ether phase is decanted off. The peptide is now present as a pellet and can be lyophilized if necessary.

Experimental Description for Organic Synthesis of FA-A and FA-Sp-A

Synthesis of 1-bromopropyl-2,3-dipalmitate (Pam$_2$-Br)

1,2-Dipalmitoyl-sn-glycerol (0.4 g, 0.7 mmol, 1 eq) was dissolved in 9 mL DCM and tetrabromomethane (0.5 g 1.5 mmol, 2.1 eq) was added. The solution was cooled to 0° C. and triphenylphosphine (0.4 g 1.5 mmol, 2.1 eq) was added in portions within 5 min. After stirring for 30 min at 0° C., the ice bath was removed and stirring was continued at rt for 3 h. The solvent was removed under reduced pressure. Cyclohexane was added and the mixture was sonicated for about 10 min. After centrifugation, the supernatant was transferred into a clean tube and the solvent was removed under reduced pressure to obtain the crude product. To remove residual O=PPh$_3$, the product was treated with MeOH in a sonication bath. After centrifugation, the solvent was decanted. The wash with methanol was repeated twice to afford 1-bromopropyl-2,3-dipalmitate (Pam$_2$-Br) as an off-white solid (0.17 g, 0.27 mmol, 39%).

R$_f$=0.68 (chloroform/ethyl acetate 96:4); UPLC-MS: t$_R$=5.69 min (gradient 0-3 min 40-100% D (0.1% TFA in 9:1 MeCN/iPrOH) in C (0.1% TFA in 8:1:1 H2O/MeCN/iPrOH), 3-6 min 100% D); UPLC-purity (210 nm) 98%; ESI-MS: (calculated [M+Na]$^+$: 653.41, 655.41, found: 653.21, 655.68; calculated [M-OCOC$_{15}$H$_{31}$]$^{·+}$: 375.19, 377.19, found: 375.27, 377.26).

$^1$H NMR (400 MHz, CDCl$_3$) δ 5.21 (qd, J=5.5, 4.4 Hz, 1H), 4.29 (ddd, J=17.5, 11.9, 5.0 Hz, 2H), 3.50 (qd, J=10.9, 5.5 Hz, 2H), 2.34 (m, 4H), 1.62 (m, 4H), 1.28 (m, 48H), 0.88 (t, J=6.9 Hz, 6H).

Synthesis of 1-iodopropyl-2,3-dipalmitate (Pam$_2$-I)

1,2-Dipalmitoyl-sn-glycerol (0.5 g, 0.88 mmol, 1 eq), imidazole (0.12 g, 1.76 mmol, 2 eq) and triphenylphosphine (0.5 g 1.99 mmol, 2.3 eq) was dissolved in 7.5 mL THF. I$_2$ (0.32 g 1.67 mmol, 2.0 eq) was slowly added to the solution. After 4 h stirring at rt, 250 mg NaHCO$_3$ and 1 mL water was added to quench the reaction. The color of the reaction mixture disappeared. The solvent was evaporated and the residue was washed with 4 mL water. The suspension was centrifuged and the supernatant was decanted. The crude product was treated 6 mL MeOH in a sonication bath for several minutes. After centrifugation, the supernatant was decanted. The precipitate was washed another four times with 6 mL MeOH. The product was dried in vacuo to afford 0.47 g (0.69 mmol, 78%) 1-iodopropyl-2,3-dipalmitate as an off-white solid.

R$_f$=0.66 (chloroform/ethyl acetate 96:4); UPLC-MS: t$_R$=5.83 min (gradient 0-3 min 40-100% D in C, 3-6 min 100% D); UPLC-purity (210 nm) 90%; ESI-MS: (calculated [M+Na]$^+$: 701.40, found: 701.50; calculated [M-OCOC$_{15}$H$_{31}$]$^{·+}$: 423.18, found: 423.28).

$^1$H NMR (400 MHz, CDCl$_3$) δ 5.00 (m, 1H), 4.26 (ddd, J=17.6, 11.8, 5.0 Hz, 2H), 3.31 (ddd, J=27.4, 10.7, 5.8 Hz, 2H), 2.33 (m, 4H), 1.63 (m, 4H), 1.28 (m, 48H), 0.88 (t, J=6.8 Hz, 6H).

Synthesis of 1-Tosylpropyl-2,3-dipalmitate (Pam$_2$-OTs)

4-Toluenesulfonyl chloride (2 g, 10.5 mmol, 10 eq) was dissolved in 50 mL THF. The solution was cooled to 0° C. with an ice bath. 1,2-Dipalmitoyl-sn-glycerol (0.6 g, 1.05 mmol, 1 eq) was dissolved in 14.4 mL THF at rt and 2.84 mL 15 w % aq. NaOH (10.7 mmol, 10 eq) was added. Slowly, the 4-toluenesulfonyl chloride solution was added and the reaction mixture was stirred for 4 h at rt. The solvent was evaporated under reduced pressure and the residue was taken up in chloroform. The organic phase was washed thrice with brine and thrice with water and was then dried over Na$_2$SO$_4$. After filtration, the solvent was removed under reduced pressure to obtain the crude product as yellow liquid, which turned into a solid after drying in vacuo. 5 mL chilled MeOH was added and the resulting mixture was sonicated for 10 min. After centrifugation, the supernatant was decanted. The residue was treated another five times with MeOH to remove excess tosyl chloride. The product was dried in vacuo to afford 0.47 g (0.64 mmol, 61%) off-white solid.

R$_f$=0.64 (chloroform/ethyl acetate 96:4); UPLC-MS: t$_R$=4.99 min (gradient 0-3 min 40-100% D in C, 3-6 min 100% D); UPLC-purity (210 nm)=93%; ESI-MS: (calculated [M+Na]$^+$: 745.51, found: 745.68).

$^1$H NMR (400 MHz, CDCl$_3$) δ 7.80 (t, J=8.0 Hz, 2H), 7.35 (dd, J=8.2, 3.1 Hz, 2H), 4.88 (m, 1H), 4.18 (m, 4H), 2.45 (s, 3H), 2.23 (m, 4H), 1.56 (m, 4H), 1.27 (m, 48H), 0.88 (t, J=7.0 Hz, 6H).

Synthetic Steps for the Synthesis of 2-iodoethyl Palmitate (Pam-Et-I)

Palmitoyl Chloride

Thionyl chloride (7.2 mL, 100 mmol, 10 eq) slowly added dropwise to palmitic acid (2.6 g, 9.9 mmol, 1 eq) in a round-bottom flask. After stirring for 30 min at rt, the reaction mixture was stirred for 2 h at 75° C. The solution was diluted with DCM and washed three times with water. The organic layer was dried over Na$_2$SO$_4$. The salt was removed by filtration and the solvent was removed under reduced pressure. The resulting solution was dried under vacuo to give the product as colorless solid (2.47 g, 9 mmol, 90%).

R$_f$=0.52 (chloroform/ethyl acetate 96:4).

2-iodoethyl Palmitate (Pam-Et-I)

To a solution of 2-iodoethanol (0.71 mL, 9.1 mmol, 5 eq) in 18 mL DCM under nitrogen atmosphere was added triethylamine (0.5 mL, 3.6 mmol, 3 eq). The solution was stirred for 30 min at 0° C. Palmitoyl chloride (0.5 g, 1.8 mmol, 1 eq) was added at 0° C. Stirring was continued for 4 h at rt. The solution was successively washed three times each with water and saturated aq. NaHCO$_3$. After drying over Na$_2$SO$_4$ and filtration, the solvent was removed under vacuo. The resulting crude product was treated with MeOH in a sonication bath and the suspension was centrifuged. The supernatant was decanted and the residue was washed another two times with MeOH. The MeOH solutions from the second and third wash were combined and kept at room temperature overnight to crystalize the product as colorless needles. The solvent was removed and the crystals were dried in vacuo to afford 0.15 g (0.36 mmol, 20%) product.

R$_f$=0.43 (chloroform/ethyl acetate 96:4.

$^1$H NMR (400 MHz, CDCl$_3$) δ 4.33 (t, J=6.8 Hz, 2H), 3.29 (t, J=6.8 Hz, 2H), 2.33 (t, J=7.5 Hz, 2H), 1.64 (p, J=7.4 Hz, 2H), 1.26 (m, 24H), 0.88 (t, J=6.9 Hz, 3H).

Synthesis of Myristic Acid N-hydroxysuccinimide Ester (Myr-OSu)

To the stirred solution of 1 g myristic acid (4.33 mmol, 1 eq) and 554 mg N-hydroxysuccinimide (4.77 mmol, 1.1 eq) in 44 mL acetonitrile was added 994 mg dicyclohexyl carbodiimide (DCC, 4.77 mmol, 1.1 eq) and the mixture was stirred for 1.5 h. The formed precipitate was removed by filtration and the filtrate was washed with 50 mL of acetonitrile to. Then 1.430 g (4.33 mmol, quant. Yield) of the desired white crystalline title compound was gained by evaporation of the solvent and drying under reduced pressure. ESI-MS: (calculated [M+Na]$^+$: 348.22, found: 348.28).

Synthesis of 22-(tert-butoxycarbonyl)-43,43-dimethyl-10,19,24,41-tetraoxo-3,6,12,15,42-pentaoxa-9,18,23-triazatetratetracontanoic N-hydroxysuccinimide Ester (tBuOC(O)-Ste-Glu(aeea-aeea-OSu)-OtBu)

To the stirred solution of 260 g 22-(tert-butoxycarbonyl)-43,43-dimethyl-10,19,24,41-tetraoxo-3,6,12,15,42-pentaoxa-9,18,23-triazatetratetracontanoic acid (0.3 mmol, 1 eq) and 39 mg N-hydroxysuccinimide (0.33 mmol, 1.1 eq) in 6 mL acetonitrile was added 67 mg DCC (0.33 mmol, 1.1 eq) and the mixture was stirred for 1.5 h. The formed precipitate was removed by filtration and the filtrate was washed with 10 mL of acetonitrile to. Then 0.305 g (0.30 mmol, quant. yield) of the desired title compound was gained as a colorless oil after evaporation of the solvent and drying under reduced pressure. ESI-MS: (calculated [M+H]$^+$: 943.59, found: 943.72).

Example 1: Formation of Lipidated Peptides P1-P2a Bound to Purification Solid Support with palmitoyl-L-Glu(OH)-tBu-building Block The inventive method for the modification and purification of peptides was applied to two peptides of different length and polarity, these were

```
                                              (SEQ ID NO: 1)
H-AKEFIAWLVRGRG-NH₂  (P1)
a fragment 25-37 (K34R) of the Glucagon-like peptide-1 (GLP-1)
and (SEQ ID NO: 2)
H-HAEGTFTSDVSSYLEGQAAKEFIAWLVRGRG-NH₂  (P2a)
is a longer sequence 7-37 (K34R) of the Glucagon-like peptide-1 (GLP-1).
```

The peptide was immobilized and washed according to the General Methods in a 5 µmol scale, as a deviation from the general method, after immobilization and removal of the immobilization supernatant a O-methylhydroxylamine hydrochloride solution (4 Äq., 0.1 M) in immobilization Buffer 1 (0.1 M citric Acid/Na$_2$CO$_3$ pH 4.5) was added and shaken for 20 min. After washing according to the General Methods, it was washed 3× with a 10 vol. % pyridine-solution in DMF and 3×DMF. Followed by the addition of a 0.3 M coupling solution consisting of 2-(6-Chlor-1H-benzotriazol-1-yl)-1,1,3,3-tetramethylaminium-hexafluorophosphat (HCTU) or diisopropylcarbodiimide (DIC), 10 eq Oxyma and 12 eq of the Palmitoyl-L-Glu(OH)-tBu building block in DMF. This solution was pre-activated for 20 min prior to addition to the agarose beads. After addition beads were shaken for 2 hours and afterwards the supernatant the filtered of and the solid support was washed with 3×DMF, 3×H$_2$O and 3×MeCN and the modified peptide was released under the conditions given at General Methods\Release of Modified Peptides using PPh$_3$ in MeCN/AcOH/H$_2$O (9:0.5: 0.5, v/v/v) instead of DTT. To remove the tBu protection of the introduced Palmitoyl-L-Glu-tBu group, released peptide pellet was dissolved in TFA/TIS/H$_2$O (96:2:2, v/v/v) and precipitated after 2 h in a 10-fold volume of Et$_2$O.

Figure 2:
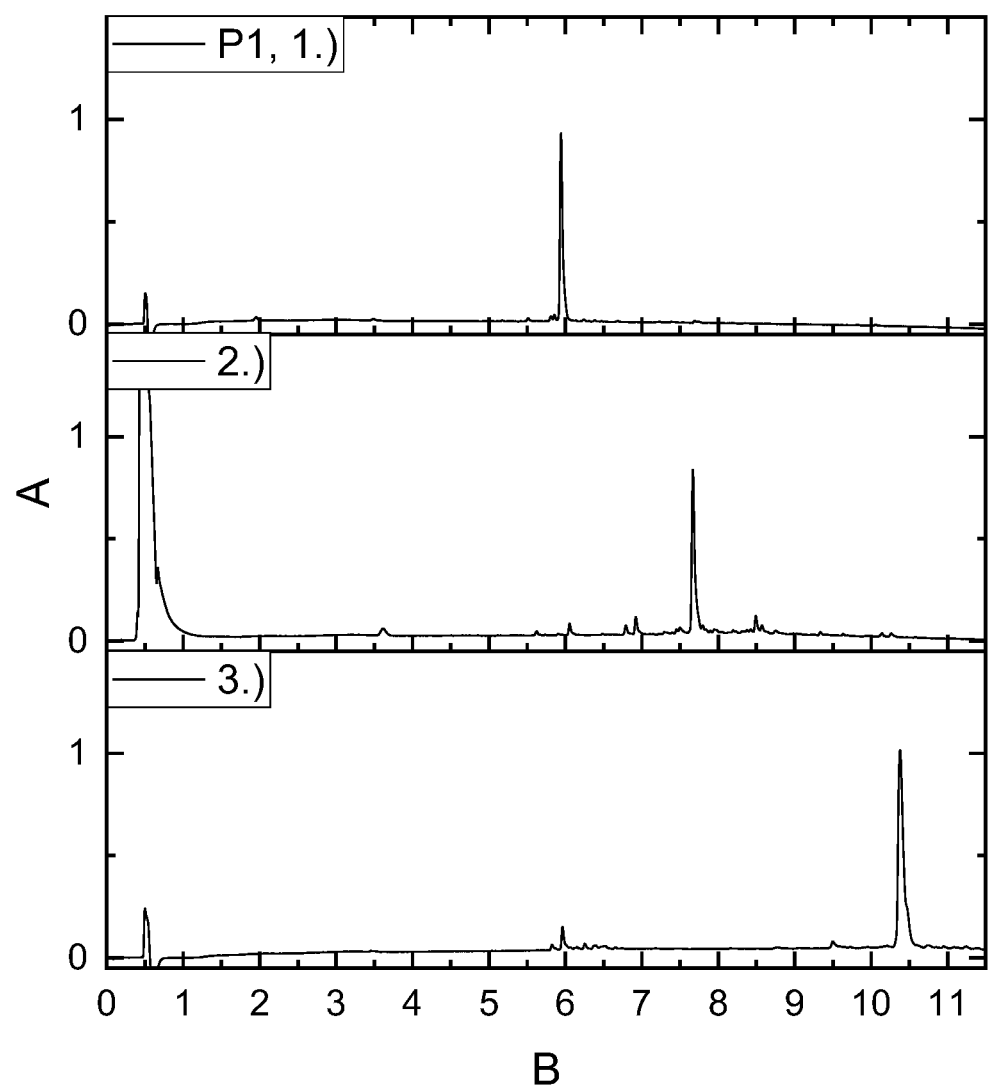
FIG. 2 shows an example of the inventive peptide modification/purification of peptide P1

H-AK(Palm-γE-OH)EFIAWLVRGRG-NH₂:

The peptide precursor P1 has been synthesized as described in the SPPS paragraph above. It has been immobilized and modified with palmitic acid (Palm) building block Palm-γGlu(OH)-OtBu purified according to the above described method. Results are shown in FIG. 2 and Table 1.

H-HAEGTFTSDVSSYLEGQAAK(Palm-γE-OH)EFI-AWLVRGRG-NH₂: The peptide precursor P2 has been synthesized as described in the SPPS paragraph above. It has been immobilized and modified with palmitic acid (Palm) building block Palm-γGlu(OH)-OtBu purified according to the above described method. Results are shown in FIG. 3 and Table 1.

Example 2: Formation of Macrocycles of Peptides P3-P5 Bound to Purification Solid Support with m-Xylylene Dibromide (Intermolecular Cyclization)

The inventive method for the modification and purification of peptides was applied to three peptides of cysteine positions and polarity, these were

```
                                              (SEQ ID NO: 3)
H-CRVPGDAHHADSLC-NH₂  (P3), (SEQ ID NO: 4)
H-VRCPGAAHHADSLC-NH₂  (P4)
and (SEQ ID NO: 5)
H-VRVPGCAHCADSLY-NH₂  (P5).
```

The peptide was immobilized and washed according to the general method in a 25 µmol scale. To the immobilized peptide was added DTT in H$_2$O (4 eq, 0.3 M) and the reactor was shaken for 15 min. After removal of the DTT solution by filtration, the bead material was washed with 3×H$_2$O and 3×MeCN. Subsequently, m-Xylylene dibromide (mDBX) in acetonitrile (4 eq, 0.6 M) was added and subsequently the same volume of cyclization buffer (200 mM NH$_4$HCO$_3$, pH 7.9) was added. The syringe reactor was shaken for 45 min, the reaction mixture was filtered off and the bead material was washed with 3×MeCN and 3×H$_2$O. The protocol was then repeated twice after the DTT treatment and finally the cyclized peptide was released under the conditions given at General Methods\Release of Modified Peptides using PPh$_3$ in MeCN/AcOH/H$_2$O (9:0.5:0.5, v/v/v) instead of DTT.

H-CRVPGDAHHADSLC-NH₂

(underlined C residues are connected by the scaffold): The peptide precursor P3 has been synthesized as described in the SPPS paragraph above. It has been immobilized and modified with m-Xylylene dibromide (mDBX) scaffold and purified according to the above described method. Results are shown in FIG. 4 and Table 1.

H-VRCPGAAHHADSLC-NH₂

(underlined C residues are connected by the scaffold): The peptide precursor P4 has been synthesized as described in the SPPS paragraph above. It has been immobilized and modified with mDBX scaffold and purified according to the above described method. Results are shown in FIG. 5 and Table 1.

H-VRVPGCAHCADSLY-NH₂ (underlined C residues are connected by the scaffold): The peptide precursor P4 has been synthesized as described in the SPPS paragraph above. It has been immobilized and modified with mDBX scaffold and purified according to the above described method. Results are shown in FIG. 5 and Table 1.

Example 3: Formation of Bicyclic Macrocycles of Peptides P6-P7 Bound to Purification Solid Support with 1,3,5-Tris(Bromomethyl)benzene (Intermolecular Cyclization)

The inventive method for the modification and purification of peptides was applied to two different peptides these were H-<u>AC</u>SWPAR<u>C</u>LHQDL<u>C</u>A-NH$_2$ (P6) (SEQ ID NO: 6)
and H-A<u>C</u>REGFLR<u>C</u>LHRPTV<u>C</u>G-NH$_2$ (P7). (SEQ ID NO: 7)

The peptide was immobilized and washed according to the General Methods in a 5 µmol scale. To the immobilized peptide was added DTT in H$_2$O (4 eq, 0.3 M) and the reactor was shaken for 15 min. After removal of the DTT solution by filtration, the bead material was washed with 3×H$_2$O and 3×DMF. Subsequently, 1,3,5-Tris(bromomethyl)benzene (TBMB) in dimethylformamide (4 eq, 0.45 M) was added and subsequently half of that volume of cyclization buffer (400 mM NH$_4$HCO$_3$, 8 M GdmCl, pH 8.0) was added. The syringe reactor was shaken for 45 min, the reaction mixture was filtered off and the bead material was washed with 3×DMF and 3×H$_2$O. The protocol was then repeated twice after the DTT treatment and finally the cyclized peptide was released under the conditions given at General Methods\Release of Modified Peptides using PPh$_3$ in MeCN/AcOH/H$_2$O (9:0.5:0.5, v/v/v) instead of DTT.

H-<u>AC</u>SWPAR<u>C</u>LHQDL<u>C</u>A-NH$_2$ (underlined C residues are connected by the scaffold): The peptide precursor P6 has been synthesized as described in the SPPS paragraph above. It has been immobilized and modified with 1,3,5-Tris(bromomethyl) benzene (TBMT) scaffold and purified according to the above described method. Results are shown in FIG. 7 and Table 1.

H-A<u>C</u>REGFLR<u>C</u>LHRPTV<u>C</u>G-NH$_2$ (underlined C residues are connected by the scaffold): The peptide precursor P7 has been synthesized as described in the SPPS paragraph above. It has been immobilized and modified with 1,3,5-Tris(bromomethyl) benzene (TBMT) scaffold and purified according to the above described method. Results are shown in FIG. 8 and Table 1.

Example 4: Formation of Bicyclic Macrocycles of Peptide P8a Bound to Purification Solid Support with 1,1',1''-(1,3,5-Triazinan-1,3,5-triyl)tris(2-bromoethanon) (Intermolecular Cyclization)

The inventive method for the modification and purification of peptides was applied to the peptide H-ACYNEFGCEDFYDICA-NH$_2$ (SEQ ID NO: 8) (P8a).

The peptide was immobilized and washed according to the General Methods in a 5 µmol scale. To the immobilized peptide was added DTT in H$_2$O (4 eq, 0.3 M) and the reactor was shaken for 15 min. After removal of the DTT solution by filtration, the bead material was washed with 3×H$_2$O and 3×MeCN. Subsequently, the 1,1',1''-(1,3,5-Triazinan-1,3,5-triyl)tris(2-bromoethanon) (TATB) in MeCN/cyclization buffer (400 mM NH$_4$HCO$_3$, 8 M GdmCl, pH 7.1; 9:1) was added. The syringe reactor was shaken for 120 min, the reaction mixture was filtered off and the bead material was washed with 3×H$_2$O and 3×MeCN. The protocol was then repeated twice after the DTT treatment and finally the cyclized peptide was released under the conditions given at General Methods\Release of Modified Peptides using PPh$_3$ in MeCN/AcOH/H$_2$O (9:0.5:0.5, v/v/v) instead of DTT.

H-A<u>CYNEFGCEDFYDICA</u>-NH$_2$ (underlined C residues are connected by the scaffold): The peptide precursor P8 has been synthesized as described in the SPPS paragraph above. It has been immobilized and modified with 1,1',1''-(1,3,5-Triazinan-1,3,5-triyl)tris(2-bromoethanon) (TBMT) scaffold and purified according to the above described method. Results are shown in FIG. 9 and Table 1.

Example 5: Formation of Bicyclic Macrocycles of Peptide P8b Bound to Purification Solid Support with 1,3,5-Triacryloyl-1,3,5-triazinan (Intermolecular Cyclization)

The inventive method for the modification and purification of peptides was applied to the peptide H-ACYNEFGCEDFYDICA-NH$_2$ (SEQ ID NO: 8) (P8b).

The peptide was immobilized and washed according to the General Methods in a 5 µmol scale. To the immobilized peptide was added DTT in H$_2$O (4 eq, 0.3 M) and the reactor was shaken for 15 min. After removal of the DTT solution by filtration, the bead material was washed with 3×H$_2$O and 3×MeCN. Subsequently, the 1,3,5-Triacryloyl-1,3,5-triazinan (TATA) in MeCN/cyclization buffer (400 mM NH$_4$HCO$_3$, 8 M GdmCl, pH 7.1; 9:1) was added. The syringe reactor was shaken for 120 min, the reaction mixture was filtered off and the bead material was washed with 3×H$_2$O and 3×MeCN. The protocol was then repeated twice after the DTT treatment and finally the cyclized peptide was released under the conditions given at General Methods\Release of Modified Peptides using PPh$_3$ in MeCN/AcOH/H$_2$O (9:0.5:0.5, v/v/v) instead of DTT.

H-A<u>CYNEFGCEDFYDICA</u>-NH$_2$ (underlined C residues are connected by the scaffold): The peptide precursor P8 has been synthesized as described in the SPPS paragraph above. It has been immobilized and modified with 1,1',1''-(1,3,5-Triazinan-1,3,5-triyl)tris(2-bromoethanon) (TBMT) scaffold and purified according to the above described method. Results are shown in FIG. 10 and Table 1.

Example 6: Formation of Macrocycle of Peptide P3b Bound to Purification Solid Support with by Disulphide (Intramolecular Cyclization)

The inventive method for the modification and purification of peptides was applied to the peptide H-<u>C</u>RVPGDAHHADSL<u>C</u>-NH$_2$ (P3b). (SEQ ID NO: 3)

The peptide was immobilized and washed according to the general method in a 10 μmol scale. Subsequently a one to one mixture of DMSO and 0.4 M $(NH_4)_2CO_3$, 6 M GdnCl, pH 8.7 was added and the syringe reactor was shaken for 120 min, the reaction mixture was filtered off and the bead material was washed with $3×H_2O$. The cyclized peptide was released under the conditions given at General Methods\Release of Modified Peptides yielding 22% of disulfide cyclized peptide using $PPh_3$ in $MeCN/AcOH/H_2O$ (9:0.5:0.5, v/v/v) instead of DTT.

H-CRVPGDAHHADSLC-$NH_2$ (underlined C residues are connected by the scaffold): The peptide precursor P3 has been synthesized as described in the SPPS paragraph above. It has been immobilized and modified by air oxidation and purified according to the above described method. Results are shown in FIG. 11 and Table 1.

Example 7: Formation of Lipidated Peptides P1-P3 Bound to Purification Solid Support with Building Blocks 1-bromopropyl-2,3-dipalmitate (a), 1-iodopropyl-2,3-dipalmitate (b), 1-tosyl-2,3-dipalmitate (c), or palm-$OC_2H_4I$ (d)

The inventive method for the modification and purification of peptides was applied to two peptides of different length and polarity, these were the model peptide

```
                                  (SEQ ID NO: 12)
H-KKKKSC-NH2 (P12), (SEQ ID NO: 13)
H-KEKFSINSEDNNGC-NH2 (P13),
and (SEQ ID NO: 14)
H-CRG-NH2 (P14).
```

The linker-tagged peptide was immobilized according to the General Methods in a 5 μmol scale. After removal of the immobilization solution, the agarose beads were washed 3× with DMSO. 250 μL of a solution of 2 w % L-cysteine (5 mg) in buffer 1 was added and shaken for 15 min. The solution was filtered off with suction and washing of the beads linker-connected to the peptides was carried out as described in General Methods. For the reduction of the linker and removal of the StBu-protecting group of cysteine residues in the peptide, a reducing solution of 25 mg (162 μmol, 32 eq) DTT in 250 μL 5 w % aqueous $NaHCO_3$ was prepared. 250 μL MeCN was added to the agarose beads followed by the reducing solution. The mixture of peptides with StBu protecting groups on cysteine (P1-P2) was shaken for 60 min, without StBu (P3) for 15 min and the solution was filtered off by suction. The agarose beads with the linker-connected peptide were washed 3× with water, 2× with MeCN and 3× with DMF. A sonicated suspension of 3.2 mg (10 μmol, 2 eq) $Cs_2CO_3$ in 200 μL DMF was added. A solution of 20 μmol palmitoyl building block (4 eq, a) $Palm_2$-propyl-Br=12.6 mg, b) $Palm_2$-propyl-I=13.6 mg, c) $Palm_2$-propyl-OTs=14.5 mg, d) Palm-$OC_2H_4I$) in 300 μL DMF was added. The mixture was shaken for 18-76 h. In case some precipitate was formed over time, another 200-400 μL DMF was added. The supernatant was removed, and the beads were washed 5× with DMF, 3× with water, and 3× with MeCN. 200 μL TFA/water (40:60) was added and shaken for 60 min to release the peptide. 200 μL TFA was added to the cartridge and the solution was collected in a 15 mL centrifuge tube. The agarose beads were eluted 2× with 200 μL TFA/water (95:5) into the same tube. 10 mL chilled $Et_2O$ was added to the TFA/water solution with lipidated peptide P1 or P2 to precipitate the peptide. The precipitate was collected and washed once with ether. The peptide was dissolved in water/MeCN (1:1) and lyophilized. For samples with lipidated peptide P3 the TFA/water solution was concentrated under airstream. Water/MeCN (1:1) as added and the sample was lyophilized.

H-KKKKSC($C_3H_5O_2$-diPalm)-$NH_2$ (P12a): The peptide precursor P12a has been synthesized as described in the SPPS paragraph above. It has been immobilized and modified with palmitic acid (Palm) building block 1-bromopropyl-2,3-dipalmitate (time for palmitoylation=18 h) according to the above described method. Results are shown in Table 1 and FIG. 12.

Figure 1:
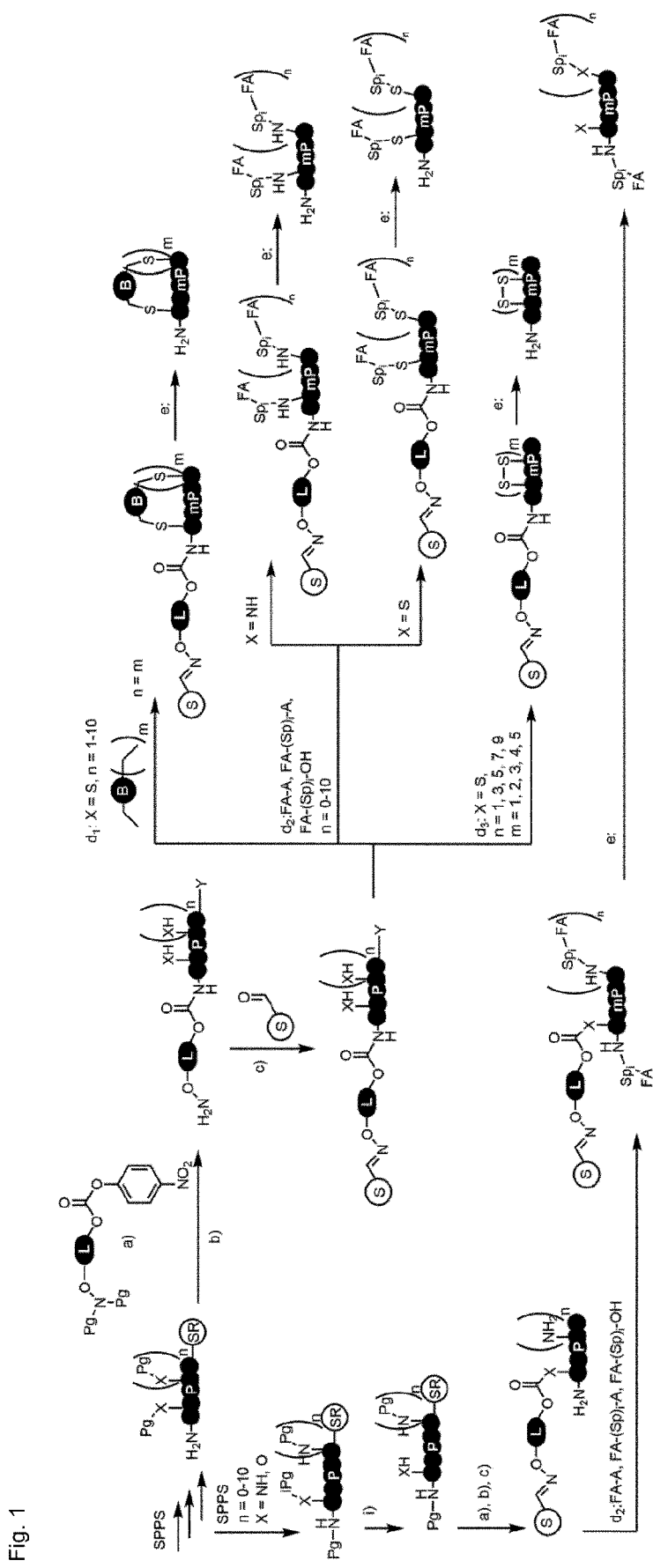
FIG. 1 shows a schematic representation of the inventive peptide modification on solid support. SPPS=Solid Phase Peptide Synthesis, SR=synthetic resin of SPPS, S=modification & purification support, P=peptide that needs to be modified, L=reductively cleavable linker, Pg=protection group, iPg=intermediate protection group, B=reactive scaffold to form a cyclic peptide, mP=modified peptide, FA=fatty acid, Sp=Spacer, A=activation of FA or FA-Sp a) linker coupling, b) TFA cleavage, c) immobilization, $d_1$) stapling modification, $d_2$) fatty acid modification, $d_3$) disulfide formation, e) release of modified peptide, i) deprotection of intermediate protection group.

H-KKKKSC($C_3H_5O_2$-diPalm)-$NH_2$ (P12b): The peptide precursor P12b has been synthesized as described in the SPPS paragraph above. It has been immobilized and modified with palmitic acid (Palm) building block 1-iodopropyl-2,3-dipalmitate (time for palmitoylation=18 h) according to the above described method. Results are shown in Table 1, FIG. 1, and FIG. 13.

H-KKKKSC($C_2H_4O$—Palm)-$NH_2$ (P12d): The peptide precursor P12d has been synthesized as described in the SPPS paragraph above. It has been immobilized and modified with palmitic acid (Palm) building block Palm-$OC_2H_4I$ (time for palmitoylation=18 h) according to the above described method. Results are shown in Table 1 and FIG. 14.

H-KEKFSINSEDNNGC($C_3H_5O_2$-diPalm)-$NH_2$ (P13a): The peptide precursor P13a has been synthesized as described in the SPPS paragraph above. It has been immobilized and modified with palmitic acid (Palm) building block 1-bromopropyl-2,3-dipalmitate (time for palmitoylation=18 h) according to the above described method. Results are shown in Table 1 and FIG. 15.

H-KEKFSINSEDNNGC($C_3H_5O_2$-diPalm)-$NH_2$ (P13b): The peptide precursor P13b has been synthesized as described in the SPPS paragraph above. It has been immobilized and modified with palmitic acid (Palm) building block 1-iodopropyl-2,3-dipalmitate (time for palmitoylation=18 h) according to the above described method. Results are shown in Table 1 and FIG. 16.

H-KEKFSINSEDNNGC($C_2H_4O$—Palm)-$NH_2$ (P13d): The peptide precursor P13d has been synthesized as described in the SPPS paragraph above. It has been immobilized and modified with palmitic acid (Palm) building block Palm-$OC_2H_4I$ (time for palmitoylation=18 h) according to the above described method. Results are shown in Table 1 and FIG. 17.

H—C($C_3H_5O_2$-diPalm)RG-$NH_2$ (P14b): The peptide precursor P14b has been synthesized as described in the SPPS paragraph above. It has been immobilized and modified with palmitic acid (Palm) building block 1-iodopropyl-2,3-dipalmitate (time for palmitoylation=76 h) according to the above described method. Results are shown in Table 1 and FIG. 18.

H—C($C_3H_5O_2$-diPalm)RG-$NH_2$ (P14b): The peptide precursor P14c has been synthesized as described in the SPPS paragraph above. It has been immobilized and modified with palmitic acid (Palm) building block 1-tosylpropyl-2,3-dipalmitate (time for palmitoylation=76 h) according to the above described method. Results are shown in Table 1 and FIG. 19.

H—C($C_2H_4O$-Palm)RG-$NH_2$ (P14d): The peptide precursor P13c has been synthesized as described in the SPPS paragraph above. It has been immobilized and modified with palmitic acid (Palm) building block Palm-$OC_2H_4I$ (time for palmitoylation=18 h) according to the above described method. Results are shown in Table 1, and FIG. 12. The modification of peptide P3 with Palm-OC$_2$H$_4$I was also carried out with 10 μmol (2 eq) triethylamine in DMF instead of the use of Cs$_2$CO$_3$ in DMF and lead to a similar result.

Example 8: Formation of Lipidated Peptide P2b Bound to Purification Solid Support with palmitoyl-L-Glu(OSu)-tBu-building Block The inventive method for the modification and purification of peptides was applied to (SEQ ID NO: 2)
H-HAEGTFTSDVSSYLEGQAAKEFIAWLVRGRG-OH (P2b)

is a longer sequence 7-37 (K34R) of the Glucagon-like peptide-1 (GLP-1) and known as the peptide drug Liraglutide when Palm-Glu-OH is attached to the Lys side chain.

The peptide was immobilized and washed according to the General Methods in a 25 μmol scale. After washing according to the General Methods, it was washed 3×DMF. Followed by the addition of 8 eq Palmitoyl-L-Glu(OSu)-tBu building block with 2 eq DIPEA in 600 μL N-methylpyrrolidone. After addition of this solution beads were shaken for 1 hours and afterwards the supernatant the filtered of and the solid support was washed with 3×DMSO, 3×DMF, 3× and the modified peptide was released under the conditions given at General Methods\Release of Modified Peptides. To remove the tBu protection of the introduced Palmitoyl-L-Glu-tBu group, the released peptide pellet was re-dissolved in TFA/DTT/H$_2$O (94:4:2, v/v/v) and precipitated after 1 h in a 10-fold volume of Et$_2$O.

H-HAEGTFTSDVSSYLEGQAAK(Palm-Glu-OH)EFI-AWLVRGRG-OH: The peptide precursor P2 has been synthesized as described in the SPPS paragraph above. It has been immobilized and modified with palmitic acid (Palm) building block Palm-Glu(OSu)-OtBu purified according to the above described method. Results are shown in FIG. 22 and Table 1.

Example 9: Formation of Lipidated Peptide P15 Bound to Purification Solid Support with tBuOC(O)-Ste-Glu(Aeea-Aeea-OSu)-OtBu Building Block The inventive method for the modification and purification of peptides was applied to (SEQ ID NO: 15)
H-HAibEGTFTSDVSSYLEGQAAKEFIAWLVRGRG-OH (P15)

is a longer sequence 7-37 (K34R, Aib8A) of the Glucagon-like peptide-1 (GLP-1) and known as the peptide drug Semaglutide when CO$_2$H-Ste-Glu(aeea-aeea-OH)—OH is attached to the Lys side chain.

The peptide was immobilized and washed according to the General Methods in a 25 μmol scale. After washing according to the General Methods, it was washed 3×DMF. Followed by the addition of 8 eq tBuOC(O)-Ste-Glu(aeea-aeea-OSu)-OtBu building block with 2 eq DIPEA in 600 μL N-methylpyrrolidone. After addition of this solution beads were shaken for 1 hours and afterwards the supernatant the filtered of and the solid support was washed with 3×DMSO, 3×DMF, 3× and the modified peptide was released under the conditions given at General Methods\Release of Modified Peptides. To remove the tBu protections of the introduced tBuOC(O)-Ste-Glu(aeea-aeea-OSu)-OtBu group, the released peptide pellet was re-dissolved in TFA/DTT/H$_2$O (94:4:2, v/v/v) and precipitated after 1 h in a 10-fold volume of Et$_2$O.

H-HAibEGTFTSDVSSYLEGQAAK(CO$_2$H-Ste-Glu (aeea-aeea-OH)—OH)EFIAWLVRGRG-OH: The peptide precursor of P15 has been synthesized as described in the SPPS paragraph above. It has been immobilized and modified with tBuOC(O)-Ste-Glu(aeea-aeea-OSu)-OtBu building block and purified according to the above described method. Results are shown in FIG. 23 and Table 1.

Example 10: Formation of Lipidated Peptide P16 and P17a Bound to Purification Solid Support Palm-S Building Block The inventive method for the modification and purification of peptides was applied to (SEQ ID NO: 16)
H-SGGKWSKSSVIGWPAVRER-OH is a sequence 1-19 (S1M) and (SEQ ID NO: 17)
H-GGKWSKSSVIGWPAVRER-OH is a sequence 2-19 both of the Nef protein what bears an N-terminal myristoyl group.

During the SPPS of

H-GGKWSKSSVIGWPAVRER-OH

N-α-Fmoc-N-ε-1-(4,4-dimethyl-2,6-dioxocyclohex-1-ylidene)ethyl-L-lysine building block was used for Lys$^3$ and Boc-Gly-OH for Gly$^1$. After peptide was assembled the N-ε-1-(4,4-dimethyl-2,6-dioxocyclohex-1-ylidene)ethyl (Dde) protection group was removed by treatment of 2% N$_2$H$_4$*H$_2$O in DMF 3×3 min. Thereafter the linker molecule X1 was coupled as described in the general methods.

During the SPPS of

H-SGGKWSKSSVIGWPAVRER-OH

N-alpha-(9-Fmoc)-O-(t-butyl-dimethyl-silyl)-L-serine building block was used for Ser$^1$ and Boc-Gly-OH for Gly$^1$. After peptide was assembled the t-butyl-dimethyl-silyl protection group was removed by treatment of AcOH/THF/H$_2$O 3:1:1 for 2 h. Thereafter Fmoc was removed by treatment with 2×5 min piperidine/DMF 1:4, the resin was washed and the linker molecule X1 was coupled as described in the general methods.

The peptides were immobilized and washed according to the General Methods in a 25 μmol scale. After washing according to the General Methods, it was washed 3×DMF. Followed by the addition of 8 eq Palm-S-(4,6-Dimethyl-2-pyrimidinyl) thioate (Palm-S) building block with 2 eq DIPEA in 600 μL N-methylpyrrolidone. After addition of this solution beads were shaken for 1 hours and afterwards the supernatant the filtered of and the solid support was washed with 3×DMSO, 3×DMF, 3× and the modified peptide was released under the conditions given at General Methods\Release of Modified Peptides.

Palm-SGGK(Palm)WSK(Palm)SSVIGWPAVRER-NH$_2$: The peptide precursor of P16 has been synthesized as described in the SPPS paragraph above. It has been immobilized and modified with Palm-S building block and purified according to the above described method. Results are shown in FIG. 24 and Table 1.

Palm-GGKWSK(Palm)SSVIGWPAVRER-NH$_2$: The peptide precursor of P17a has been synthesized as described in the SPPS paragraph above. It has been immobilized and modified with Palm-S building block and purified according to the above described method. Results are shown in FIG. 24 and Table 1.

Example 11: Formation of Lipidated Peptide P17b Bound to Purification Solid Support Palm-S Building Block The inventive method for the modification and purification of peptides was applied to

H-GGKWSKSSVIGWPAVRER-OH (SEQ ID NO: 17)

is a sequence 2-19 of the Nef protein what bears an N-terminal myristoyl group.

During the SPPS of

H-GGKWSKSSVIGWPAVRER-OH

N-α-Fmoc-N-ε-1-(4,4-dimethyl-2,6-dioxocyclohex-1-ylidene)ethyl-L-lysine building block was used for Lys$^3$ and Boc-Gly-OH for Gly$^1$. After peptide was assembled the N-ε-1-(4,4-dimethyl-2,6-dioxocyclohex-1-ylidene)ethyl (Dde) protection group was removed by treatment of 2% N$_2$H$_4$*H$_2$O in DMF 3×3 min. Thereafter the linker molecule X1 was coupled as described in the general methods.

The peptides were immobilized and washed according to the General Methods in a 25 µmol scale. After washing according to the General Methods, it was washed 3×DMF. Followed by the addition of 8 eq Myr-OSu building block with 2 eq DIPEA in 600 µL N-methylpyrrolidone. After addition of this solution beads were shaken for 1 hours and afterwards the supernatant the filtered of and the solid support was washed with 3×DMSO, 3×DMF, 3× and the modified peptide was released under the conditions given at General Methods\Release of Modified Peptides.

Myr-GGKWSK(Myr)SSVIGWPAVRER-NH$_2$: The peptide precursor of P17b has been synthesized as described in the SPPS paragraph above. It has been immobilized and modified with Myr-OSu building block and purified according to the above described method. Results are shown in FIG. 24 and Table 1.

Example 12: Formation of Macrocycles of Peptides P6 & P8 Bound to Purification Solid Support (Aldehyde-Modified Agarose) with 1,1',1"-(1,3,5-Triazinan-1,3,5-triyl)tris(2-bromoethanon) (TATB) (Intramolecular Bicyclization)

The inventive method for the modification and purification of peptides was applied to two peptides of different length, cysteine positions and polarity, these were H-ACSWPARCLHQDLCA-NH$_2$ (P6) (SEQ ID NO: X)
and

H-ACYNEFGCEDFYDICA-NH$_2$ (P8). (SEQ ID NO: X)

The crude Linker-tagged peptide was immobilized for 16 h and washed according to the General Methods, as a deviation from the general method, after immobilization and removal of the immobilization supernatant, an O-methylhydroxylamine hydrochloride solution (5 w % in H$_2$O, 250 µL) was added and the immobilized peptide was shaken for 15 min. After washing according to the General Methods, Linker was reduced, and StBu-protection groups were removed by addition of 12.5 mg DTT in 250 µL 5 w % aq. NaHCO$_3$ (0.6 M; pH 8) and shaking for 60 min. Subsequently, 1.9 mg TCEP dissolved in 30 µL 5 w % aq. NaHCO$_3$ (0.6 M; pH 8) was added and shaking was continued for 15 min. Thereafter, the supernatant was filtered of and the solid support was washed with 3×H$_2$O, 2×MeCN and 3×5 w % aq. NaHCO$_3$ (0.6 M; pH 8). 125 µL of 5 w % aq. NaHCO$_3$ (0.6 M; pH 8) was added to the solid support followed by TATB (1-2 eq) in 125 µL MeCN. The beads were shaken for 60 min and afterwards washed with 3×H$_2$O and 3×MeCN. The modified peptide was released following the conditions of General Methods.

H-ACSWPARCLHQDLCA-NH$_2$:

The peptide precursor P6 has been synthesized as described in the SPPS paragraph above. It has been immobilized and modified with TATB according to the above described method in a 1.3 µmol scale. Results are shown in Table LuS1 and FIG. 26 3.). 1.1 mg of modified peptide with a purity of 69% were obtained as white powder. ESI-MS: (calculated MH$^{2+}$: 941.1 m/z, found: 940.7 m/z).

H-ACYNEFGCEDFYDICA-NH$_2$:

The peptide precursor P8 has been synthesized as described in the SPPS paragraph above. It has been immobilized and modified with TATB according to the above described method in a 1.0 µmol scale. Results are shown in Table LuS1 and FIG. 27 3.). 3.0 mg of modified peptide with a purity of 45% were obtained as white powder. ESI-MS: (calculated MH$^{2+}$: 1035.6 m/z, found: 1035.5 m/z).

Example 13: Formation of Macrocycles of Peptides P6 & P8 Bound to Purification Solid Support (Aldehyde-Modified poly (methyl acrylate)) with 1,1',1"-(1,3,5-Triazinan-1,3,5-triyl)tris(2-bromoethanon) (TATB) (Intramolecular Bicyclization)

The inventive method for the modification and purification of peptides was applied to two peptides of different length, cysteine positions and polarity, these were H-ACSWPARCLHQDLCA-NH$_2$ (P6) (SEQ ID NO: X)
and

H-ACYNEFGCEDFYDICA-NH$_2$ (P8). (SEQ ID NO: X)

The crude Linker-tagged peptide was dissolved in pure HFIP and immobilized for 16 h and washed on aldehyde-modified poly (methyl acrylate) as solid support. After immobilization and removal of the immobilization supernatant, an O-methylhydroxylamine hydrochloride solution (5 w % in H$_2$O, 250 µL) was added and the immobilized peptide was shaken for 15 min. After washing according to the General Methods, Linker was reduced, and StBu-protection groups were removed by addition of 12.5 mg DTT in 250 µL 5 w % aq. NaHCO$_3$ (0.6 M; pH 8) and shaking for 60 min. Subsequently, 1.9 mg TCEP dissolved in 30 µL 5 w % aq. NaHCO$_3$ (0.6 M; pH 8) was added and shaking was continued for 15 min. Thereafter, the supernatant was filtered of and the solid support was washed with 3×H$_2$O, 2×MeCN and 3×5 w % aq. NaHCO$_3$ (0.6 M; pH 8). 125 µL of 5 w % aq. NaHCO$_3$ (0.6 M; pH 8) was added to the solid support followed by TATB (1-2 eq) in 125 µL MeCN. The beads were shaken for 60 min and afterwards washed with 3×H$_2$O and 3×MeCN. The modified peptide was released by treatment of the solid support with 0.4 mL TFA/H$_2$O (95:5) for 1 h, subsequently adding 0.4 mL TFA and eluting the peptide with 2×0.4 mL TFA/H$_2$O (95:5). The released modified peptide was precipitated with 10 mL cold Et$_2$O and after cooling the mixture down in freezer for 15-30 min, it was centrifuged, and the supernatant was decanted.

H-ACSWPARCLHQDLCA-NH$_2$:

The peptide precursor P6 has been synthesized as described in the SPPS paragraph above. It has been immobilized and modified with TATB according to the above described method in a 1.3 µmol scale. Results are shown in Table LuS1 and FIG. 26 4.). 1.5 mg of modified peptide with a purity of 70% were obtained as white powder. ESI-MS: (calculated MH$^{2+}$: 941.1 m/z, found: 941.0 m/z).

H-ACYNEFGCEDFYDICA-NH$_2$:

The peptide precursor P8 has been synthesized as described in the SPPS paragraph above. It has been immobilized and modified with TATB according to the above described method in a 1.0 µmol scale. Results are shown in Table LuS1 and FIG. 27. 4.7 mg of modified peptide with a purity of 44% were obtained as white powder. ESI-MS: (calculated MH$^{2+}$: 1035.6 m/z, found: 1035.3 m/z).

Example 14: Formation of Macrocycles of Peptides P6 & P8 Bound to Purification Solid Support (Aldehyde-Modified Agarose) with 1,1',1"-(1,3,5-Triazinan-1,3,5-triyl)tris(2-bromoethanon) (TATB) on with Sodium Dodecyl Sulfate as Additive for Peptide Dissolution (Intramolecular Bicyclization)

The inventive method for the modification and purification of peptides was applied to two peptides of different length, cysteine positions and polarity, these were (P6)
(SEQ ID NO: X)
H-ACSWPARCLHQDLCA-NH$_2$
and (P8)
(SEQ ID NO: X)
H-ACYNEFGCEDFYDICA-NH$_2$.

The crude Linker-tagged peptide was immobilized for 16 h and washed according to the General Methods, as deviations from the general method, peptide dissolution was performed with 1 M SDS in DMSO+10 vol. % Immobilization Buffer 2 and after immobilization and removal of the immobilization supernatant, an O-methylhydroxylamine hydrochloride solution (5 w % in H$_2$O, 250 µL) was added and the immobilized peptide was shaken for 15 min. After washing according to the General Methods with an additional wash with 3×8 M Urea in H$_2$O/MeOH (9:1), Linker was reduced, and StBu-protection groups were removed by addition of 12.5 mg DTT in 250 µL 5 w % aq. NaHCO$_3$ (0.6 M; pH 8) and shaking for 60 min. Subsequently, 1.9 mg TCEP dissolved in 30 µL 5 w % aq. NaHCO$_3$ (0.6 M; pH 8) was added and shaking was continued for 15 min. Thereafter, the supernatant was filtered of and the solid support was washed with 3×H$_2$O, 2×MeCN and 3×5 w % aq. NaHCO$_3$ (0.6 M; pH 8). 125 µL of 5 w % aq. NaHCO$_3$ (0.6 M; pH 8) was added to the solid support followed by TATB (1-2 eq) in 125 µL MeCN. The beads were shaken for 60 min and afterwards washed with 3×H$_2$O and 3×MeCN. The modified peptide was released following the conditions of General Methods.

H-ACSWPARCLHQDLCA-NH$_2$:

The peptide precursor P6 has been synthesized as described in the SPPS paragraph above. It has been immobilized and modified with TATB according to the above described method in a 1.3 µmol scale. Results are shown in Table LuS1 and FIG. 26 5.). 5.8 mg of modified peptide with a purity of 61% were obtained as white powder. ESI-MS: (calculated MH$^{2+}$: 941.1 m/z, found: 940.7 m/z).

H-ACYNEFGCEDFYDICA-NH$_2$:

The peptide precursor P8 has been synthesized as described in the SPPS paragraph above. It has been immobilized and modified with TATB according to the above described method in a 1.0 µmol scale. Results are shown in Table LuS1 and FIG. 27 5.). 6.3 mg of modified peptide with a purity of 43% were obtained as white powder. ESI-MS: (calculated MH$^{2+}$: 1035.6 m/z, found: 1034.9 m/z).

Example 15: Formation of Macrocycles of Peptides P6 & P8 Bound to Purification Solid Support (Aldehyde-Modified poly (methyl acrylate)) with 1,1', 1"-(1,3,5-Triazinan-1,3,5-triyl)tris(2-bromoethanon) (TATB) on with Sodium Dodecyl Sulfate as Additive for Peptide Dissolution (Intramolecular Bicyclization)

As claimed in Example 13 the crude Linker-tagged peptide was immobilized on aldehyde-modified poly (methyl acrylate) as solid support, whereas, as claimed in Example 14, 1 M SDS in DMSO+10 vol. % Immobilization Buffer 2 was used for dissolution of the peptide instead of pure HFIP. As a deviation, 40 vol. % of beads-volume of an aniline-buffer-solution (0.46 vol. % Aniline in 0.79 w % NH$_4$OAc in H$_2$O/AcOH (9:1)) was added to the solid support prior to addition of dissolved peptide. The immobilized peptide was washed, modified with TATB and released as claimed in Example 13. As a deviation, after immobilization and wash of the peptide, it was additionally washed with 3×8 M Urea in H$_2$O/MeOH (9:1).

H-ACSWPARCLHQDLCA-NH$_2$:

The peptide precursor P6 has been synthesized as described in the SPPS paragraph above. It has been immobilized and modified with TATB according to the above described method in a 1.3 µmol scale. Similar results as in Example 3 were achieved and are shown in Table LuS1. 3.9 mg of modified peptide with a purity of 55% were obtained as white powder. ESI-MS: (calculated MH$^{2+}$: 941.1 m/z, found: 940.7 m/z).

H-ACYNEFGCEDFYDICA-NH₂:

The peptide precursor P8 has been synthesized as described in the SPPS paragraph above. It has been immobilized and modified with TATB according to the above described method in a 1.0 µmol scale. Similar results as in Example 3 were achieved and are shown in Table LuS1. 3.7 mg of modified peptide with a purity of 48% were obtained as white powder. ESI-MS: (calculated MH$^{2+}$: 1035.6 m/z, found: 1035.3 m/z).

Example 16: Formation of Macrocycles of Peptides P6 & P8 Bound to Purification Solid Support (Aldehyde-Modified Agarose or poly (methyl acrylate)) with 1,1',1"-(1,3,5-Triazinan-1,3,5-triyl)tris(2-bromoethanon) (TATB) while Cooling (Intramolecular Bicyclization)

The inventive method for the modification and purification of peptides was applied to two peptides of different length, cysteine positions and polarity, these were (P6)
(SEQ ID NO: X)
H-ACSWPARCLHQDLCA-NH₂
and (P8)
(SEQ ID NO: X)
H-ACYNEFGCEDFYDICA-NH₂.

The crude Linker-tagged peptide was immobilized, washed, modified with TATB and released as claimed in Examples LuS1 or LuS2 on aldehyde-modified agarose or poly (methyl acrylate) as solid support respectively, as a deviation from this methods, the modification with TATB was performed at a temperature of 1° C. by keeping the reaction container in an ice-water-bath.

H-ACSWPARCLHQDLCA-NH₂:

The peptide precursor P6 has been synthesized as described in the SPPS paragraph above. It has been immobilized on aldehyde-modified poly (methyl acrylate) and modified with TATB according to the above described method in a 1.3 µmol scale. Results are shown in Table LuS1 and FIG. 26 6.). 6.2 mg of modified peptide with a purity of 69% were obtained as white powder. ESI-MS: (calculated MH$^{2+}$: 941.1 m/z, found: 940.5 m/z).

H-ACYNEFGCEDFYDICA-NH₂:

The peptide precursor P8 has been synthesized as described in the SPPS paragraph above. It has been immobilized on aldehyde-modified poly (methyl acrylate) and modified with TATB according to the above described method in a 1.0 µmol scale. Results are shown in Table LuS1 and FIG. 27 6.). 7.1 mg of modified peptide with a purity of 44% were obtained as white powder. ESI-MS: (calculated MH$^{2+}$: 1035.6 m/z, found: 1035.2 m/z).

Example 17: Formation of Macrocycle of Peptide P3 Bound to Purification Solid Support with by Disulfide (Intramolecular Cyclization)

The inventive method for the immobilization, modification and purification of peptides was applied to the peptide (P3)
(SEQ ID NO: 3)
H-CRVPGDAHHADSLC-NH₂, (P4)
(SEQ ID NO: ?)
H-VRCPGAAHHADSLC-NH2, (P9)
(SEQ ID NO: 9)
H-CYFQNCPRG-NH₂, (P10)
(SEQ ID NO: 10)
H-KCNTATCATQRLANFLVHSSNFGPILPPTNVGSNTY-NH₂, (P11)
(SEQ ID NO: ?)
H-CCEYCCNPACTGCY-NH₂.

H-CRVPGDAHHADSLC-NH₂

(underlined C residues are connected by the scaffold): The linker-tagged peptide is immobilized on 1.5 times the amount of aldehyde-modified polymethacrylate loaded with 152.6 µmol/1 gm beads. After transferring, the beads material is washed with 3× milli-Q water and 3× immobilization buffer 1 (0.1 M citric Acid/Na2CO3 pH 4.5). 113 µl of DMSO was added to the beads and soaked for 5 min. The crude linker-tagged peptide was dissolved in 223 µl of DMSO and 26 µl Buffer2 and the mixture was then added to the polymethacrylate beads and shaken. Of note, the beads should have a free and good fluctuation in the immobilization solution. After a reaction time of 72 h, the immobilization solution is filtered off with suction. The immobilization worked equally efficiently, with various amounts of beads. With 1.5 times-15 times (To the linker tagged peptide) of the amount of aldehyde-modified polymethacrylate loaded with 152.6 µmol/1 gm, beads successfully immobilized linker-tagged peptide quantitatively (1.5 times-72 hours, 3 times-48 h, 7.5 times requires 300 minutes, whereas 15 times requires 180 minutes).

Washing: After immobilization, the beads linker-connected to the peptides were washed each, three-times 5 mL (for 2.5 µmol scale) with the following solvents and solutions
1) 0.9 M guanidinium chloride in DMSO
3) 70% ethanol in with 0.1 M NaCl Milli-Q water Reduction: To the immobilized peptide was added 5 ml of Acetonitrile. A fresh solution of DTT in 5 wt % of NaHCO₃ solution was added (33.6 eq, 0.26 M) and the reactor was shaken for 60 min. After the removal of the DTT solution by filtration, the bead material was washed with 3×H₂O and 3×MeCN.

oxidation: Thereafter 500 µL of H₂O/MeCN (1:1) was added to the beads followed several additions of 20 µL of iodine (10 mg/mL) till which the solutions stayed yellowish and the cartridges were shaken for a total of 10 min. Beads were washed 3× with ascorbic acid (15 mg/mL) in water, 3× water and twice with MeCN.

Release of the peptide: To this vial 166.6 µl 95% TFA was added and after 30 min and eluted with 2×166.6 µl of 95% TFA in water in pre-weighed cold ether vials precipitate the peptide by centrifuging and decanting the ether the pure peptide.

The release also worked equally efficient by treating the oxidized beads with 166 µl of 80:10:10 (H₂O:MeCN:TFA) or 90:05:05 (H₂O:MeCN:TFA) for 18 hours and then eluting with 2.5× volume H2O/MeCN (7:3)+0.1% TFA and 1.5× volume H2O/MeCN (3:7)+0.1% TFA. The resulting solution was lyophilized to get the desired peptide with 95% purity. ESI-MS: (calculated $MH^{2+}$: 774.13 g/mol, found: 773.91 m/z).

H-<u>VRC</u>PGAAHHADS<u>LC</u>-NH$_2$ (underlined C residues are connected by the scaffold): The linker-tagged peptide is immobilized on 3 times the amount of aldehyde-modified polymethacrylate loaded with 152.6 μmol/1 g beads. After transferring, the beads material is washed with 3× milli-Q water and 3× immobilization buffer 1 (0.1 M citric Acid/Na2CO3 pH 4.5). 226 μl of 83% TFA was added to the beads. The crude linker-tagged peptide was dissolved in 498 μl 83% TFA and the mixture was then added to the polymethacrylate beads and shaken. Of note, the beads should have a free and good fluctuation in the immobilization solution. After a reaction time of 150 minutes, the immobilization solution is filtered off with suction. The immobilization worked equally efficiently, with of Solvents like HFIP (150 minutes). Immobilization was also performed in DMSO as described in the P3 peptide with various amounts of beads corresponding to the peptide (1.5, 3 & 5 aldehyde groups to the peptide). After 16 hours of immobilization, in the case of 1.5 times of aldehydes 55% peptide immobilized, 3 times of aldehyde 70% peptide and 5 times of aldehyde case peptide immobilized quantitively. Adding catalyst (50 mM aniline) to the 3 times of the aldehyde increased the immobilization rate 4 times.

Washing: In case of TFA as immobilization solvent, after immobilization, the beads linker-connected to the peptides were washed each three-times 3 mL (for 2.5 μmol scale) with the following solvents and solutions
1) Milli-Q water
2) 0.9 M guanidinium chloride in DMSO
3) 70% ethanol in with 0.1 M NaCl Milli-Q water In case of HFIP as immobilization solvent, after immobilization, the beads linker-connected to the peptides were washed each three-times 3 mL (for 2.5 μmol scale) with the following solvents and solutions
1) HFIP
2) Milli-Q water In all other cases, the peptide was washed according to the method mentioned P3 peptide case.

Reduction: Reduction procedure was followed according to the method mentioned P3 peptide case.

oxidation: Thereafter 1000 μL of DMSO was added to the beads followed purging of air to the bead's solutions (5 min) and shaken for 24 hours, filtered off, washed (3×H$_2$O, 1×CH$_3$CN) and dried.

Release of the peptide: Release of the peptide procedure was followed according to the method mentioned P3 peptide case to get desired peptide with 79% purity. ESI-MS: (calculated $MH^{2+}$: 717.43 g/mol, found: 717.71 m/z).

H-<u>C</u>YFQN<u>C</u>PRG-NH$_2$ (underlined C residues are connected by the scaffold): TFA immobilization, washings and Reduction procedures was followed according to the method mentioned P4 peptide.

oxidation: Thereafter 1000 μL of 20% DMSO in 0.1 M solution of disodium hydrogen phosphate was added to the beads followed purging of air to the bead's solutions (5 min) and shaken for 4 hours, filtered off, washed (3×H$_2$O, 1×CH$_3$CN) and dried.

Release of the peptide: Release of the peptide procedure was followed according to the method mentioned P3 peptide case to get desired peptide with 85% purity (calculated $MH^{2+}$: 542.72 g/mol, found: 543.12 m/z).

H-<u>K</u>CNTAT<u>C</u>ATQRLANFLVHSSNFGPILPPTNVG-SNTY-NH$_2$ (underlined C residues are connected by the scaffold): TFA Immobilization, washings and Reduction, Oxidation, Release of the peptide was followed according to the method mentioned P9 peptide to get desired peptide with 10% purity (calculated $MH^{4+}_{calc}$: 959.48 m/z, found: $MH^{4+}_{found}$: 959.84 m/z)

H-<u>CC</u>EY<u>CC</u>NPA<u>C</u>TG<u>C</u>Y-NH$_2$ (underlined C residues are connected by the scaffold): TFA Immobilization, washings and Reduction, Oxidation, Release of the peptide was followed according to the method mentioned P9 peptide to get desired peptide with 10% purity (calculated $MH^{2+}_{calc}$: 763.21 m/z, found: $MH^{2+}_{found}$: 763.85 m/z).

TABLE 1

| No. | sequence after modification | Example | Organic molecules or conditions for modification | crude UV$_{210}$ purity/ purity after modification *purity of linker-peptide | yield of modification | calculated vs. found ESI masses |
|---|---|---|---|---|---|---|
| P1 | H-AK(Palm-Glu-OH) EFIAWLVRGRG-NH$_2$ | Example 1 | Palm-(Glu(OH)-OtBu, HCTU | 62%/ 83% | 95% | $MH^{2+}_{calc.}$: 935.09 m/z $MH^{2+}_{found.}$: 935.31 m/z |
| P2 | H-HAEGTFTSDVSSYLEG QAAK(Palm-γE-OH) EFIAWLVRGRG-NH$_2$ | Example 1 | Palm-(Glu(OH)-OtBu, HCTU | 30%/ 54% | 88% | $MH^{4+}_{calc.}$: 937.75 m/z $MH^{4+}_{found.}$: 937.95 m/z |
| P3a | S------------S H-CRVPGDAHHADSLC-NH$_2$ | Example 2 | m-Xylylene dibromide (mDBX) | 68%/ 64% | >99% | $MH^{2+}_{calc.}$: 791.38 m/z $MH^{2+}_{found.}$: 791.45 m/z |
| P4a | S----------S H-VRCPGAAHHADSLC-NH$_2$ | Example 2 | mDBX | 58%/ 54% | >99% | $MH^{2+}_{calc.}$: 769.38 m/z $MH^{2+}_{found.}$: 769.49 m/z |

TABLE 1-continued

| No. | sequence after modification | Example | Organic molecules or conditions for modification | crude UV$_{210}$ purity/ purity after modification *purity of linker-peptide | yield of modification | calculated vs. found ESI masses |
|---|---|---|---|---|---|---|
| P5 | S--S<br>H-VRVPGCAHCADSLY-NH$_2$ | Example 2 | mDBX | 56%/74% | >99% | MH$^{2+}_{calc.}$: 796.40 m/z<br>MH$^{2+}_{found}$: 796.55 m/z |
| P6a | S-----S-----S<br>H-ACSWPARCLHQDLCA-NH$_2$ | Example 3 | 1,3,5-Tris (bromomethyl) benzene (TBMB) | 60%/72% | >99% | MH$^{2+}_{calc.}$: 893.92 m/z<br>MH$^{2+}_{found}$: 894.16 m/z |
| P7 | S------S------S<br>H-ACREGFLRCLHRPTVCNG-H$_2$ | Example 3 | TBMB | 60%/67% | >99% | MH$^{2+}_{calc.}$: 1016.02 m/z<br>MH$^{2+}_{found}$: 1016.30 m/z |
| P8a | S-----S------S<br>H-ACYNEFGCEDFYDICA-NH$_2$ | Example 4 | 1,1',1"-(1,3,5-Triazinan-1,3,5-triyl) tris(2-bromoethanon) (TATB) | 49%/71% | >99% | MH$^{2+}_{calc.}$: 1034.89 m/z<br>MH$^{2+}_{found}$: 1034.51 m/z |
| P8b | S-----S------S<br>H-ACYNEFGCEDFYDICA-NH$_2$ | Example 5 | 1,3,5-Triacryloyl-1,3,5-triazinan (TATA) | 49%/81% | >99% | MH$^{2+}_{calc.}$: 1055.98 m/z<br>MH$^{2+}_{found}$: 1056.02 m/z |
| P3b | S-----------S<br>H-CRVPGDAHHADSLC-NH$_2$ | Example 6 | Disulfide, DMSO and 0.4 M (NH$_4$)$_2$CO$_3$, 6 M GdnCl, pH8.7 | 68%/10% | 22% | MH$^{2+}_{calc.}$: 739.32 m/z<br>MH$^{2+}_{found}$: 739.52 m/z |
| P3b | S-----------S<br>H-CRVPGDAHHADSLC-NH$_2$ | Example 7 | none (Disulfide) | 69%*/95% | >99% | MH$^{2+}_{calc.}$: 739.32 m/z<br>MH$^{2+}_{found}$: 739.62 m/z |
| P4b | S----------S<br>H-VRCPGAAHHADSLC-NH$_2$ | Example 7 | none (Disulfide) | 67%/79% | >99% | MH$^{2+}_{calc.}$: 717.34 m/z<br>MH$^{2+}_{found}$: 717.71 m/z |
| P9 | S----S<br>H-CYFQNCPRG-NH$_2$ | Example 17 | none (Disulfide) | 60%*/85% | >95% | MH$^{2+}_{calc.}$: 542.72 m/z<br>MH$^{2+}_{found}$: 543.12 m/z |
| P10 | S----S<br>H-KCNTATCATQRLANFLVHSSNFGPILPPTNVGSNTY-NH$_2$ | Example 17 | none (Disulfide) | traces*/10% | >99% | MH$^{2+}_{calc.}$: 959.48 m/z<br>MH$^{2+}_{found}$: 959.84 m/z |
| P11 | S-S-SS---S--S<br>H-CCEYCCNPACTGCY-NH$_2$ | Example 17 | none (Disulfide) | not determined*/10% | >75% | MH$^{2+}_{calc.}$: 763.21 m/z<br>MH$^{2+}_{found}$: 763.85 m/z |
| P12a | H-KKKKSC(C$_3$H$_5$O$_2$-diPalm)-NH$_2$ | Example 7 | 1-bromopropyl-2,3-dipalmitate (Pam$_2$-Br) | 67%*/not determined | 47% | MH$^{2+}_{calc.}$: 635.98 m/z<br>MH$^{2+}_{found}$: 636.39 m/z |
| P12b | H-KKKKSC(C$_3$H$_5$O$_2$-diPalm)-NH$_2$ | Example 7 | 1-iodopropyl-2,3-dipalmitate (Pam$_2$-I) | 67%*/not determined | 73% | MH$^{2+}_{calc.}$: 635.98 m/z<br>MH$^{2+}_{found}$: 636.42 m/z |
| P12d | H-KKKKSC(C$_2$H$_4$O-Palm)-NH$_2$ | Example 7 | Palm-OC$_3$H$_4$I (Pam-Et-I) | 67%*/not determined | 39% | MH$^{+}_{calc.}$: 1002.70 m/z<br>MH$^{+}_{found}$: 1002.80 m/z |

TABLE 1-continued

| No. | sequence after modification | Example | Organic molecules or conditions for modification | crude UV$_{210}$ purity/ purity after modification *purity of linker-peptide | yield of modification | calculated vs. found ESI masses |
|---|---|---|---|---|---|---|
| P13a | H-KEKFSINSEDNNGC(C$_3$H$_5$O$_2$-diPalm)-NH$_2$ | Example 7 | 1-iodopropyl-2,3-dipalmitate (Pam$_2$-Br) | 67%*/ not determined | — | MH$^{3+}_{calc.}$: 712.41 m/z<br>MH$^{3+}_{found.}$: 712.40 m/z |
| P13b | H-KEKFSINSEDNNGC(C$_3$H$_5$O$_2$-diPalm)-NH$_2$ | Example 7 | 1-iodopropyl-2,3-dipalmitate (Pam$_2$-I) | 67%*/ not determined | — | MH$^{3+}_{calc.}$: 712.41 m/z<br>MH$^{3+}_{found.}$: 712.40 m/z |
| P13c | H-KEKFSINSEDNNGC(C$_2$H$_4$O-Palm)-NH$_2$ | Example 7 | 1-tosylpropyl-2,3-dipalmitate (Pam$_2$-OTs) | 55%*/ not determined | >98% | MH$^{3+}_{calc.}$: 712.41 m/z<br>MH$^{3+}_{found.}$: 712.11 m/z |
| P13d | H-KEKFSINSEDNNGC(C$_2$H$_4$O-Palm)-NH$_2$ | Example 7 | Palm-OC$_2$H$_4$I (Pam-Et-I) | 55%*/ not determined | 46% | MH$^{2+}_{calc.}$: 933.49 m/z<br>MH$^{2+}_{found.}$: 933.89 m/z |
| P14b | H-C(C$_3$H$_5$O$_2$-diPalm)RG-NH$_2$ | Example 7 | 1-iodopropyl-2,3-dipalmitate (Pam2-I) | 84%*/ not determined | — | MH$^+_{calc.}$: 884.66, m/z<br>MH$^+_{found.}$: 884.66 m/z |
| P14c | H-C(C$_3$H$_5$O$_2$-diPalm)RG-NH$_2$ | Example 7 | 1-tosylpropyl-2,3-dipalmitate (Pam$_2$-OTs) | 84%*/ not determined | >97% | MH$^+_{calc.}$: 884.66 m/z<br>MH$^+_{found.}$: 884.75 m/z |
| P14d | H-C(C$_2$H$_4$O-Palm)RG-NH$_2$ | Example 7 | Palm-OC$_2$H$_4$I (Pam-Et-I) | 84%*/ not determined | 66% | MH$^+_{calc.}$: 616.42 m/z<br>MH$^+_{found.}$: 616.58 m/z |
| P2b | H-HAEGTFTSDVSSYLEGQAAK(Palm-Glu-OH)EFIAWLVRGRG-OH | Example 8 | Palm-Glu(OSu)-OtBu | 7%/ 72% | >99% | MH$^{4+}_{calc.}$: 938.25 m/z<br>MH$^{4+}_{found.}$: 938.73 m/z |
| P15 | H-HAibFGTFTSDVSSYLEGQAAK(CO$_2$H-Ste-Glu(aeea-aeea-OH)-OH)EFIAWLVRGRG-OH | Example 9 | tBuOC(O)-Ste-Glu(aeea-aeea-OSu)-OtBu | 6%/ 67% | >99% | MH$^{4+}_{calc.}$: 1029.29 m/z<br>MH$^{4+}_{found.}$: 1029.20 m/z |
| P16 | Palm-SGGK(Palm)WSK(Palm)SSVIGWPAVRER-NH$_2$ | Example 10 | Palm-S-(4,6-Dimethyl-2-pyrimidinyl)thioate (Palm-S) | traces*/ 53% | >99% | MH$^{3+}_{calc.}$: 934.61 m/z<br>MH$^{3+}_{found.}$: 934.71 m/z |
| P17a | Palm-GGKWSK(Palm)SSVIGWPAVRER-NH$_2$ | Example 10 | Palm-S | traces*/ 6% | >99% | MH$^{3+}_{calc.}$: 826.19 m/z<br>MH$^{3+}_{found.}$: 826.17 m/z |
| P17b | Myr-GGKWSK(Myr)SSVIGWPAVRER-NH$_2$ | Example 11 | Myr-OSu | traces*/ 3% | >99% | MH$^{3+}_{calc.}$: 807.50 m/z<br>MH$^{3+}_{found.}$: 807.65 m/z |
| P6b | S-----S-----S<br>H-ACSWPARCLHQDLCA-NH$_2$ | Example 12 | 1,1',1"-(1,3,5-Triazinan-1,3,5-triyl)tris(2-bromoethanon) (TATB) | 51%*/ 69% | >99% | 941.1 m/z<br>940.7 m/z |
| P6b | S-----S-----S<br>H-ACSWPARCLHQDLCA-NH$_2$ | Example 13 | 1,1',1"-(1,3,5-Triazinan-1,3,5-triyl)tris(2-bromoethanon) (TATB) | 51%*/ 70% | >99% | 941.1 m/z<br>941.0 m/z |
| P6b | S-----S-----S<br>H-ACSWPARCLHQDLCA-NH$_2$ | Example 14 | 1,1',1"-{1,3,5-Triazinan-1,3,5-triyl)tris(2-bromoethanon) (TATB) | 51%*/ 61% | >99% | 941.1 m/z<br>940.7 m/z |
| P6b | S-----S-----S<br>H-ACSWPARCLHQDLC | Example 15 | 1,1',1"-(1,3,5-Triazinan-1,3,5- | 51%*/ 55% | | 941.1 m/z<br>940.7 m/z |

TABLE 1-continued

| No. | sequence after modification | Example | Organic molecules or conditions for modification | crude UV$_{210}$ purity/ purity after modification *purity of linker-peptide | yield of modification | calculated vs. found ESI masses |
|---|---|---|---|---|---|---|
| | A-NH$_2$ | | triyl)tris(2-bromoethanon) (TATB) | | | |
| P6b | S-----S------S H-ACSWPARCLHQDLC A-NH$_2$ | Example 16 | 1,1',1"-(1,3,5-Triazinan-1,3,5-triyl)tris(2-bromoethanon) (TATB) | 51%*/ 69% | >99% | 941.1 m/z 940.5 m/z |
| P8a | S-----S------S H-ACYNEFGCEDFYDIC A-NH$_2$ | Example 12 | 1,1',1"-(1,3,5-Triazinan-1,3,5-triyl)tris(2-bromoethanon) (TATB) | 44%*/ 45% | >99% | 1035.6 m/z 1035.5 m/z |
| P8a | S-----S------S H-ACYNEFGCEDFYDIC A-NH$_2$ | Example 13 | 1,1',1"-(1,3,5-Triazinan-1,3,5-triyl)tris(2-bromoethanon) (TATB) | 44%*/ 44% | >99% | 1035.6 m/z 1035.3 m/z |
| P8a | S-----S------S H-ACYNEFGCEDFYDIC A-NH$_2$ | Example 14 | 1,1',1"-(1,3,5-Triazinan-1,3,5-triyl)tris(2-bromoethanon) (TATB) | 44%/ 43% | >99% | 1035.6 m/z 1034.9 m/z |
| P8a | S-----S------S H-ACYNEFGCEDFYDIC A-NH$_2$ | Example 15 | 1,1',1"-(1,3,5-Triazinan-1,3,5-triyl)tris(2-bromoethanon) (TATB) | 44%*/ 48% | >99% | 1035.6 m/z 1035.3 m/z |
| P8a | S-----S------S H-ACYNEFGCEDFYDIC A-NH$_2$ | Example 16 | 1,1',1"-(1,3,5-Triazinan-1,3,5-triyl)tris(2-bromoethanon) (TATB) | 44%*/ 44% | >99% | 1035.6 m/z 1035.2 m/z |

The invention claimed is:

1. A method for modifying and purifying peptides comprising the steps of
- providing a crude linker-tagged peptide L-P, wherein the crude peptide P is covalently bound to a linker molecule L;
- immobilizing L-P by coupling L-P to a solid support S yielding an immobilized S-L-P;
- modifying S-L-P by introducing a modification into S-L-P yielding an immobilized S-L-mP;
- wherein mP is a modified peptide and the modification is selected from the group consisting of lipidation and cyclization; wherein lipidation comprises a compound selected from the group consisting of formula $FA_x$-$Sp_n$-A (5a), $FA_x$-$Sp_n$-OH (5b), FA-A (5c), and FA-OH (5d); wherein
- FA is a —C(=O)—$C_{1-24}$-alkyl or a —C(=O)—$C_{2-24}$-alkenyl, wherein the alkyl or the alkenyl moiety may be unsubstituted or substituted by one or more substituents independently selected from —F and —COOH;
- Sp is a spacer 2 to 50 atoms in length and x linking moieties independently selected from the group consisting of —NH—, —O—, —S—, wherein the spacer is connected to FA via the linking moiety;
- x is an integer between 1 and 5;
- n is an integer between 1 and 10;
- A is selected from the group consisting of —F, —Cl, —Br, —I, —$N_3$, —O(C=O)$CH_2$(C=O)OH, —$SR^{14}$, —$OCF_3$, —$OCH_2CF_3$, —$OSO_2CF_3$, —$SO_2C_6H_4CH_3$, —$SO_2CF_3$, and —$SO_2CH_3$,

[chemical structures]

[chemical structures -continued]

wherein $R^{14}$ is selected from the group consisting of $C_1$-$C_6$-alkyl-, an arylic- and benzylic substituent;

wherein cyclization comprises disulfide formation; and wherein intramolecular or intermolecular cyclization by using an organic scaffold molecule, wherein the peptide comprises at least two amino acids comprising a nucleophilic thiol for intramolecular cyclization by disulfide formation or for intermolecular cyclization using an organic scaffold molecule having at least two electrophilic centers; wherein the electrophilic center is formed by halogen substituents and/or Michael acceptors, and is formed by at least two benzylic halogen substituents, at least two acrylamides or at least two acryl esters;

wherein the organic scaffold molecule is selected from the group consisting of 1,4-Bis(bromomethyl)benzene, m-Xylylene dibromide (mDBX), 1,3,5-Tris(bromomethyl) benzene (TBMB), N,N'-bis(chloroacetyl)-1,2-ethylenediamine, N,N'-bis(chloroacetyl)-1,3-propylenediamine, N,N'-((ethane-1,2-diylbis(oxy))bis(ethane-2,1-diyl))bis(2-chloroacetamide), N,N'-bis(bromoacetyl)-1,2-ethylenediamine, N,N'-bis(bromoacetyl)-1,3-propylenediamine, N,N'-((ethane-1,2-diylbis(oxy))bis(ethane-2,1-diyl))bis(2-bromoacetamide), 1,3,5-Triacryloyl-1,3,5-triazinan (TATA), 1,1',1''-(1,3,5-Triazinan-1,3,5-triyl)tris(2-bromoethanon) (TATB), N,N',N''-(benzene-1,3,5-triyl)-tris(2-bromoacetamide) (TBAB), N,N',N''-benzene-1,3,5-triyltrisprop-2-enamide (TAAB), 2,4,6-tris(bromomethyl)-s-triazine (TBMT), N,N',N''-(Nitrilotris(ethane-2,1-diyl))triacrylamide, N,N',N''-(Nitrilotris(ethane-2,1-diyl))tris(2-chloroacetamide), N,N',N''-(Nitrilotris(ethane-2,1-diyl))tris(2-bromoacetamide), N,N',N''-(Nitrilotris(ethane-2,1-diyl))triethenesulfonamide, N,N',N''-((1,3,5-Triazinane-1,3,5-triyl)tris(2-oxoethane-2,1-diyl))triacrylamide, N,N',N''-((1,3,5-Triazinane-1,3,5-triyl)tris(2-oxoethane-2,1-diyl))tris(2-chloroacetamide), N,N',N''-((1,3,5-Triazinane-1,3,5-triyl)tris(2-oxoethane-2,1-diyl))triethenesulfonamide, N,N',N''-(Benzene-1,3,5-triyltris(methylene))triacrylamide, N,N',N''-(Benzene-1,3,5-triyltris(methylene))tris(2-chloroacetamide), N,N',N''-(Benzene-1,3,5-triyltris(methylene))triethenesulfonamid, Tri(2-hydroxyethyl)isocyanurate triacrylate, 1,3,5-Tris(oxiran-2-ylmethyl)-1,3,5-triazinane-2,4,6-trione;

reducing RI by adding a reducing agent yielding a reduced intermediate RI to yield mP;

wherein L is a compound of formula 1 comprising X-T$_b$-V$_a$-U—Y; wherein a. X is selected from the group consisting of 2, 2a, 3, 3a and 4,

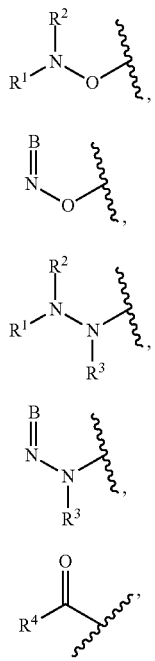

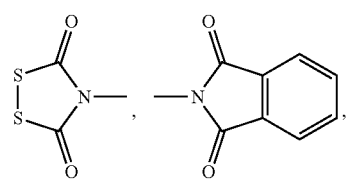

wherein i. each R$^1$ and R$^2$ is independently from each other selected from the group consisting of H and B; wherein at least one of R$^1$ or R$^2$ is B;

ii. R$^3$ is selected from the group consisting of H and B;

iii. R$^4$ is H, C$_1$-C$_{12}$-alkyl or aryl, wherein the aldehyde or keto group is selected from the group consisting of an unprotected aldehyde or keto group and a protected aldehyde or keto group; wherein the protecting group is an acid labile protecting group;

iv. B is an acid labile amine protecting group;

b. Tb is a linear or branched spacer with b being 0 or 1;

c. Va is an electron-withdrawing moiety with a being 0 or 1, wherein the sum of a and b is 1 or 2;

d. U is a phenyl or a five- or six-membered heteroaryl moiety, that is bound to at least one moiety selected from the group consisting of V, W$_q$ and E$_j$; wherein i. Wq is selected from the group consisting of —N$_3$, —NO$_2$, —S(=O)—R$^8$, —S—S—R$^8$, —O—CH$_2$—N$_3$, —O—C(=O)—O—CH$_2$—N$_3$, —N=N-phenyl, —N=N— and R$^8$,

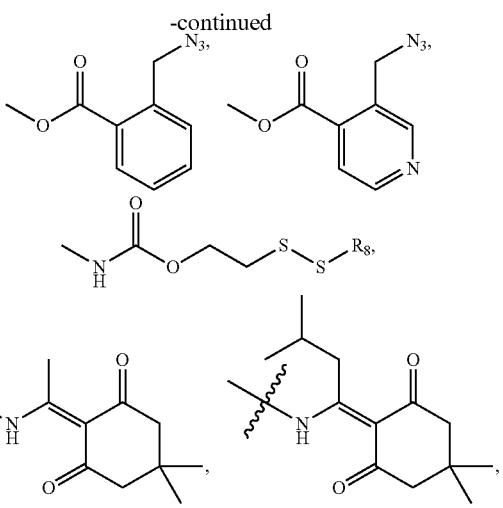

wherein

R$^8$ is selected from the group consisting of pyridyl, pyrimidinyl, pyrazinyl, pyridazyl, —C$_1$-C$_6$-alkyl and —(CH$_2$)$_p$—NMe$_2$, with q being 1, 2, 3 or 4; wherein Wq is in ortho or para position in relation to Y;

ii. Ej is an electron withdrawing group and j is selected from the group consisting of 0, 1, 2, 3 and 4;

wherein when U is a phenyl moiety and Y is —(CH$_2$)$_m$—O—C(=O)—, the sum of Hammett constants of V, Wq, Ej under acidic conditions is larger than 0.45; and e. Y is —(CH$_2$)$_m$—C(=O)— or —(CH$_2$)$_m$—O—C(=O)— with m being 1, 2 or 3.

2. The method according to claim 1, wherein the linker-tagged peptide L-P is provided by connecting a crude peptide P, that has been synthesized on a synthesizing support SR, with a free linker L$_f$ yielding a linker-tagged, supported crude peptide L-P-SR by releasing an electron withdrawing leaving group Z; wherein L$_f$ is a linker X-T$_b$-V$_a$-U—Y—Z with X, T, b, V, a, U and Y as defined according to claim 1 and Z being an electron withdrawing leaving group; and cleavage of the linker-tagged peptide L-P from the synthesizing support SR yielding the linker-tagged peptide L-P.

3. The method according to claim 2, wherein the cleavage of L-P is achieved under acidic conditions.

4. The method according to claim 1, wherein the solid support is aldehyde-modified.

5. The method according to claim 1, wherein the immobilizing step is performed at a pH <5.

6. The method according to claim 1, wherein the reducing agent in the reducing step is selected from the group consisting of triphenylphosphine, dithiothreitol (DTT), dithioerythritol (DTE), trimethylphosphine, triethylphosphine and tris(2-carboxyethyl)phosphine.

7. The method according to claim 1, wherein the reduced intermediate RI is reduced by a pH change.

8. The method according to claim 1, wherein P comprises an amino acid comprising at least one nucleophilic amine of in an amino acid side chain for lipidation.

9. The method according to claim 1, wherein Sp is independently selected from the group consisting of a linear or branched alkyl substituted by 1 to 5; —NH—[C$_r$-alkyl-O]$_s$—C$_r$-alkyl-C(=O)— wherein r is independently selected from 1, 2 and 3; s is selected from the group consisting of an integer between 1 and 10; t is selected from the group consisting of 1, 2 or 3; and an amino acid selected from the group consisting of protected and unprotected; wherein the N-terminus and/or an amine in the side chain is replaced by —NH— and the C-terminus and/or a carboxylic acid moiety in the side chain is replaced by —C(=O)—.

10. The method according to claim 1, wherein the compound of formula 5a or 5b is coupled to the at least one nucleophilic amine in the modification step in the presence of an activating reactant.

11. The method according to claim 1, wherein the number of nucleophilic thiols is even, and the nucleophilic thiols are oxidized by a basic aqueous solution with a pH >7 in the modification step to yield a macrocyclic bridged peptide.

12. The method according to claim 1, wherein the number of nucleophilic thiols is even, and the nucleophilic thiols are oxidized in the modification step to yield a macrocyclic bridged peptide; wherein oxidation is in the presence of air and/or in the presence of an oxidative additive.

13. The method according to claim 1, wherein Tb is a linear or branched spacer comprising at least one of the moieties selected from the group consisting of —$C_{1-12}$-alkyl-, (—$C_2H_4O$—)$_{1-12}$, —C(=O)—, —C(=O)-$JR^9$—, -$JR^9$—C(=O)—, -$JR^9$—, phenyl, 5- and 6-membered heteroaryl; wherein J is selected from the group consisting of C and N; $R^9$ is selected from the group consisting of H, $C_{1-4}$-alkyl, —$C_{1-6}$-alkyl-$NH_2$, —$C_{1-6}$-alkyl-NHB, —$C_{1-6}$-alkyl-$NB_2$, —$R^{15}$, —$C_{1-6}$-alkyl-$R^{15}$, and —$C_{1-6}$-alkyl-NH—$R^{15}$; B is an independently selected acid labile amine protecting group; $R^{15}$ is a blocking agent that is able to react with an aldehyde moiety and the amine and/or thiol moieties of the blocking agent may be independently protected by a protecting group selected from the group consisting of an acid labile amine protecting group B and/or an acid labile thiol protecting group; and b is selected from the group consisting of 0 or 1.

14. The method according to claim 1, wherein Va is an electron-withdrawing moiety selected from the group consisting of —$NR^{11}$—C(=O)—, —C(=O)—$NR^{11}$—, —S(=O)—, —$NR^{12}$—$(CH_2)_p$—, -piperazinyl-$(CH_2)_p$—, -pyridinyl, pyrimidinyl, pyrazinyl, pyridazinyl,

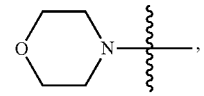

—C(=O)—, and —C(=O)—O—, wherein $R^{11}$ is selected from the group consisting of H and $C_{1-4}$-alkyl; $R^{12}$ is selected from the group consisting of H and $C_{1-4}$-alkyl; p is selected from the group consisting of 0, 1 and 2; a is selected from the group consisting of 0 and 1; and the sum of a and b is selected group consisting of 1 and 2.

15. The method according to claim 1, wherein Ej is selected from the group consisting of piperidinyl, piperazinyl, pyridyl, pyrimidinyl, pyrazinyl, pyridazyl, —$N(C_2H_4)_2NH_2$, —$N(C_2H_4)_2N$—B, —N=N-phenyl, —N=N—$R^8$, —$(CH_2)_r$—NH—$C_{1-6}$-alkyl, —$(CH_2)_r$—$N(C_{1-6}$-alkyl$)_2$-, —F, —Cl, —Br, —I, —CN, —$NO_2$, —$N_3$, —$CF_3$, —$SO_3H$, —$CO_2H$, —C(=O)$NH_2$, —$SO_2Me$, —SOMe, —$SO_2Et$, and —SOEt; wherein $R^8$ is selected from the group consisting of pyridyl, pyrimidinyl, pyrazinyl, pyridazyl, —$C_1$-$C_6$-alkyl and —$(CH_2)_p$—$NMe_2$; p is selected from the group consisting of 1, 2, 3 and 4; B is an acid labile amine protecting group; and r is selected from the group consisting of 0, 1, 2, 3 and 4.

* * * * *

SEQUENCE LISTING

<160> NUMBER OF SEQ ID NOS: 34

<210> SEQ ID NO 1
<211> LENGTH: 13
<212> TYPE: PRT
<213> ORGANISM: Artificial Sequence
<220> FEATURE:
<223> OTHER INFORMATION: fragment 25-37 (K34R) of the Glucagon-like
      peptide-1
<220> FEATURE:
<221> NAME/KEY: MOD_RES
<222> LOCATION: (13)..(13)
<223> OTHER INFORMATION: AMIDATION

<400> SEQUENCE: 1

Ala Lys Glu Phe Ile Ala Trp Leu Val Arg Gly Arg Gly
1               5                   10

```
<210> SEQ ID NO 2
<211> LENGTH: 31
<212> TYPE: PRT
<213> ORGANISM: Artificial Sequence
<220> FEATURE:
<223> OTHER INFORMATION: fragment 7-37 (K34R) of the Glucagon-like
      peptide-1
<220> FEATURE:
<221> NAME/KEY: MOD_RES
<222> LOCATION: (31)..(31)
<223> OTHER INFORMATION: AMIDATION

<400> SEQUENCE: 2

His Ala Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
            20                  25                  30

<210> SEQ ID NO 3
<211> LENGTH: 14
<212> TYPE: PRT
<213> ORGANISM: Artificial Sequence
<220> FEATURE:
<223> OTHER INFORMATION: test peptide P3
<220> FEATURE:
<221> NAME/KEY: MOD_RES
<222> LOCATION: (14)..(14)
<223> OTHER INFORMATION: AMIDATION

<400> SEQUENCE: 3

Cys Arg Val Pro Gly Asp Ala His His Ala Asp Ser Leu Cys
1               5                   10

<210> SEQ ID NO 4
<211> LENGTH: 14
<212> TYPE: PRT
<213> ORGANISM: Artificial Sequence
<220> FEATURE:
<223> OTHER INFORMATION: test peptide P4
<220> FEATURE:
<221> NAME/KEY: MOD_RES
<222> LOCATION: (14)..(14)
<223> OTHER INFORMATION: AMIDATION

<400> SEQUENCE: 4

Val Arg Cys Pro Gly Ala Ala His His Ala Asp Ser Leu Cys
1               5                   10

<210> SEQ ID NO 5
<211> LENGTH: 14
<212> TYPE: PRT
<213> ORGANISM: Artificial Sequence
<220> FEATURE:
<223> OTHER INFORMATION: test peptide P5
<220> FEATURE:
<221> NAME/KEY: MOD_RES
<222> LOCATION: (14)..(14)
<223> OTHER INFORMATION: AMIDATION

<400> SEQUENCE: 5

Val Arg Val Pro Gly Cys Ala His Cys Ala Asp Ser Leu Tyr
1               5                   10

<210> SEQ ID NO 6
<211> LENGTH: 15
<212> TYPE: PRT
<213> ORGANISM: Artificial Sequence
<220> FEATURE:
<223> OTHER INFORMATION: test peptide P6
```

```
<220> FEATURE:
<221> NAME/KEY: MOD_RES
<222> LOCATION: (15)..(15)
<223> OTHER INFORMATION: AMIDATION

<400> SEQUENCE: 6

Ala Cys Ser Trp Pro Ala Arg Cys Leu His Gln Asp Leu Cys Ala
1               5                   10                  15

<210> SEQ ID NO 7
<211> LENGTH: 17
<212> TYPE: PRT
<213> ORGANISM: Artificial Sequence
<220> FEATURE:
<223> OTHER INFORMATION: test peptide P7
<220> FEATURE:
<221> NAME/KEY: MOD_RES
<222> LOCATION: (17)..(17)
<223> OTHER INFORMATION: AMIDATION

<400> SEQUENCE: 7

Ala Cys Arg Glu Gly Phe Leu Arg Cys Leu His Arg Pro Thr Val Cys
1               5                   10                  15

Gly

<210> SEQ ID NO 8
<211> LENGTH: 16
<212> TYPE: PRT
<213> ORGANISM: Artificial Sequence
<220> FEATURE:
<223> OTHER INFORMATION: test peptide P8
<220> FEATURE:
<221> NAME/KEY: MOD_RES
<222> LOCATION: (16)..(16)
<223> OTHER INFORMATION: AMIDATION

<400> SEQUENCE: 8

Ala Cys Tyr Asn Glu Phe Gly Cys Glu Asp Phe Tyr Asp Ile Cys Ala
1               5                   10                  15

<210> SEQ ID NO 9
<211> LENGTH: 9
<212> TYPE: PRT
<213> ORGANISM: Artificial Sequence
<220> FEATURE:
<223> OTHER INFORMATION: test peptide P9
<220> FEATURE:
<221> NAME/KEY: MOD_RES
<222> LOCATION: (9)..(9)
<223> OTHER INFORMATION: AMIDATION

<400> SEQUENCE: 9

Cys Tyr Phe Gln Asn Cys Pro Arg Gly
1               5

<210> SEQ ID NO 10
<211> LENGTH: 36
<212> TYPE: PRT
<213> ORGANISM: Artificial Sequence
<220> FEATURE:
<223> OTHER INFORMATION: test peptide P10
<220> FEATURE:
<221> NAME/KEY: MOD_RES
<222> LOCATION: (36)..(36)
<223> OTHER INFORMATION: AMIDATION

<400> SEQUENCE: 10

Lys Cys Asn Thr Ala Thr Cys Ala Thr Gln Arg Leu Ala Asn Phe Leu
1               5                   10                  15
```

```
Val His Ser Ser Asn Phe Gly Pro Ile Leu Pro Pro Thr Asn Val Gly
            20                  25                  30

Ser Asn Thr Tyr
        35

<210> SEQ ID NO 11
<211> LENGTH: 14
<212> TYPE: PRT
<213> ORGANISM: Artificial Sequence
<220> FEATURE:
<223> OTHER INFORMATION: testp peptide P11
<220> FEATURE:
<221> NAME/KEY: MOD_RES
<222> LOCATION: (14)..(14)
<223> OTHER INFORMATION: AMIDATION

<400> SEQUENCE: 11

Cys Cys Glu Tyr Cys Cys Asn Pro Ala Cys Thr Gly Cys Tyr
1               5                   10

<210> SEQ ID NO 12
<211> LENGTH: 6
<212> TYPE: PRT
<213> ORGANISM: Artificial Sequence
<220> FEATURE:
<223> OTHER INFORMATION: test peptide P12
<220> FEATURE:
<221> NAME/KEY: MOD_RES
<222> LOCATION: (6)..(6)
<223> OTHER INFORMATION: AMIDATION

<400> SEQUENCE: 12

Lys Lys Lys Lys Ser Cys
1               5

<210> SEQ ID NO 13
<211> LENGTH: 14
<212> TYPE: PRT
<213> ORGANISM: Artificial Sequence
<220> FEATURE:
<223> OTHER INFORMATION: test peptide P13
<220> FEATURE:
<221> NAME/KEY: MOD_RES
<222> LOCATION: (14)..(14)
<223> OTHER INFORMATION: AMIDATION

<400> SEQUENCE: 13

Lys Glu Lys Phe Ser Ile Asn Ser Glu Asp Asn Asn Gly Cys
1               5                   10

<210> SEQ ID NO 14

<400> SEQUENCE: 14

000

<210> SEQ ID NO 15
<211> LENGTH: 31
<212> TYPE: PRT
<213> ORGANISM: Artificial Sequence
<220> FEATURE:
<223> OTHER INFORMATION: test peptide 15
<220> FEATURE:
<221> NAME/KEY: MISC_FEATURE
<222> LOCATION: (2)..(2)
<223> OTHER INFORMATION: Aib

<400> SEQUENCE: 15
```

```
His Xaa Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
            20                  25                  30

<210> SEQ ID NO 16
<211> LENGTH: 19
<212> TYPE: PRT
<213> ORGANISM: Artificial Sequence
<220> FEATURE:
<223> OTHER INFORMATION: Sequence 1-19 (S1M) of the Nef protein

<400> SEQUENCE: 16

Ser Gly Gly Lys Trp Ser Lys Ser Ser Val Ile Gly Trp Pro Ala Val
1               5                   10                  15

Arg Glu Arg

<210> SEQ ID NO 17
<211> LENGTH: 18
<212> TYPE: PRT
<213> ORGANISM: Artificial Sequence
<220> FEATURE:
<223> OTHER INFORMATION: Sequence 2-19 of the Nef protein

<400> SEQUENCE: 17

Gly Gly Lys Trp Ser Lys Ser Ser Val Ile Gly Trp Pro Ala Val Arg
1               5                   10                  15

Glu Arg

<210> SEQ ID NO 18
<211> LENGTH: 13
<212> TYPE: PRT
<213> ORGANISM: Artificial Sequence
<220> FEATURE:
<223> OTHER INFORMATION: modified peptide P1
<220> FEATURE:
<221> NAME/KEY: LIPID
<222> LOCATION: (2)..(2)
<223> OTHER INFORMATION: Palm-gammaE-OH
<220> FEATURE:
<221> NAME/KEY: MOD_RES
<222> LOCATION: (13)..(13)
<223> OTHER INFORMATION: AMIDATION

<400> SEQUENCE: 18

Ala Lys Glu Phe Ile Ala Trp Leu Val Arg Gly Arg Gly
1               5                   10

<210> SEQ ID NO 19
<211> LENGTH: 31
<212> TYPE: PRT
<213> ORGANISM: Artificial Sequence
<220> FEATURE:
<223> OTHER INFORMATION: modified peptide P2
<220> FEATURE:
<221> NAME/KEY: LIPID
<222> LOCATION: (20)..(20)
<223> OTHER INFORMATION: Palm-gammaE-OH
<220> FEATURE:
<221> NAME/KEY: MOD_RES
<222> LOCATION: (31)..(31)
<223> OTHER INFORMATION: AMIDATION

<400> SEQUENCE: 19

His Ala Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
```

-continued

```
                    20                  25                  30

<210> SEQ ID NO 20
<211> LENGTH: 31
<212> TYPE: PRT
<213> ORGANISM: Artificial Sequence
<220> FEATURE:
<223> OTHER INFORMATION: test peptide P2b

<400> SEQUENCE: 20

His Ala Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
            20                  25                  30

<210> SEQ ID NO 21
<211> LENGTH: 31
<212> TYPE: PRT
<213> ORGANISM: Artificial Sequence
<220> FEATURE:
<223> OTHER INFORMATION: modified test peptide P2b
<220> FEATURE:
<221> NAME/KEY: LIPID
<222> LOCATION: (20)..(20)
<223> OTHER INFORMATION: Palm-Glu-OH

<400> SEQUENCE: 21

His Ala Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
            20                  25                  30

<210> SEQ ID NO 22
<211> LENGTH: 6
<212> TYPE: PRT
<213> ORGANISM: Artificial Sequence
<220> FEATURE:
<223> OTHER INFORMATION: test peptide P12a and P12b
<220> FEATURE:
<221> NAME/KEY: LIPID
<222> LOCATION: (6)..(6)
<223> OTHER INFORMATION: C3H5O2-diPalm
<220> FEATURE:
<221> NAME/KEY: MOD_RES
<222> LOCATION: (6)..(6)
<223> OTHER INFORMATION: AMIDATION

<400> SEQUENCE: 22

Lys Lys Lys Lys Ser Cys
1               5

<210> SEQ ID NO 23
<211> LENGTH: 6
<212> TYPE: PRT
<213> ORGANISM: Artificial Sequence
<220> FEATURE:
<223> OTHER INFORMATION: test peptide P12d
<220> FEATURE:
<221> NAME/KEY: LIPID
<222> LOCATION: (6)..(6)
<223> OTHER INFORMATION: C2H4O-Palm
<220> FEATURE:
<221> NAME/KEY: MOD_RES
<222> LOCATION: (6)..(6)
<223> OTHER INFORMATION: AMIDATION

<400> SEQUENCE: 23

Lys Lys Lys Lys Ser Cys
1               5
```

```
<210> SEQ ID NO 24
<211> LENGTH: 14
<212> TYPE: PRT
<213> ORGANISM: Artificial Sequence
<220> FEATURE:
<223> OTHER INFORMATION: test peptide P13a and P13b
<220> FEATURE:
<221> NAME/KEY: LIPID
<222> LOCATION: (14)..(14)
<223> OTHER INFORMATION: C3H5O2-diPalm
<220> FEATURE:
<221> NAME/KEY: MOD_RES
<222> LOCATION: (14)..(14)
<223> OTHER INFORMATION: AMIDATION

<400> SEQUENCE: 24

Lys Glu Lys Phe Ser Ile Asn Ser Glu Asp Asn Asn Gly Cys
1               5                   10

<210> SEQ ID NO 25
<211> LENGTH: 14
<212> TYPE: PRT
<213> ORGANISM: Artificial Sequence
<220> FEATURE:
<223> OTHER INFORMATION: test peptide P13d
<220> FEATURE:
<221> NAME/KEY: LIPID
<222> LOCATION: (14)..(14)
<223> OTHER INFORMATION: C2H4O-Palm
<220> FEATURE:
<221> NAME/KEY: MOD_RES
<222> LOCATION: (14)..(14)
<223> OTHER INFORMATION: AMIDATION

<400> SEQUENCE: 25

Lys Glu Lys Phe Ser Ile Asn Ser Glu Asp Asn Asn Gly Cys
1               5                   10

<210> SEQ ID NO 26

<400> SEQUENCE: 26

000

<210> SEQ ID NO 27

<400> SEQUENCE: 27

000

<210> SEQ ID NO 28
<211> LENGTH: 31
<212> TYPE: PRT
<213> ORGANISM: Artificial Sequence
<220> FEATURE:
<223> OTHER INFORMATION: modified peptide P15
<220> FEATURE:
<221> NAME/KEY: MISC_FEATURE
<222> LOCATION: (2)..(2)
<223> OTHER INFORMATION: Aib
<220> FEATURE:
<221> NAME/KEY: MISC_FEATURE
<222> LOCATION: (20)..(20)
<223> OTHER INFORMATION: CO2H-Ste-Glu(aeea-aeea-OH)-OH

<400> SEQUENCE: 28

His Xaa Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
```

```
<210> SEQ ID NO 29
<211> LENGTH: 19
<212> TYPE: PRT
<213> ORGANISM: Artificial Sequence
<220> FEATURE:
<223> OTHER INFORMATION: modified peptide P16
<220> FEATURE:
<221> NAME/KEY: LIPID
<222> LOCATION: (1)..(1)
<223> OTHER INFORMATION: Palm
<220> FEATURE:
<221> NAME/KEY: LIPID
<222> LOCATION: (4)..(4)
<223> OTHER INFORMATION: Palm
<220> FEATURE:
<221> NAME/KEY: LIPID
<222> LOCATION: (7)..(7)
<223> OTHER INFORMATION: Palm
<220> FEATURE:
<221> NAME/KEY: MOD_RES
<222> LOCATION: (19)..(19)
<223> OTHER INFORMATION: AMIDATION

<400> SEQUENCE: 29

Ser Gly Gly Lys Trp Ser Lys Ser Ser Val Ile Gly Trp Pro Ala Val
1               5                   10                  15

Arg Glu Arg

<210> SEQ ID NO 30
<211> LENGTH: 18
<212> TYPE: PRT
<213> ORGANISM: Artificial Sequence
<220> FEATURE:
<223> OTHER INFORMATION: modified peptide P17a
<220> FEATURE:
<221> NAME/KEY: LIPID
<222> LOCATION: (1)..(1)
<223> OTHER INFORMATION: Palm
<220> FEATURE:
<221> NAME/KEY: LIPID
<222> LOCATION: (6)..(6)
<223> OTHER INFORMATION: Palm
<220> FEATURE:
<221> NAME/KEY: MOD_RES
<222> LOCATION: (18)..(18)
<223> OTHER INFORMATION: AMIDATION

<400> SEQUENCE: 30

Gly Gly Lys Trp Ser Lys Ser Ser Val Ile Gly Trp Pro Ala Val Arg
1               5                   10                  15

Glu Arg

<210> SEQ ID NO 31
<211> LENGTH: 18
<212> TYPE: PRT
<213> ORGANISM: Artificial Sequence
<220> FEATURE:
<223> OTHER INFORMATION: modified peptide P17b
<220> FEATURE:
<221> NAME/KEY: LIPID
<222> LOCATION: (1)..(1)
<223> OTHER INFORMATION: Myr
<220> FEATURE:
<221> NAME/KEY: LIPID
<222> LOCATION: (6)..(6)
<223> OTHER INFORMATION: Myr
<220> FEATURE:
<221> NAME/KEY: MOD_RES
<222> LOCATION: (18)..(18)
<223> OTHER INFORMATION: AMIDATION
```

<400> SEQUENCE: 31

Gly Gly Lys Trp Ser Lys Ser Ser Val Ile Gly Trp Pro Ala Val Arg
1               5                   10                  15

Glu Arg

<210> SEQ ID NO 32
<211> LENGTH: 14
<212> TYPE: PRT
<213> ORGANISM: Artificial Sequence
<220> FEATURE:
<223> OTHER INFORMATION: modified peptide P2/c
<220> FEATURE:
<221> NAME/KEY: LIPID
<222> LOCATION: (14)..(14)
<223> OTHER INFORMATION: propyl-diPalm
<220> FEATURE:
<221> NAME/KEY: MOD_RES
<222> LOCATION: (14)..(14)
<223> OTHER INFORMATION: AMIDATION

<400> SEQUENCE: 32

Lys Glu Lys Phe Ser Ile Asn Ser Glu Asp Asn Asn Gly Cys
1               5                   10

<210> SEQ ID NO 33
<211> LENGTH: 19
<212> TYPE: PRT
<213> ORGANISM: Artificial Sequence
<220> FEATURE:
<223> OTHER INFORMATION: test peptide
<220> FEATURE:
<221> NAME/KEY: LIPID
<222> LOCATION: (1)..(1)
<223> OTHER INFORMATION: Palm
<220> FEATURE:
<221> NAME/KEY: LIPID
<222> LOCATION: (7)..(7)
<223> OTHER INFORMATION: Palm
<220> FEATURE:
<221> NAME/KEY: MOD_RES
<222> LOCATION: (19)..(19)
<223> OTHER INFORMATION: AMIDATION

<400> SEQUENCE: 33

Ser Gly Gly Lys Trp Ser Lys Ser Ser Val Ile Gly Trp Pro Ala Val
1               5                   10                  15

Arg Glu Arg

<210> SEQ ID NO 34
<211> LENGTH: 19
<212> TYPE: PRT
<213> ORGANISM: Artificial Sequence
<220> FEATURE:
<223> OTHER INFORMATION: test peptide
<220> FEATURE:
<221> NAME/KEY: LIPID
<222> LOCATION: (1)..(1)
<223> OTHER INFORMATION: Myr
<220> FEATURE:
<221> NAME/KEY: LIPID
<222> LOCATION: (7)..(7)
<223> OTHER INFORMATION: Myr
<220> FEATURE:
<221> NAME/KEY: MOD_RES
<222> LOCATION: (19)..(19)
<223> OTHER INFORMATION: AMIDATION

<400> SEQUENCE: 34

Ser Gly Gly Lys Trp Ser Lys Ser Ser Val Ile Gly Trp Pro Ala Val

-continued

| 1 | 5 | 10 | 15 |
Arg Glu Arg